US012437047B1

(12) United States Patent
Doan et al.

(10) Patent No.: US 12,437,047 B1
(45) Date of Patent: Oct. 7, 2025

(54) DIGITAL HEALTHCARE ARCHITECTURE WITH BIOMETRIC AUTHENTICATION SYSTEMS AND METHODS

(71) Applicant: ADVANCED NEUROMODULATION SYSTEMS, INC., Plano, TX (US)

(72) Inventors: Tri Doan, Celina, TX (US); Gregory Creek, Prosper, TX (US); Daniel Moore, Celina, TX (US); Binesh Balasingh, Prosper, TX (US); Navin Dabhi, Frisco, TX (US); Scott DeBates, Frisco, TX (US); Mary Khun Hor-Lao, Prosper, TX (US); Douglas Alfred Lautner, Frisco, TX (US)

(73) Assignee: ADVANCED NEUROMODULATION SYSTEMS, INC., Plano, TX (US)

( * ) Notice: Subject to any disclaimer, the term of this patent is extended or adjusted under 35 U.S.C. 154(b) by 222 days.

(21) Appl. No.: 18/305,402

(22) Filed: Apr. 24, 2023

Related U.S. Application Data

(60) Provisional application No. 63/334,869, filed on Apr. 26, 2022.

(51) Int. Cl.
*H04L 29/06* (2006.01)
*A61N 1/372* (2006.01)
(Continued)

(52) U.S. Cl.
CPC ......... *G06F 21/32* (2013.01); *A61N 1/37217* (2013.01); *A61N 1/37247* (2013.01);
(Continued)

(58) Field of Classification Search
CPC ......... G06F 21/32; G16H 40/67; H04N 7/147
See application file for complete search history.

(56) References Cited

U.S. PATENT DOCUMENTS

| 8,224,453 | B2 | 7/2012 | De Ridder | |
| 8,679,012 | B1* | 3/2014 | Kayyali | A61B 5/369 |
| | | | | 600/301 |

(Continued)

OTHER PUBLICATIONS

Al-Kaisy, A. et al. "Sustained Effectiveness of 10 KHz High-Frequency Spinal Cord Stimulation for Patients with Chronic, Low Back Pain: 24-month Results of Prospective Multicenter Study," Pain Medicine, Mar. 2014, vol. 15, No. 3, pp. 347-354, 8 pages.

(Continued)

*Primary Examiner* — Wasika Nipa
(74) *Attorney, Agent, or Firm* — Norton Rose Fulbright US LLP

(57) ABSTRACT

A digital healthcare architecture including a cloud-based virtual clinic platform configured to facilitate remote therapy of one or more patients based on biometric authentication systems and methods. In an example arrangement, one or more biometric indicia of a user (e.g., a clinician and/or a patient) as well as one or more non-biometric input factors may be used in authenticating the user prior to granting access to a protected resource or application (e.g., a therapy application executing on a UE device) configured for effectuating remote programming of an implantable medical device (IMD) operative to provide therapy to the patient.

13 Claims, 32 Drawing Sheets

(51) Int. Cl.
*G06F 21/32* (2013.01)
*G16H 40/67* (2018.01)
*H04N 7/14* (2006.01)

(52) U.S. Cl.
CPC ......... *A61N 1/37282* (2013.01); *G16H 40/67* (2018.01); *H04N 7/147* (2013.01)

(56) References Cited

U.S. PATENT DOCUMENTS

| | | | |
|---|---|---|---|
| 8,682,441 | B2 | 3/2014 | De Ridder |
| 10,124,177 | B2 | 11/2018 | Kumar |
| 11,007,370 | B2 | 5/2021 | Shahandeh et al. |
| 2006/0095088 | A1 | 5/2006 | De Ridder |
| 2018/0270220 | A1* | 9/2018 | Jensen .................. G16H 10/60 |
| 2020/0020453 | A1* | 1/2020 | Yarbray ................ A61B 5/746 |
| 2020/0398062 | A1 | 12/2020 | Ibarrola et al. |
| 2020/0398063 | A1 | 12/2020 | De Bates et al. |
| 2020/0402656 | A1 | 12/2020 | De Bates et al. |
| 2020/0402674 | A1 | 12/2020 | De Bates et al. |
| 2021/0081520 | A1* | 3/2021 | Howarth ............... H04L 9/3271 |

OTHER PUBLICATIONS

Schu, S. et al. "A Prospective, Randomised, Double-blind, Placebo-controlled Study to Examine the Effectiveness of Burst Spinal Cord Stimulation Patterns for the Treatment of Failed Back Surgery Syndrome," Neuromodulation: Technology at the Neural Interface, Jul. 2014, vol. 17, No. 5, pp. 443-450, 8 pages.

Sweet, J. et al."Paresthesia-Free High-Density Spinal Cord Stimulation for Postlaminectomy Syndrome in a Prescreened Population: A Prospective Case Series," Neuromodulation: Technology at the Neural Interface, Apr. 2016, vol. 19, No. 3, pp. 260-267, 8 pages.

Tass, P. A. et al. "Coordinated Reset Has Sustained Aftereffects in Parkinsonian Monkeys," Annals of Neurology, Nov. 2012, vol. 72, No. 5, pp. 816-820, 5 pages.

\* cited by examiner

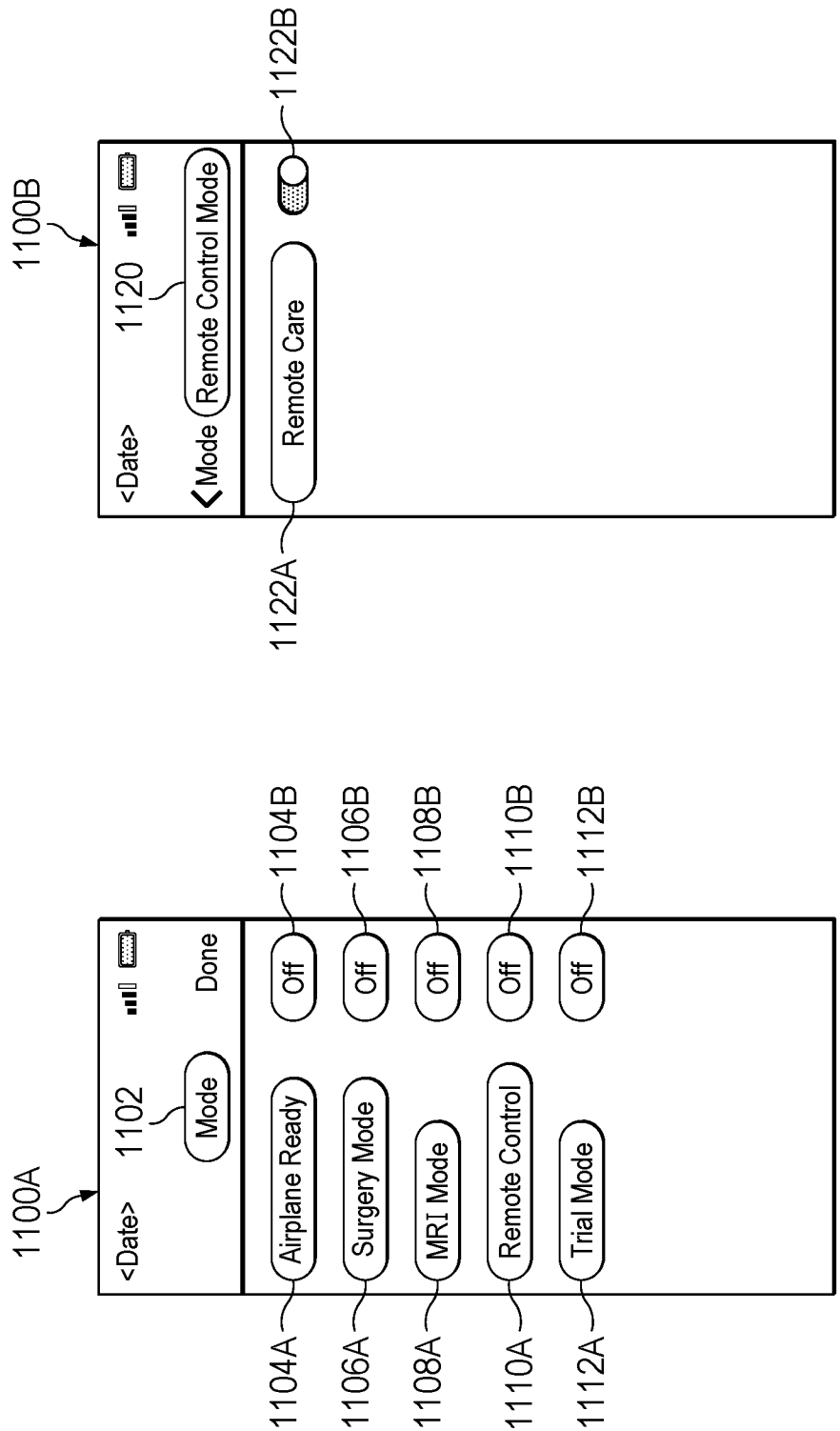

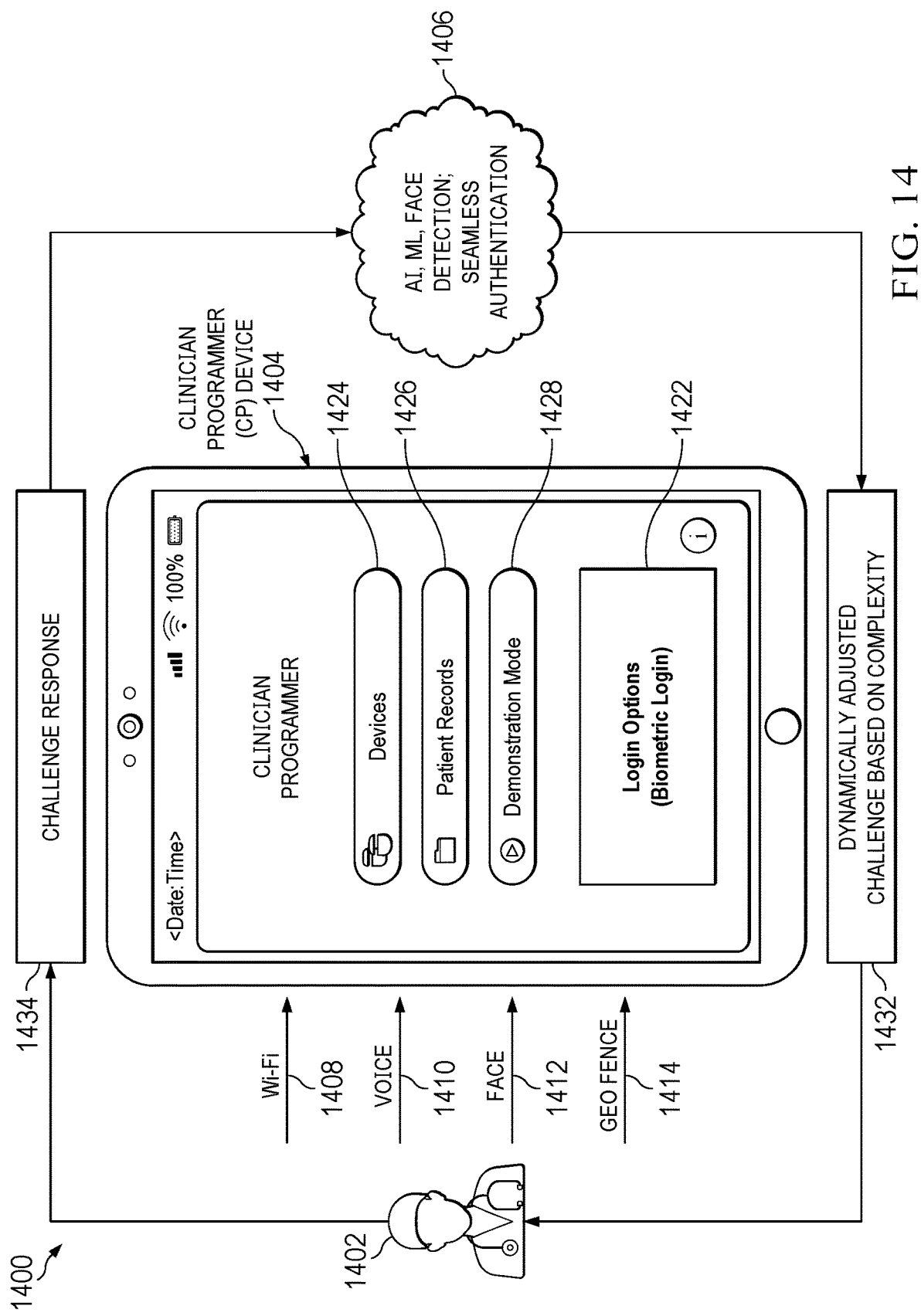

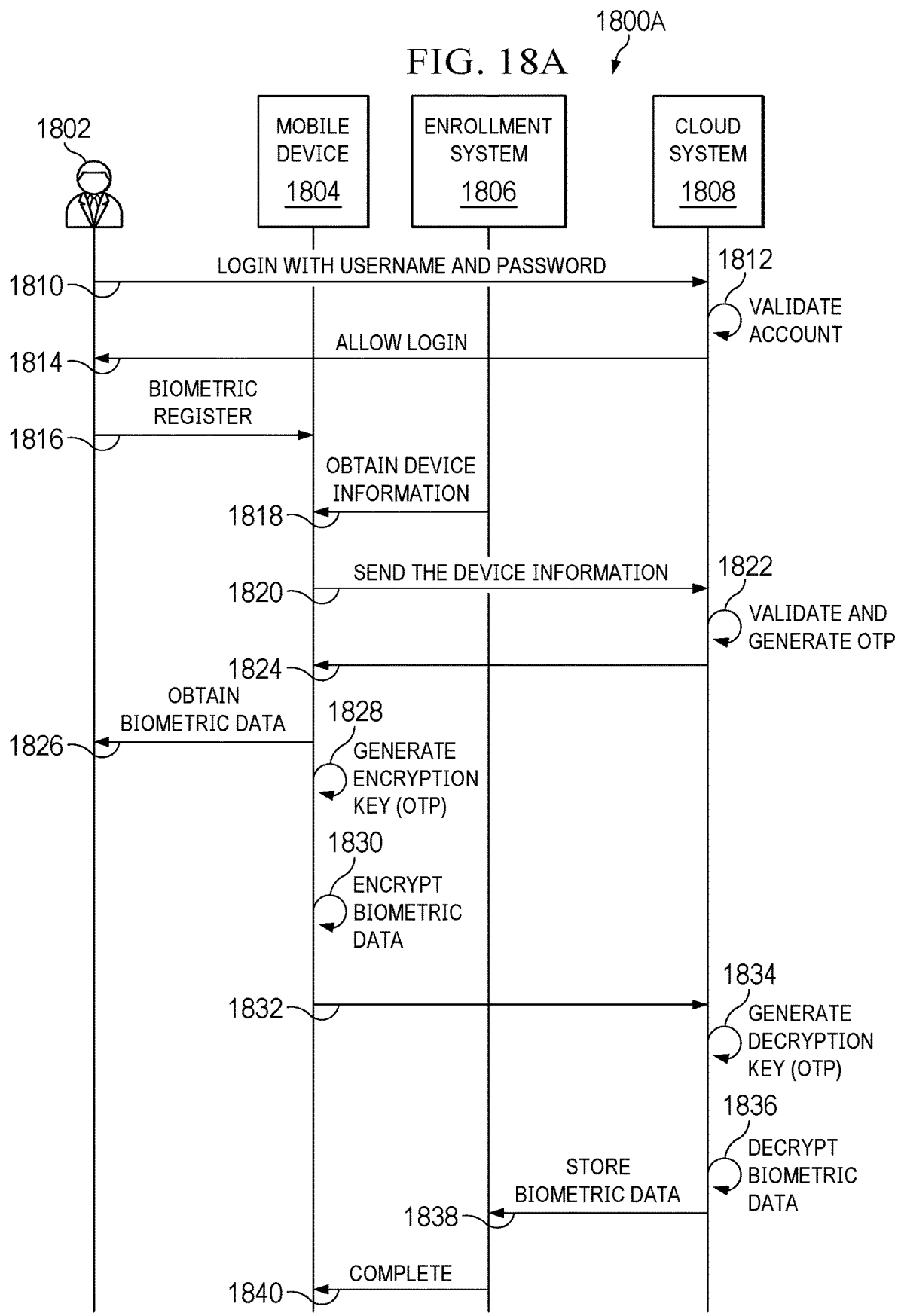

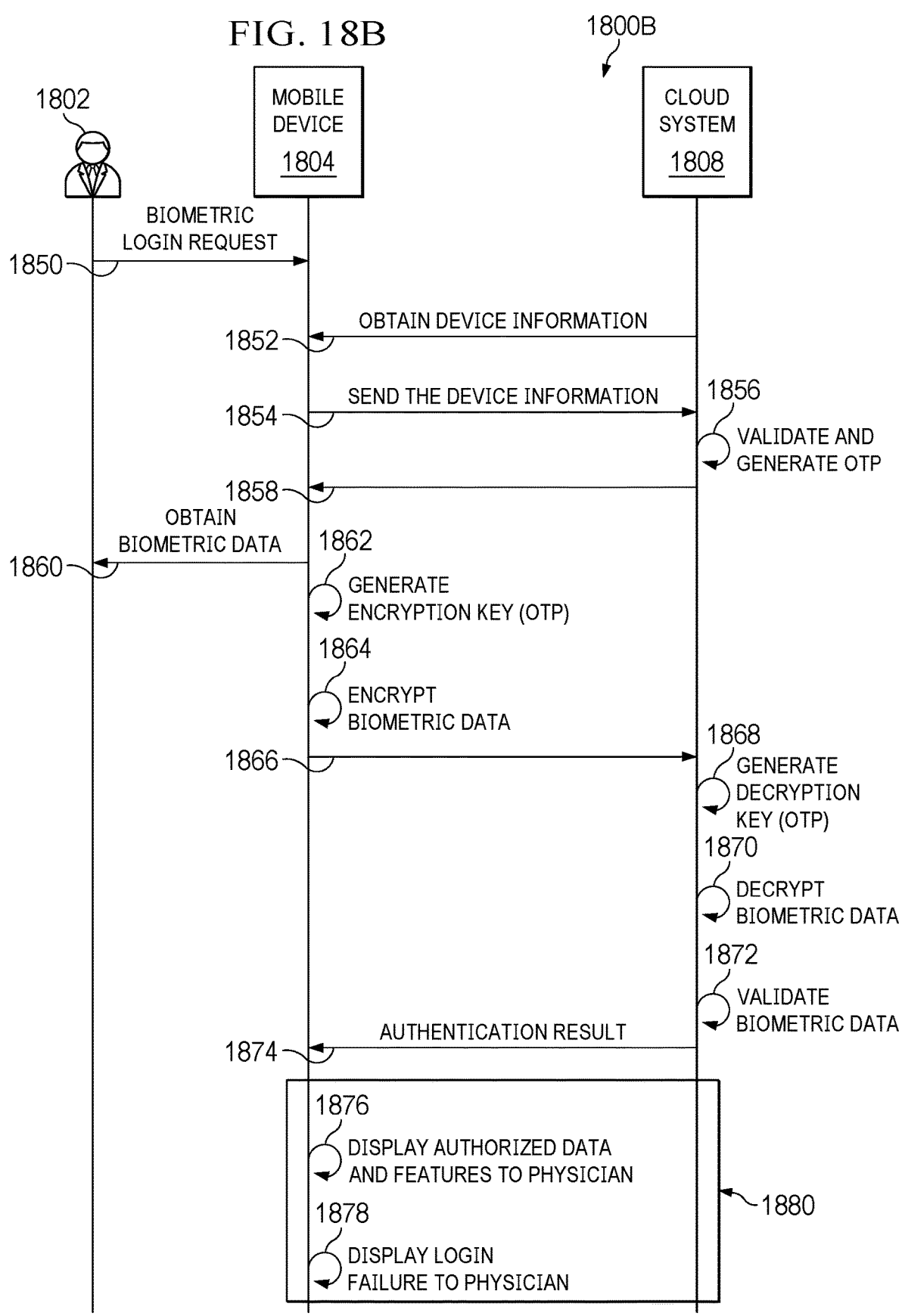

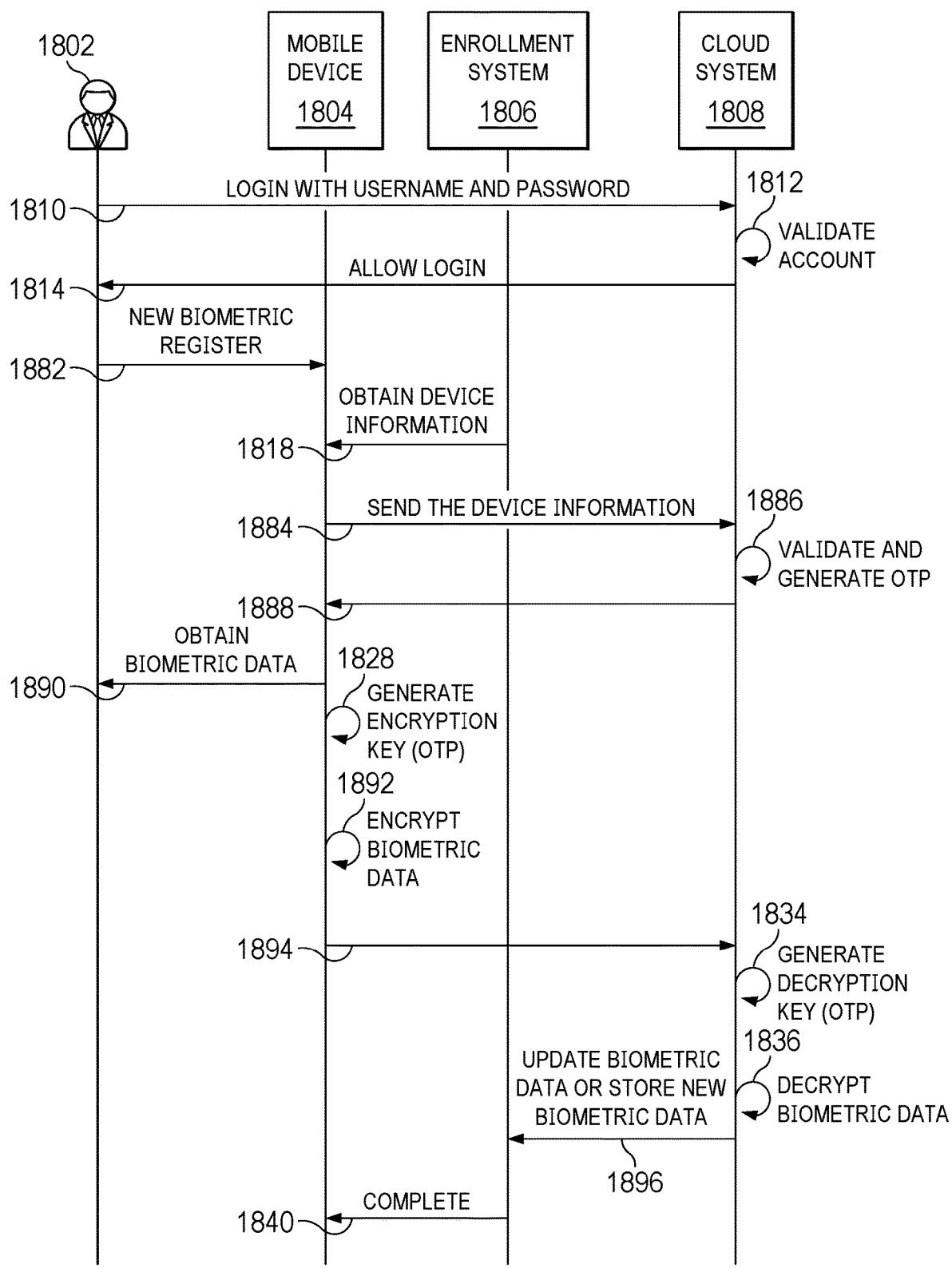

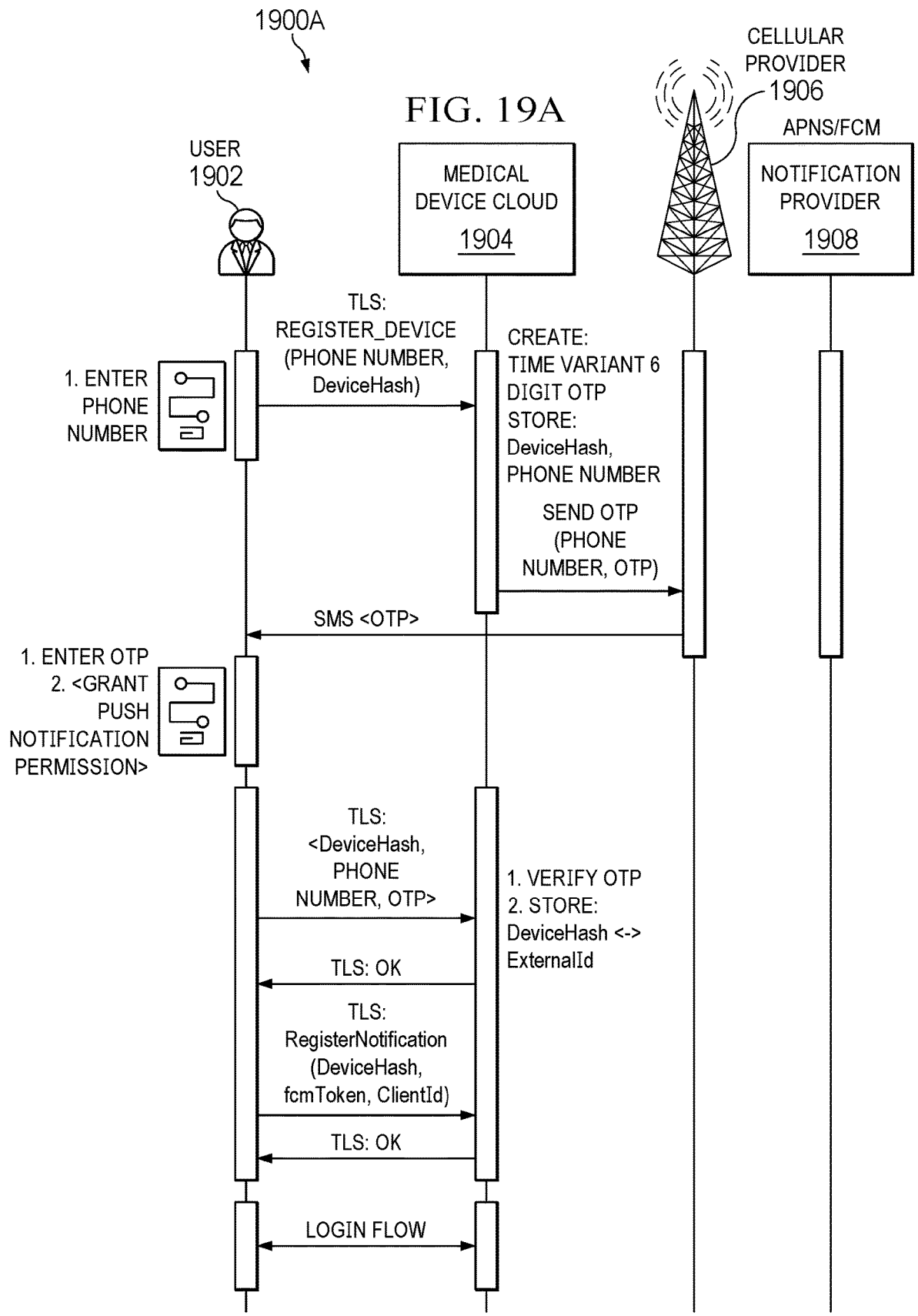

DIGITAL HEALTHCARE ARCHITECTURE WITH BIOMETRIC AUTHENTICATION SYSTEMS AND METHODS

PRIORITY AND CROSS-REFERENCE TO RELATED APPLICATION(S)

This nonprovisional application claims priority based upon the following prior United States provisional patent application(s): (i) "DIGITAL HEALTHCARE ARCHITECTURE WITH BIOMETRIC AUTHENTICATION SYSTEMS AND METHODS," Application No.: 63/334,869, filed Apr. 26, 2022, each of which is hereby incorporated by reference in its entirety.

TECHNICAL FIELD

The present application is generally directed to a digital healthcare architecture having biometric authentication systems and methods.

BACKGROUND

Implantable medical devices have changed how medical care is provided to patients having a variety of chronic illnesses and disorders. For example, implantable cardiac devices improve cardiac function in patients with heart disease by improving quality of life and reducing mortality rates. Respective types of implantable neurostimulators provide a reduction in pain for chronic pain patients and reduce motor difficulties in patients with Parkinson's disease and other movement disorders. A variety of other medical devices are proposed and are in development to treat other disorders in a wide range of patients.

Many implantable medical devices and other personal medical devices are programmed by a physician or other clinician to optimize the therapy provided by a respective device to an individual patient. Typically, the programming occurs using a variety of short-range communication links (e.g., inductive wireless telemetry, Bluetooth Low Energy (BLE), etc.) in an in-person or in-clinic setting.

Remote patient care is a healthcare delivery method that aims to use technology to provide patient health outside of a traditional clinical setting (e.g., in a doctor's office or a patient's home). It is widely expected that remote patient care may increase access to care and decrease healthcare delivery costs.

SUMMARY

Embodiments of the present patent disclosure are directed to a digital healthcare architecture having systems and methods for facilitating biometric authentication wherein access control based on biometric indicia of users, e.g., clinicians and/or patients, may be implemented in order to provide enhanced security with respect to login operations and therapy transactions. Some example embodiments may be advantageously configured to overcome the deficiencies and shortcomings of legacy "user name and password" authentication schemes used for accessing protected resources such as therapy applications executing on respective user devices, which are susceptible to phishing, social engineering and brute force attacks, especially where weak or duplicated passwords are employed.

In one aspect, a method of remotely programming an implantable medical device (IMD) that provides therapy to a patient is disclosed. The method may comprise, inter alia, establishing a first communication between a patient controller (PC) device and the implantable medical device, wherein the implantable medical device provides therapy to the patient according to one or more programmable parameters, the PC device communicating signals to the implantable medical device to set or modify the one or more programmable parameters, and the PC device comprises a video camera; establishing a video connection between the PC device and a clinician programmer (CP) device of a clinician for a remote programming session in a second communication that includes an audio/video (A/V) session; and modifying a value for one or more programmable parameters of the implantable medical device according to signals from the CP device during the remote programming session.

In one arrangement, the method may further comprise various authentication operations with respect to the patient, the clinician or both, before launching the remote programming session. For example, the method may comprise: responsive to a login operation initiated by the clinician operating the CP device prior to establishing the second communication, obtaining the biometric indicia of the clinician (e.g., a facial image of the clinician and a voice input from the clinician); determining at least one of a geofence associated with the CP device and an access point (AP) identity (ID) associated with an AP node to which the CP device is connected; adjusting a complexity level of a challenge query responsive to a combination of corresponding scores associated with the facial image and voice input of the clinician, the geofence and the AP identity, respectively; providing the challenge query having the adjusted complexity level to the clinician; and responsive to a response input from the clinician, allowing the clinician to access a medical application on the CP device for launching the remote programming session with the patient. In another arrangement, the method may further comprise, responsive to a login operation initiated by the patient at the PC device prior to establishing the first communication, determining a proximity of the PC device with respect to the IMD of the patient; and responsive to the proximity of the PC device with respect to the IMD and one or more biometric indicia of the patient, authenticating the patient and allowing access to the remote programming session with the clinician.

In yet another arrangement, the method may comprise, prior to establishing the remote programming session that may involve a video connection between the PC device and the CP device, enrolling baseline biometric data of the clinician for effectuating biometric authentication of the clinician; responsive to receiving a biometric login request, providing a one-time passcode (OTP) to the CP device generated by an authentication node; obtaining biometric data of the clinician; generating a temporary encryption key (TEK) derived from the OTP; encrypting the biometric data using the TEK and transmitting the encrypted biometric data to the authentication node; generating a temporary decryption key (TDK) derived from the OTP; decrypting the encrypted biometric data using the TDK; and responsive to validating the decrypted biometric data, authenticating the clinician and allowing access to one or more protected digital healthcare resources and services including launching the remote programming session with the patient having the IMD.

In another aspect, a method of facilitating authentication of a user operating a user equipment (UE) device configured to execute a medical application operative for providing therapy to a patient is disclosed. The method may comprise, inter alia, responsive to a login operation initiated by the user at the UE device, obtaining various biometric indicia associated with the user, e.g., a facial image of the user, voice input from the user, etc. The method may further comprise determining at least one of a geofence associated with the UE device and an access point (AP) identity (ID) associated with an AP node to which the UE device is connected. A complexity level of a challenge query may be adjusted responsive to a combination of corresponding scores associated with the biometric indicia as well as other non-biometric input factors such as the geofence data and the AP identity data. In one arrangement, a machine learning (ML) based authentication engine disposed in a network may be configured to determine the complexity levels of challenge queries and dynamically adjust the complexity levels as needed. In one arrangement, the challenge query having the adjusted complexity level based on biometric indicia and other input factors may be provided to the user in order to control access to the medical application. Depending on a response input from the user, a determination may be made if the user is a valid user (e.g., within a confidence level). Responsive to the determination, the user may be granted access with respect to the medical application.

In another aspect, a method of facilitating authentication of a patient operating a patient controller (PC) device configured to execute a medical application operative for providing therapy to the patient by interacting with an IMD of the patient is disclosed. The method may comprise, inter alia, responsive to a login operation initiated by the patient at the PC device, determining a proximity of the PC device with respect to the IMD of the patient. Responsive to the proximity of the PC device with respect to the IMD as well as one or more biometric inputs from the patient (e.g., a voice signature), the patient may be validated and authenticated, whereupon the patient may be granted access to a remote care session with a clinician via a virtual clinic (VC) platform disposed in a network. In one arrangement, the clinician may also be authenticated based on the clinician's biometric indicia and non-biometric indicia as set forth above prior to being allowed to launch a remote care session with a patient.

In another aspect, a method of remotely programming a medical device that provides therapy to a patient is disclosed. The method may comprise, inter alia, establishing a first communication between a patient controller (PC) device and the medical device, wherein the medical device provides therapy to the patient according to one or more programmable parameters, the PC device communicates signals to the medical device to set or modify the one or more programmable parameters, and the PC device comprises audio/video (AV) equipment such as a video camera and a microphone. A video connection between the PC device and a clinician programmer (CP) device of a clinician may be established for facilitating a remote programming session in a second communication that includes an A/V session, the remote programming session mediated via a VC platform disposed in a network. The method may involve modifying a value for one or more programmable parameters of the medical device according to signals from the CP device during the remote programming session. In one arrangement, the method may further comprise: prior to establishing the first communication between the PC device and the medical device, authenticating the patient using a plurality of indicia including a proximity of the PC device with respect to the medical device of the patient as well as one or more biometric indicia of the patient; and prior to establishing the video connection between the PC device and the CP device, authenticating the clinician using a plurality of biometric indicia in combination with one or more non-biometric input factors. In one arrangement, after authenticating the patient and the clinician, a valid mapping between the patient and the clinician may be created, determined, and/or otherwise established before commencing the remote programming session.

In another aspect, a method of facilitating authentication of a clinician operating a CP device configured to execute a medical application operative for providing therapy to a patient is disclosed. The method may comprise, inter alia, enrolling baseline biometric data of the clinician for effectuating biometric authentication of the clinician in an enrollment/registration phase. Responsive to receiving a biometric login request from the clinician, a one-time passcode (OTP) may be provided to the CP device generated by an authentication node. Upon obtaining or sensing a select set of biometric data of the clinician, the biometric data may be encrypted using a temporary encryption key (TEK) derived from the OTP. The encrypted biometric data may be transmitted to the authentication node for validation. A temporary decryption key (TDK) derived from the OTP may be generated by the authentication node, which is used for decrypting the encrypted biometric data received from the clinician. Responsive to validating the decrypted biometric data (e.g., by comparing against the stored baseline biometric data obtained in the enrollment phase), the clinician may be authenticated and allowed access to one or more protected digital healthcare resources and services including, e.g., launching a therapy session with the patient having the IMD operative with a PC device associated with the patient.

In another aspect, an example system is disclosed, wherein the system includes a medical device, a patient controller (PC) device, and a clinician programmer (CP) device, the system configured to implement any of the preceding methods.

In still further aspects, one or more embodiments of a non-transitory computer-readable medium, computer program product or distributed storage media containing computer-executable program instructions or code portions stored thereon are disclosed for effectuating one or more embodiments herein when executed by a processor entity of a patient controller device, a clinician programmer device, a network node, apparatus, system, network element, a datacenter node or cloud platform, and the like, mutatis mutandis.

BRIEF DESCRIPTION OF THE DRAWINGS

Embodiments of the present disclosure are illustrated by way of example, and not by way of limitation, in the Figures of the accompanying drawings in which like references indicate similar elements. It should be noted that different references to "an" or "one" embodiment in this disclosure are not necessarily to the same embodiment, and such references may mean at least one. Further, when a particular feature, structure, or characteristic is described in connection with an embodiment, it is submitted that it is within the knowledge of one skilled in the art to effectuate such feature, structure, or characteristic in connection with other embodiments whether or not explicitly described.

The accompanying drawings are incorporated into and form a part of the specification to illustrate one or more exemplary embodiments of the present disclosure. Various advantages and features of the disclosure will be understood from the following Detailed Description taken in connection with the appended claims and with reference to the attached drawing Figures in which:

FIGS. 11A-11C depict representations of an example user interface and associated dialog boxes provided with a patient controller device configured for launching a biometric authentication process and selecting different therapy applications and/or service modes for purposes of an embodiment of the present disclosure;

FIG. 14 depicts a high-level architecture of a biometric authentication system wherein a dynamically adjustable challenge may be provided to a user according to some examples of the present disclosure;

FIGS. 18A-18C depict example message flow diagrams for effectuating biometric authentication based on OTP according to some embodiments;

FIGS. 19A and 19B depict example message flow diagrams for effectuating medical device/application registration that may be implemented in conjunction with a biometric authentication system according to some embodiments;

DETAILED DESCRIPTION

Figure 1A:
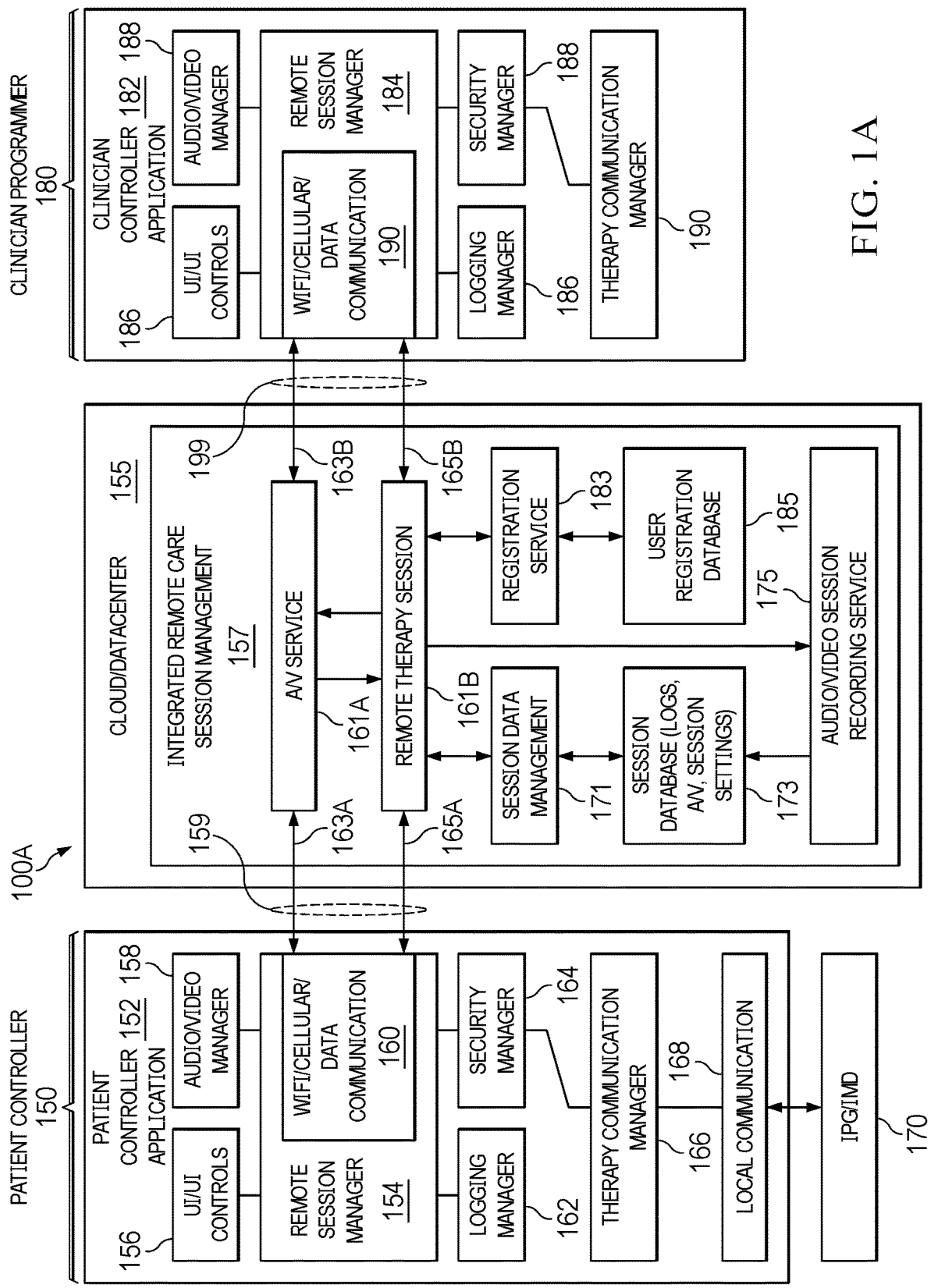
FIG. 1A depicts an example architecture of a system configured to support remote patient therapy in a virtual clinic (VC) environment wherein biometric authentication systems and methods may be practiced according to some representative embodiments of the present patent disclosure.

In the description herein for embodiments of the present disclosure, numerous specific details are provided, such as examples of circuits, devices, components and/or methods, to provide a thorough understanding of embodiments of the present disclosure. One skilled in the relevant art will recognize, however, that an embodiment of the disclosure can be practiced without one or more of the specific details, or with other apparatuses, systems, assemblies, methods, components, materials, parts, and/or the like set forth in reference to other embodiments herein. In other instances, well-known structures, materials, or operations are not specifically shown or described in detail to avoid obscuring aspects of embodiments of the present disclosure. Accordingly, it will be appreciated by one skilled in the art that the embodiments of the present disclosure may be practiced without such specific components. It should be further recognized that those of ordinary skill in the art, with the aid of the Detailed Description set forth herein and taking reference to the accompanying drawings, will be able to make and use one or more embodiments without undue experimentation.

Additionally, terms such as "coupled" and "connected," along with their derivatives, may be used in the following description, claims, or both. It should be understood that these terms are not necessarily intended as synonyms for each other. "Coupled" may be used to indicate that two or more elements, which may or may not be in direct physical or electrical contact with each other, co-operate or interact with each other. "Connected" may be used to indicate the establishment of communication, i.e., a communicative relationship, between two or more elements that are coupled with each other. Further, in one or more example embodiments set forth herein, generally speaking, an electrical element, component or module may be configured to perform a function if the element may be programmed for performing or otherwise structurally arranged to perform that function.

Example embodiments described herein relate to biometric authentication systems and methods for accessing protected resources, applications and privileged services within the context of, without limitation, a healthcare network environment. Some example embodiments may be configured in an integrated digital health network architecture that may be implemented as a convergence of various technologies involving diverse end user devices and computing platforms, heterogeneous network connectivity environments, agile software as a medical device (SaMD) deployments, data analytics and machine learning, secure cloud-centric infrastructures for supporting remote healthcare, etc. Some embodiments may be configured to support various types of healthcare solutions including but not limited to remote patient monitoring, integrated session management for providing telehealth applications as well as remote care therapy applications, personalized therapy based on advanced analytics of patient and clinician data, and the like. Whereas some example embodiments may be particularly set forth with respect to implantable pulse generator (IPG) or neuromodulator systems for providing therapy to a desired area of a body or tissue based on a suitable stimulation therapy application, such as DBS systems or other neuromodulation systems, it should be understood that example embodiments disclosed herein are not limited thereto but have broad applicability. Some example remote care therapy applications requiring biometric authentication (BA) according to embodiments herein may therefore involve different types of implantable devices such as neuromuscular stimulation systems and sensors, dorsal root ganglion (DRG) stimulation systems, spinal cord stimulation (SCS) systems, cochlear implants, retinal implants, implantable cardiac rhythm management devices, implantable cardioverter defibrillators, pacemakers, and the like, as well as implantable drug delivery/infusion systems, implantable devices configured to effectuate real-time measurement/monitoring of one or more physiological functions of a patient's body (i.e., patient physiometry), including various implantable biomedical sensors and sensing systems. Further, whereas some example embodiments of BA-based therapy applications may involve implantable devices, additional and/or alternative embodiments may involve external devices and/or noninvasive/minimally invasive (NIMI) devices (e.g., wearable biomedical devices, transcutaneous/subcutaneous devices, etc.) that may be configured to provide therapy to the patients roughly analogous to the implantable devices requiring appropriate BA-based protocols in some arrangements. Accordingly, all such devices may be broadly referred to as "medical devices", "personal medical devices," "personal biomedical instrumentation," or terms of similar import, which may be controlled by an external controller device (e.g., operated by an authenticated patient, a clinician and/or their respective authorized agents) upon successful biometric authentication/authorization according to some example embodiments of the present disclosure.

As used herein, a network element, platform or node may be comprised of one or more pieces of network equipment, including hardware and software that communicatively interconnects other equipment on a network (e.g., other network elements, end stations, etc.), and is adapted to host one or more applications, resources and/or services, more specifically healthcare applications/resources and services, with respect to a plurality of end users (e.g., patients, clinicians, respective authorized agents, and associated client devices) as well as other endpoints such as medical- and/or health-oriented Internet of Medical Things (loMT) devices/sensors and/or other Industrial IoT-based entities. As such, some network elements may be operatively disposed in a cellular wireless or satellite telecommunications network, or a broadband wireline network, whereas other network elements may be disposed in a public packet-switched network infrastructure (e.g., the Internet or worldwide web, also sometimes referred to as the "cloud"), private packet-switched network infrastructures such as Intranets and enterprise networks, as well as service provider network infrastructures, any of which may span or involve a variety of access networks, backhaul and core networks in a hierarchical arrangement. In still further arrangements, one or more network elements may be disposed in cloud-based platforms or datacenters having suitable equipment running virtualized functions or applications, which may be configured for purposes of facilitating biometric authentication, remote therapy/programming, remote monitoring, and other telehealth/telemedicine applications, etc. for purposes of one or more example embodiments set forth hereinbelow.

One or more embodiments of the present patent disclosure may be implemented using different combinations of software, firmware, and/or hardware. Thus, one or more of the techniques shown in the Figures (e.g., flowcharts) may be implemented using code and data stored and executed on one or more electronic devices or nodes (e.g., a subscriber client device or end station, a network element, etc.). Such electronic devices may store and communicate (internally and/or with other electronic devices over a network) code and data using computer-readable media, such as non-transitory computer-readable storage media (e.g., magnetic disks, optical disks, random access memory, read-only memory, flash memory devices, phase-change memory, etc.), transitory computer-readable transmission media (e.g., electrical, optical, acoustical or other form of propagated signals—such as carrier waves, infrared signals, digital signals), etc. In addition, such network elements may typically include a set of one or more processors coupled to one or more other components, such as one or more storage devices (e.g., non-transitory machine-readable storage media) as well as storage database(s), user input/output devices (e.g., a keyboard, a touch screen, a pointing device, and/or a display), and network connections for effectuating signaling and/or bearer media transmission.

Although embodiments involving medical devices and digital healthcare service applications are particularly exemplified in the present patent disclosure, skilled artisans will recognize that the teachings herein are not limited thereto and may be applied in any client-server architecture or model configured to effectuate services, applications, etc., in various fields, wherein enhanced client authentication and access control based on biometric indicia is desired beyond conventional authentication protocols between a client and a server.

Figure 13:
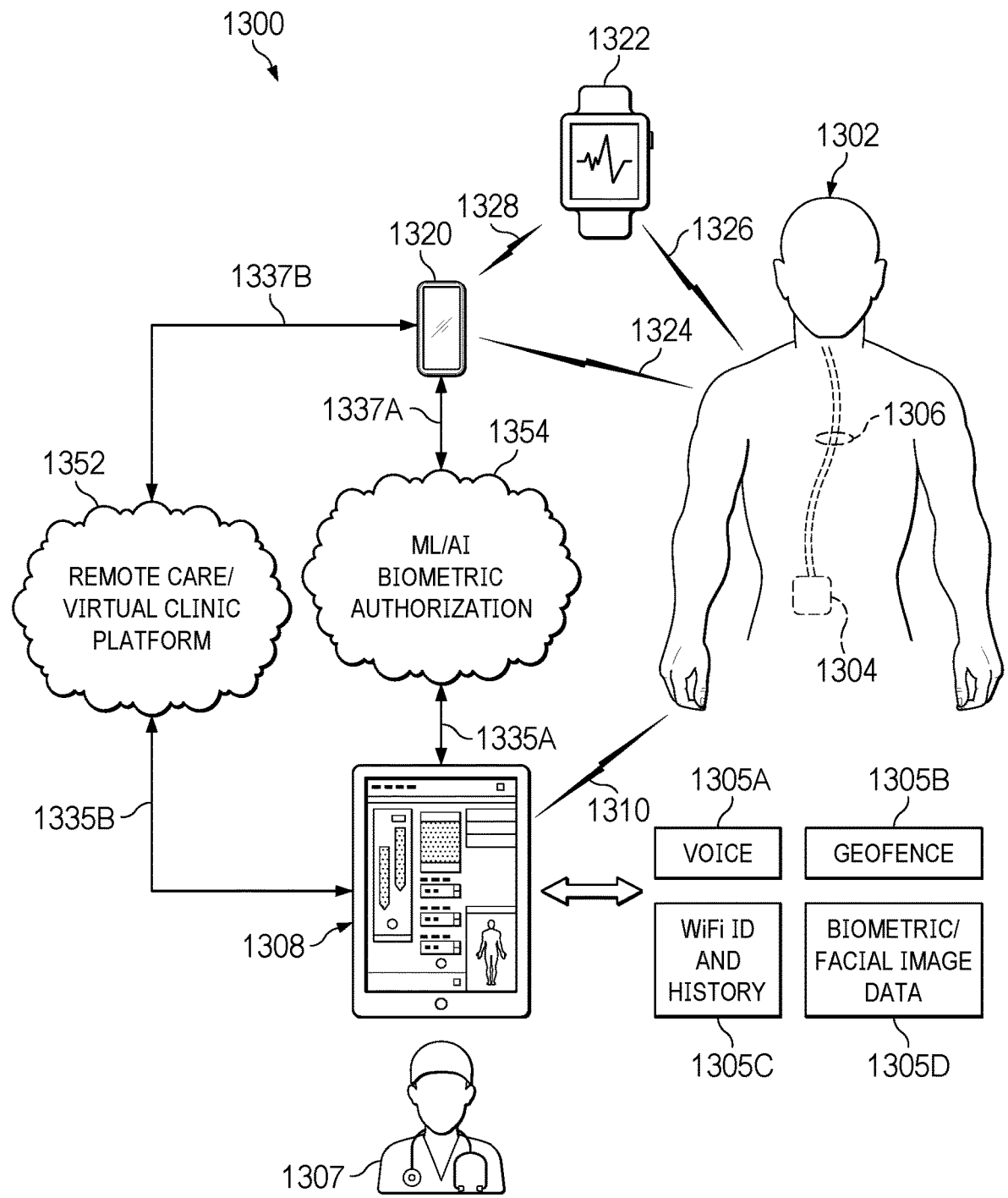
FIG. 13 depicts an example system wherein one or more biometric authentication systems may be implemented according to some representative embodiments of the present disclosure.

Taking reference to FIG. 13, shown therein is an example system wherein one or more biometric authentication (BA)-based schemes may be implemented according to some representative embodiments of the present disclosure. In one arrangement, example system 1300 may include a network-hosted BA platform 1354 configured to implement and execute an authentication scheme based on a user's biometric indicia augmented with other parametrics (e.g., access point data, location-based tagging, etc.). As will be set forth in further detail below, BA platform 1354 may include a machine learning (ML) and artificial intelligence (AI) module or engine according to some embodiments for dynamically modulating a challenge generation process based on the user's biometric indicia in order to enhance the security and robustness of the user's authentication with respect to launching a program or application on a suitable user equipment (UE) device for accessing protected resources and/or executing privileged services (e.g., therapy services). Example system 1300 is illustrative of a patient 1302 having an IMD 1304 that may be operative in association with a client programmer device 1308 and/or a patient controller device 1320, which may be controlled by a clinician 1307 or patient 1302, respectively, and/or their respective authorized agents having appropriate level(s) of privilege authorization, to administer various aspects relative to providing therapy to the patient 1302 upon gaining access based on biometric authentication. In some embodiments, a smart wearable device 1322 associated with patient 1302 may also be optionally provided that is operative with patient controller device 1320 (e.g., via a paired relationship 1328) for performing or facilitating therapy/monitoring operations contingent upon authentication and authorization based on biometric indicia. In general, devices 1308, 1320 may comprise commercial off-the-shelf (COTS) equipment such as a portable computer, smartphone, smart pad, tablet, phablet, laptop, or the like, or a proprietary portable medical/healthcare device, each device configured to execute a suitable therapy application program or "app", for effectuating various aspects disclosed herein, including BA-based login operations. Example IMD 1304 may be disposed within patient 1302 at a suitable location, e.g., within or proximate to a body portion or cavity, wherein one or more leads 1306 having distal portions with one or more electrodes may be implanted proximate to the tissue region depending on the therapy, e.g., DBS of the subthalamic nucleus (STN), the ventro-*intermedius* nucleus (VIM), the globus pallidus internus (GPi), etc. By way of example, leads 1306 may each comprise a plurality of electrodes at a distal end in a host of configurations (e.g., having ring electrodes, segmented electrodes, pad electrodes, and the like).

In some arrangements, clinician programmer device 1308, patient controller device 1320 (operating separately or in combination with wearable device 1322) may be deployed in a local therapy session in order to interact with IMD 1304 for effectuating programming operations. In some arrangements, devices 1308 and 1320 may be engaged in a remote therapy session for programming IMD 1304 via a network-based virtual clinic (VC) or remote care (RC) platform 1352. Regardless of whether a local therapy scenario, a remote therapy scenario and/or a combination therapy scenario is contemplated, example embodiments herein may involve BA-based login operations for accessing and executing medical therapy applications on respective UE devices, e.g., devices 1308/1320/1322, by the corresponding users, i.e., clinician(s) 1307 and patient(s) 1302 in accordance with the teachings herein. Further, whereas VC platform 1352 and BA platform 1354 are illustrated in FIG. 13 as separate or distributed networks, they may also be combined and/or co-located in an integrated network architecture wherein ML/AI-based BA functionality may be augmented or associated within a VC platform.

Depending on implementation, communications between external devices 1308, 1320, 1322 and IMD 1304 may be effectuated over respective short-range communication links 1310, 1324, 1326, respectively, using a variety of technologies, e.g., including but not limited to Bluetooth communications, among others. Devices 1308, 1320, 1322 may also be configured to communicate with network-based VC platform 1352 and/or BA platform 1354 using respective communication links operative with a host of network communication technologies depending on implementation. By way of example, communication links 1335A, 1335B are illustrative of links configured to effectuate network communications between clinician programmer device 1308 and BA platform 1354 and VC platform 1352, respectively. In similar fashion, communication links 1337A, 1337B are illustrative of links adapted to effectuate network communications between patient controller device 1320 and BA platform 1354 and VC platform 1352, respectively. Although not specifically shown in this FIG., some example arrangements may also include other networks and service infrastructure components such as, e.g., device provisioning and management services, application development and provisioning networks, remote push notification services, etc., that may be integrated or otherwise operative with VC platform 1352 and/or BA platform 1354 for purposes of some embodiments herein as will be set forth in detail further below.

Further, although not shown in this FIG., a variety of sensors and audio/video (A/V) devices operative with patient 1302 and/or clinician 1307 may be provided for purposes of the present disclosure, wherein at least a portion of the sensors and A/V devices may be integrated with and/or operate in association with devices 1308, 1320, 1322. As will be described in further detail below, devices 1308, 1320, 1322 may be configured to effectuate suitable graphical user interfaces (GUIs) for facilitating, inter alia, entry/receipt of various pieces of biometric data pursuant to BA-based login operations as well as launching suitable medical apps (e.g., for facilitating local and/or remote therapy programming operations) in addition to other functionalities relating to broader client-server aspects such as, e.g., uploading/retrieval of patient data, accessing patient reports, etc.

According to some embodiments, BA platform 1354 may be configured to provide authentication of users (e.g., patient 1302 and/or clinician 1307) using a plurality of biometric data operating as inherence factors in conjunction with a number of network parametrics and location-based tagging in order to effectuate a "passwordless" authentication. By way example, clinician 1307 may be authenticated without having to enter a cumbersome password, wherein a BA scheme requiring data relating to a select set of biometric factors may be utilized instead. Depending in configuration, example biometric data may comprise at least one of a 2-dimensional (2D) facial image of the clinician, a 3D facial topology of the clinician, a fingerprint of the clinician, a retina image of the clinician, an iris image of the clinician, a voice print or signature associated with the clinician, a physiological identity marker of the clinician, and a genetic identity marker of the clinician, etc., which may be captured by suitable sensors associated with clinician programmer device 1308. Examples of such biometric indicia are illustrated by voice signature 1305A and facial image data 1305D of clinician 1307 in FIG. 13. Network access point data 1305C (e.g., WiFi service set identifiers or SSIDs, etc.)

as well as a historical record of previously used access point data while accessing the device and/or the provisioned medical application thereon for providing therapy) as well as geofencing data 1305B associated with device 1308 may also be captured and forwarded to BA platform 1354 for processing in conjunction with voice signature 1305A and facial image data 1305D with respect to modulating access control.

FIG. 14 depicts a high-level architecture of a biometric authentication system 1400 wherein a dynamically adjustable challenge may be provided to a user, e.g., clinician 1402, according to some embodiments of the present disclosure. A clinician programmer (CP) device 1404 is operative to display a UI having a biometric login selection option 1422. In some arrangements, a plurality of menus, e.g., a list of patient devices 1424 that clinician 1402 may be authorized to program for therapy, one or more patient records 1426, and a mode selector 1428 may also be provided, any of which may be activated only upon a successful biometric authentication/login operation. Upon selection of biometric login 1422, clinician 1402 may be prompted to provide a voice signature 1410 (e.g., speaking a phrase or a sentence into a microphone of CP device 1404). A camera associated with CP 1404 may also be actuated responsive to selecting biometric login 1422 for capturing facial image data 1412. Access point (AP) data such as WiFi data 1408 and geofencing data 1414 associated with where CP device 1404 is located may also be gathered based on known and/or heretofore unknown techniques. In some arrangements, a geofence may be determined as a virtual perimeter corresponding to a real-world geographic location or area that may be dynamically generated (e.g., as a radius around a point location) or constructed as a region that matches a predefined set of boundaries (e.g., corresponding to previously vetted/validated areas such as the clinician's office, a hospital associated with the clinician, etc. (i.e., a white list) or new or previous areas that may be in a gray list or a black list based on predetermined criteria).

Depending on implementation, the collected data may be forwarded to an AI/ML-based authentication engine disposed in a network 1406 that may comprise a local intranet, a private network, an enterprise network, a service provider network, or a public network such as the internet, etc. In some arrangements, a score associated with each input may be computed, determined or otherwise obtained, which may be used in determining a complexity level of a challenge 1432 that may be provided to clinician 1402. A response 1434 provided by clinician 1402 may be interrogated for validation by the AI/ML authentication engine, whereupon a suitable message may be provided responsive to successful validation.

Although a select biometric and non-biometric indicia have been have been exemplified as input parameters in the foregoing scheme for authenticating a clinician, it will be recognized that in various permutations and combinations other input parameters as well as (additional) users such as patients may be involved in a biometric authentication system according to some example embodiments herein. Further, where multiple users are biometrically authenticated, different sets of input parameters may be applied by one or more AI/ML authentication engines with respect to different users in some example embodiments.

FIGS. 15A-15E are flowcharts depicting blocks, acts, functions or acts that may be (re) combined with or without other flowcharts of the present disclosure for effectuating biometric authentication as part of providing therapy according to some embodiments. In general, example methods and processes set forth herein are broadly directed to methods of remotely programming an implantable medical device (IMD) that provides therapy to a patient based on biometric authentication. An example embodiment may comprise: establishing a first communication between a PC device and the implantable medical device, wherein the implantable medical device provides therapy to the patient according to one or more programmable parameters, the PC device communicates signals to the implantable medical device to set or modify the one or more programmable parameters, and the PC device comprises a video camera; establishing a video connection between the PC device and a CP device of a clinician for a remote programming session in a second communication that includes an audio/video (A/V) session; and modifying a value for one or more programmable parameters of the implantable medical device according to signals from the CP device during the remote programming session, wherein the example method may further comprise various operations relative to biometric authentication of a clinician, a patient or both. In some implementations, the operations may also include enrollment of a party (e.g., clinicians/patients or respective agents thereof) for biometric authentication, as will be seen further below. At least a portion of the foregoing steps, acts or operations may be included as part of example process flows set forth below according to some embodiments.

Figure 15A:
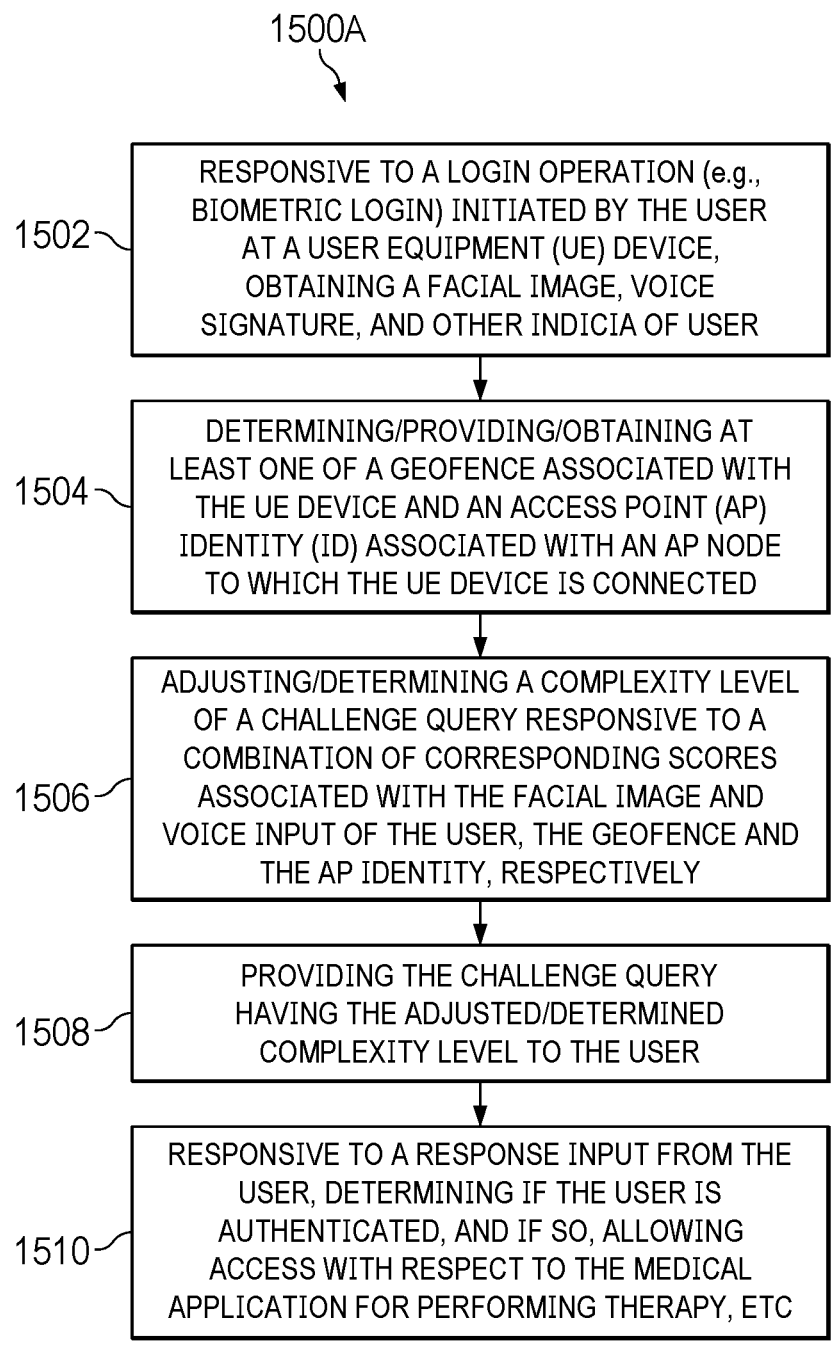
FIGS. 15A-15E are flowcharts depicting blocks, acts, functions or acts that may be (re) combined with or without other flowcharts of the present disclosure for effectuating biometric authentication according to some embodiments.

Example process 1500A shown in FIG. 15A is representative of a method of facilitating authentication of a user (e.g., a clinician or patient) operating a UE device configured to execute a medical application operative for providing therapy to a patient by interacting with an IMD of the patient. It will be appreciated by skilled artisans that the terms "IMD", IPG" or terms of similar import as used herein may also include NIMI devices for purposes of some example embodiments unless otherwise stated. At block 1502, responsive to a login operation initiated by the user at the UE device, a facial image of the user and a voice input may be obtained from the user. At block 1504, at least one of a geofence associated with the UE device and an access point (AP) identity (ID) associated with an AP node to which the UE device is connected may be determined or otherwise obtained. At block 1506, a complexity level of a challenge query may be determined, adjusted, or otherwise obtained responsive to a combination of scores corresponding to or associated with the facial image and voice input of the user, the geofence and the AP identity, respectively. At block 1508, the challenge query having the adjusted complexity level may be provided to the user. Responsive to a response input from the user, a determination may be made if the user is allowed access with respect to the medical application as set forth at block 1510. In some variations, a historical record of AP IDs associated with network connections previously established by the UE device with respect to the medical application may be obtained. Responsive thereto, the complexity level of a challenge query may be further based on the historical record of the AP IDs. For example, authentication and login operations relative to certain SSIDs and/or white listed geofences may generate challenge queries having lower complexity levels that require simpler responses, thereby providing "frictionless" or low friction authentication for users while still maintaining appropriate security levels.

Figure 15B:
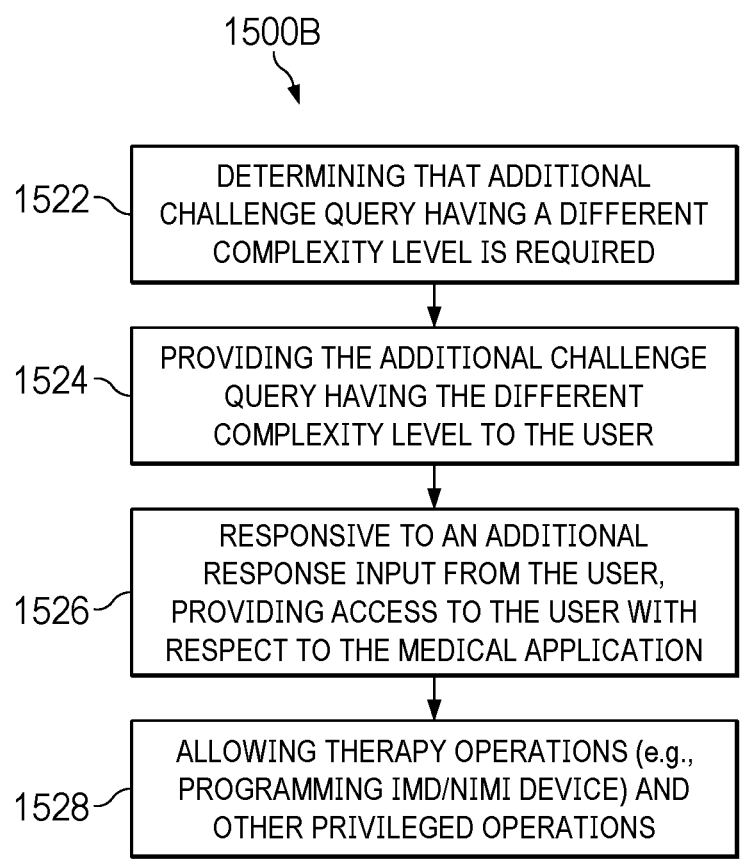

In some embodiments, an example process may further involve determining whether an additional challenge query having a different complexity level is required as set forth at block 1522 of process flow 1500B depicted in FIG. 15B. For example, depending on the scores corresponding to a set of the input factors and/or prior challenge response results, a determination may be made by an AI/ML authentication engine that a subsequent challenge is needed. Responsive thereto, an additional challenge query having different complexity level may be provided to the user as set forth at block 1524. Responsive to an additional response input received from the user, a validation may be performed prior to providing access to the user with respect to a protected resource and/or operation (e.g., launching a medical therapy application) as set forth at block 1526. Thereafter, the user may be allowed to perform one or more therapy operations (e.g., programming a patient's IMD/NIMI device) as set forth at block 1528. In some example embodiments, the therapy operations may be executed in a local therapy session or in a remote therapy session depending on implementation and/or mode selection as will be set forth in further below.

Figure 15C:
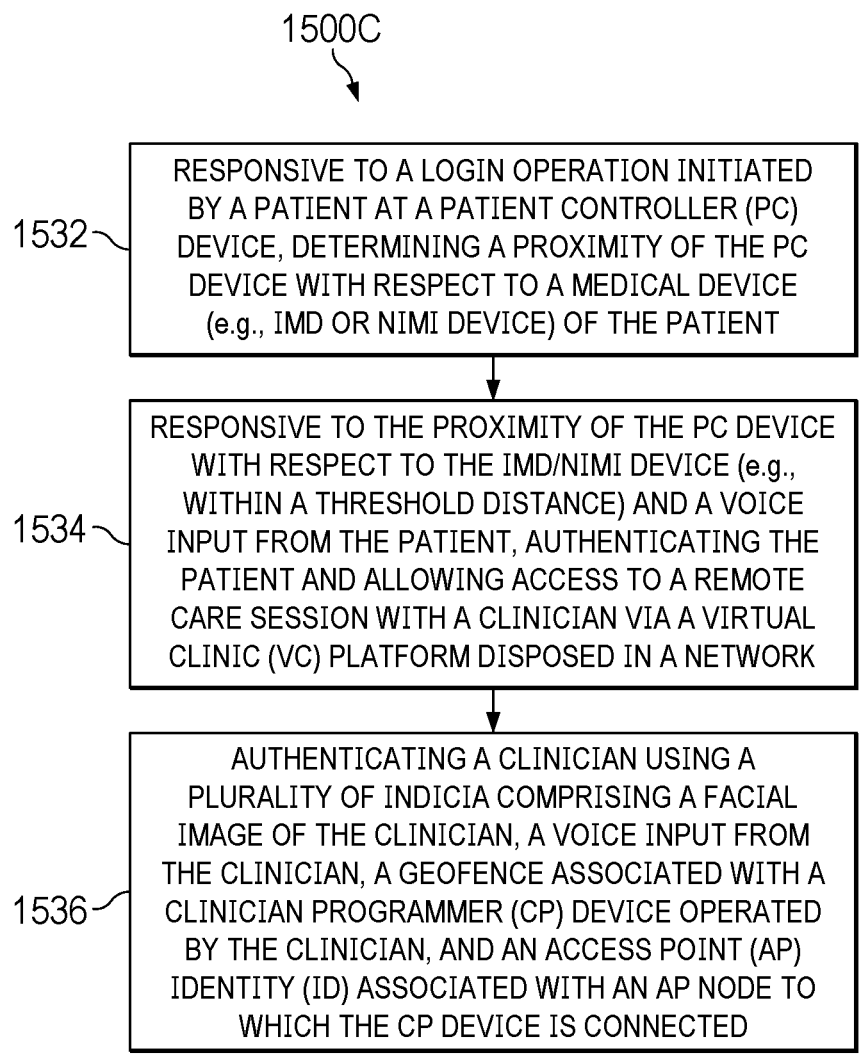

Example process 1500C shown in FIG. 15C is representative of a method of facilitating authentication of a patient operating a patient controller (PC) device configured to execute a medical application operative for providing therapy to a patient by interacting with an IMD of the patient. Responsive to a login operation initiated by the patient at the PC device, a determination of a proximity of the PC device with respect to the IMD of the patient may be made (block 1532). Responsive to the proximity determination of the PC device with respect to the IMD and biometric indicia input (e.g., a voice input) from the patient, the patient may be authenticated by an AI/ML authentication engine, whereupon the patient may be allowed to launch a remote care session with a clinician via a VC platform disposed in a network (block 1534). In some variations, example process 1500C may optionally comprise authenticating the clinician using a plurality of indicia such as, e.g., a facial image of the clinician, a voice input from the clinician, a geofence associated with a clinician programmer (CP) device operated by the clinician, and an AP ID and/or network conditions associated with an AP node to which the CP device is connected, as set forth at block 1536. Responsive to determining that the clinician is authenticated, a remote care session may be established with the patient using the VC platform. Thereafter, remote programming of the IMD may be performed by the clinician for providing therapy to the patient. In some further variations, an example process may optionally involve, responsive to determining that the patient and the clinician are authenticated, the PC device may be paired with a smart wearable medical device associated with the patient. Also, the patient's health data may be transferred or retrieved from the smart wearable medical device to the CP device depending on authorization privileges according to some example embodiments.

Figure 15D:
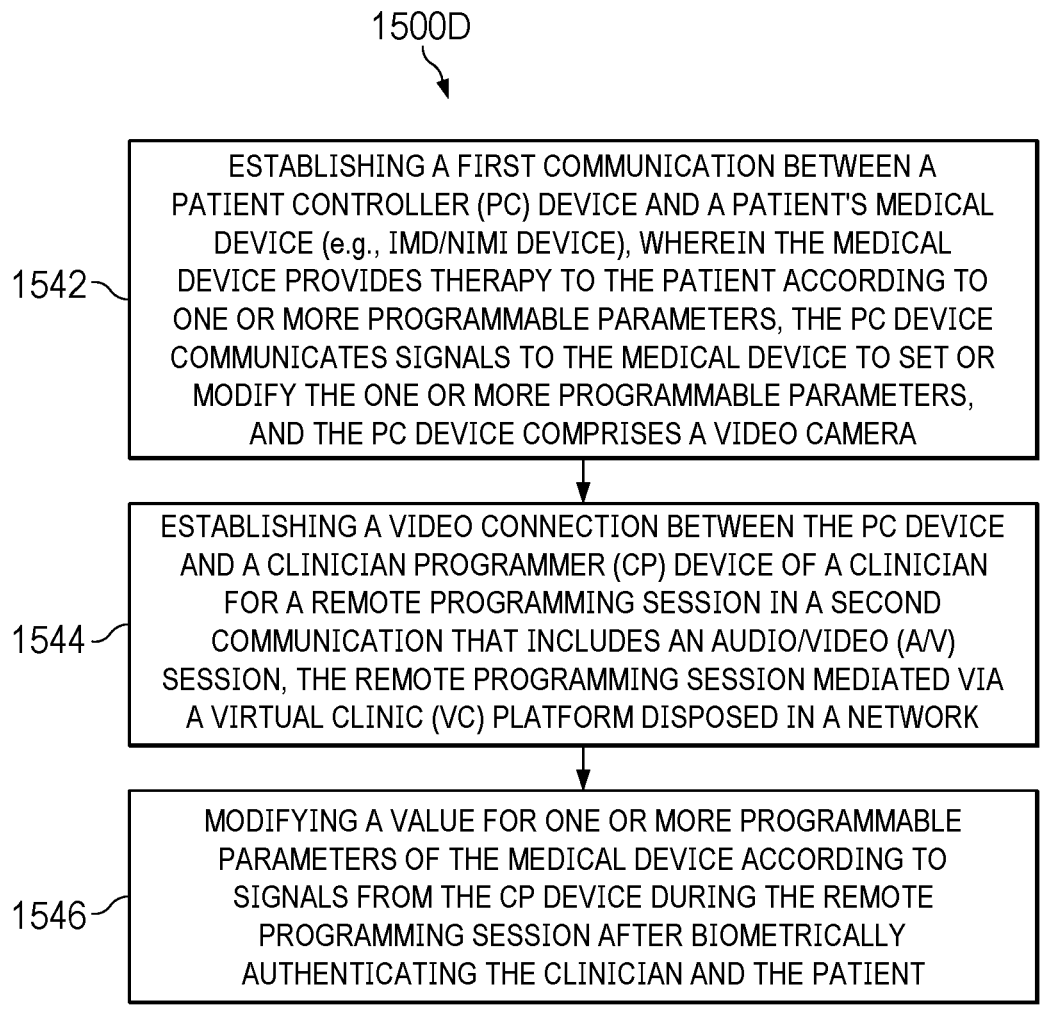
Figure 15E:
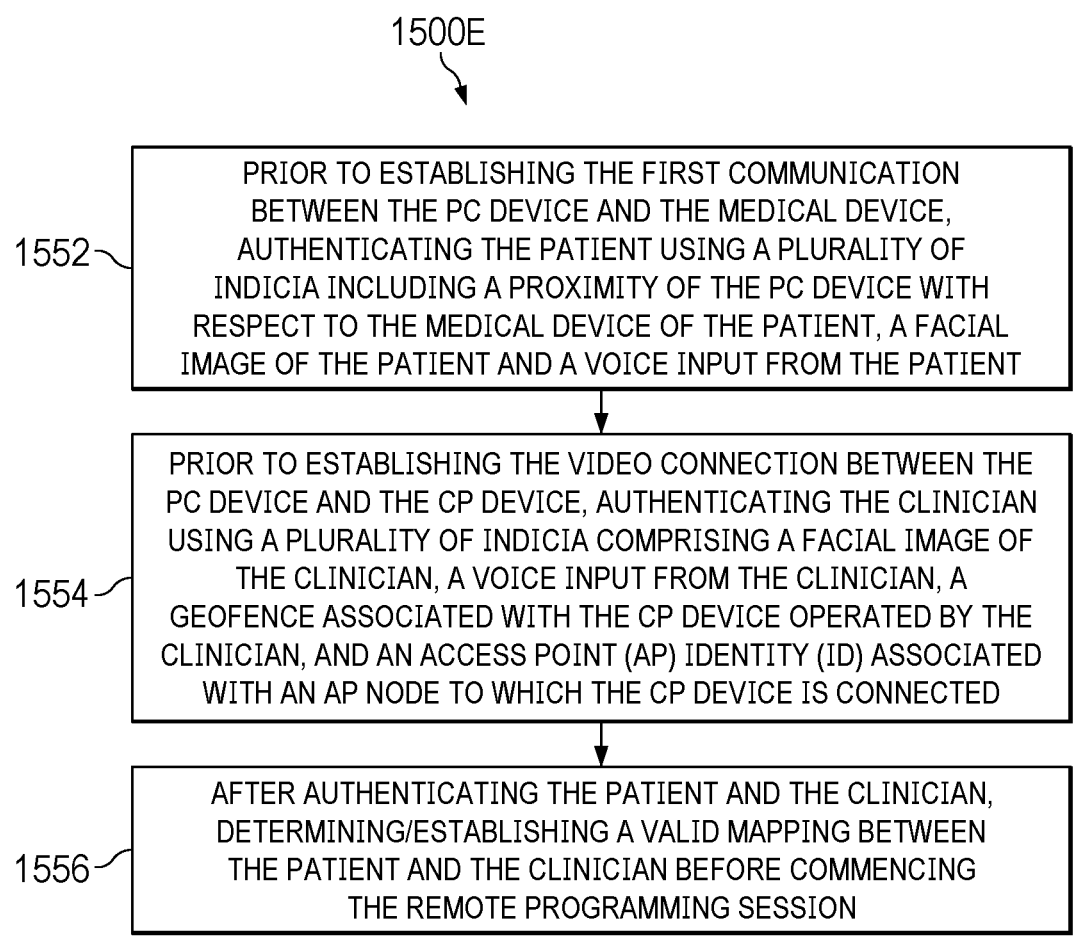

FIGS. 15D and 15E depict a method of remotely programming a medical device that provides therapy to a patient. At block 1542 of example process flow 1500D, a first communication between a PC device and the medical device (e.g., an IMD/NIMI device) may be established, wherein the medical device is configured to provides therapy to the patient according to one or more programmable parameters. The PC device, comprising A/V equipment such as a camera, microphone, etc., is operative to communicate signals to the medical device to set or modify the one or more programmable parameters. At block 1544, a video connection between the PC device and a CP device of a clinician may be established for a remote programming session in a second communication that includes an A/V session, wherein the remote programming session may be mediated via a VC platform disposed in a network as will be set forth in further detail below. At block 1546, a value for one or more programmable parameters of the medical device may be modified according to signals from the CP device during the remote programming session.

In some embodiments, a method of remotely programming a medical device may further comprise, prior to establishing the first communication between the PC device and the medical device, authenticating the patient using a plurality of indicia including a proximity of the PC device with respect to the medical device of the patient, a facial image of the patient and a voice input from the patient, as set forth at block 1552 of process flow 1500E shown in FIG. 15E. Further, prior to establishing the video connection between the PC device and the CP device, the clinician may be authenticated using a plurality of indicia as previously noted (block 1554). After authenticating the patient and the clinician based on respective biometric indicia, a mapping or association between the patient and the clinician may be created and/or validated before commencing a remote programming session therebetween (block 1556).

In some example arrangements, one or more embodiments set forth above may be practiced within the context of an implementation of a cloud-centric digital healthcare network architecture as previously noted. For purposes of some aspects of the present disclosure, a digital healthcare network architecture may involve various network-based components, subsystems, service nodes etc., as well as myriad end user deployments concerning patients, clinicians and authorized third-party agents as exemplified in FIG. 12, wherein one or more embodiments of the present patent disclosure may be practiced for providing BA-based access control according to some implementations. In one arrangement, example architecture 1260 may include one or more virtual clinic platforms 1214, remote data logging platforms 1216, patient/clinician report processing platforms 1218, as well as data analytics platforms 1220 and security/authentication platforms 1222, at least some of which may be configured and/or deployed as an integrated digital health infrastructure 1212 for effectuating some example embodiments of the present disclosure. One or more pools of patients having a myriad of health conditions and/or receiving assorted treatments, including neurostimulation therapies such as DBS, SCS, DRG, etc., who may be geographically distributed in various locations, areas, regions, and the like, are collectively shown at reference numeral 1204, wherein individual patients may be provided with one or more suitable IMDs/IPGs, NIMI devices, other personal biomedical instrumentation, etc., depending on respective patients' health conditions and/or treatments. A plurality of CP devices 1208, PC devices 1210, and authorized third-party devices 1211 associated with respective users (e.g., clinicians, medical professionals, patients and authorized agents thereof) may be deployed as external devices 1206 that may be configured to interact with patients' IMDs and/or NIMI devices for effectuating therapy, monitoring, data logging, secure file access and transfer, etc., via local communication paths or over network-based remote communication paths established in conjunction with the digital health infrastructure network 1212 upon suitable BA authentication that may be implemented in association with one or more components of network 1212.

Example CP device 1208 may permit programming of an IPG (e.g., IPG 170/108 described further below or IMD 1304 set forth above in FIG. 13) to provide a number of different stimulation patterns or therapies to the patient as appropriate for a given patient and/or disorder. For purposes of the present disclosure, reference to and description of a particular IPG depicted in a drawing Figure may generally apply to other IPGs/IMDs illustrated in other drawing Figures, mutatis mutandis, unless otherwise stated. In general, examples of different stimulation therapies may include conventional tonic stimulation (continuous train of stimulation pulses at a fixed rate), BurstDR stimulation (burst of pulses repeated at a high rate interspersed with quiescent periods with or without duty cycling), "high frequency" stimulation (e.g., a continuous train of stimulation pulses at 10,000 Hz), noise stimulation (series of stimulation pulses with randomized pulse characteristics such as pulse amplitude to achieve a desired frequency domain profile). Any suitable stimulation pattern or combination thereof can be provided by IPG 170 according to some embodiments. CP device 1208 may be configured to communicate the stimulation parameters and/or a series of pulse characteristics defining the pulse series to be applied to the patient to IPG 170 to generate the desired stimulation therapy.

IPG 170 may be adapted to apply a variety of neurostimulation therapies while CP device 1208 may send appropriate signals to IPG 170 related to such therapies. Examples of suitable therapies include tonic stimulation (in which a fixed frequency pulse train is generated), burst stimulation (in which bursts of multiple high frequency pulses are generated), which in turn are separated by quiescent periods, "high frequency" stimulation, multi-frequency stimulation, and noise stimulation. Descriptions of respective neurostimulation therapies are provided in the following publications: (1) Schu S., Slotty P. J., Bara G., von Knop M., Edgar D., Vesper J. A Prospective, Randomised, Double-blind, Placebo-controlled Study to Examine the Effectiveness of Burst Spinal Cord Stimulation Patterns for the Treatment of Failed Back Surgery Syndrome. Neuromodulation 2014; 17:443-450; (2) Al-Kaisy A1, Van Buyten J P, Smet I, Palmisani S, Pang D, Smith T. 2014. Sustained effectiveness of 10 KHz high-frequency spinal cord stimulation for patients with chronic, low back pain: 24-month results of a prospective multicenter study. Pain Med. 2014 March; 15 (3): 347-54; and (3) Sweet, Badjatiya, Tan D1, Miller. Paresthesia-Free High-Density Spinal Cord Stimulation for Postlaminectomy Syndrome in a Prescreened Population: A Prospective Case Series. Neuromodulation. 2016 April; 19 (3): 260-7. Noise stimulation is described in U.S. Pat. No. 8,682,441. Burst stimulation is described in U.S. Pat. No. 8,224,453 and U.S. Published application No. 20060095088. A "coordinated reset" pulse pattern is applied to neuronal subpopulation/target sites to desynchronize neural activity in the subpopulations. Coordinated reset stimulation is described, for example, by Peter A. Tass et al in COORDINATED RESET HAS SUSTAINED AFTER EFFECTS IN PARKINSONIAN MONKEYS, Annals of Neurology, Volume 72, Issue 5, pages 816-820, November 2012, which is incorporated herein by reference. The electrical pulses in a coordinated reset pattern are generated in bursts of pulses with respective bursts being applied to tissue of the patient using different electrodes in a time-offset manner. The time-offset is selected such that the phase of the neural-subpopulations are reset in a substantially equidistant phase-offset manner. By resetting neuronal subpopulations in this manner, the population will transition to a desynchronized state by the interconnectivity between the neurons in the overall neuronal population. All of these references are incorporated herein by reference.

In one arrangement, example architecture 1260 may encompass a hierarchical/heterogeneous network arrangement comprised of one or more fronthaul radio access network (RAN) portions or layers, one or more backhaul portions or layers, and one or more core network portions or layers, each of which may in turn include appropriate telecommunications infrastructure elements, components, etc., cooperatively configured for effectuating a digital healthcare ecosystem involving patients' IMDs and/or NIMI devices 1204, external devices 1206, and one or more components of the digital health infrastructure network 1212, wherein at least a portion of the components of the infrastructure network 1212 may be operative as a cloud-based system for purposes of some embodiments herein. Further, at least a portion of the components of the digital health infrastructure network 1212, one or more patients' IMDs and/or NIMI devices 1204, and one or more external devices 1206 may be configured as a system 1200 to execute suitable medical/health software applications in a cooperative fashion (e.g., in a server-client relationship) for effectuating various aspects of remote patient monitoring, telemedicine/telehealth applications, remote care therapy, etc. contingent upon or responsive to biometric authentication as set forth herein.

Figure 12:
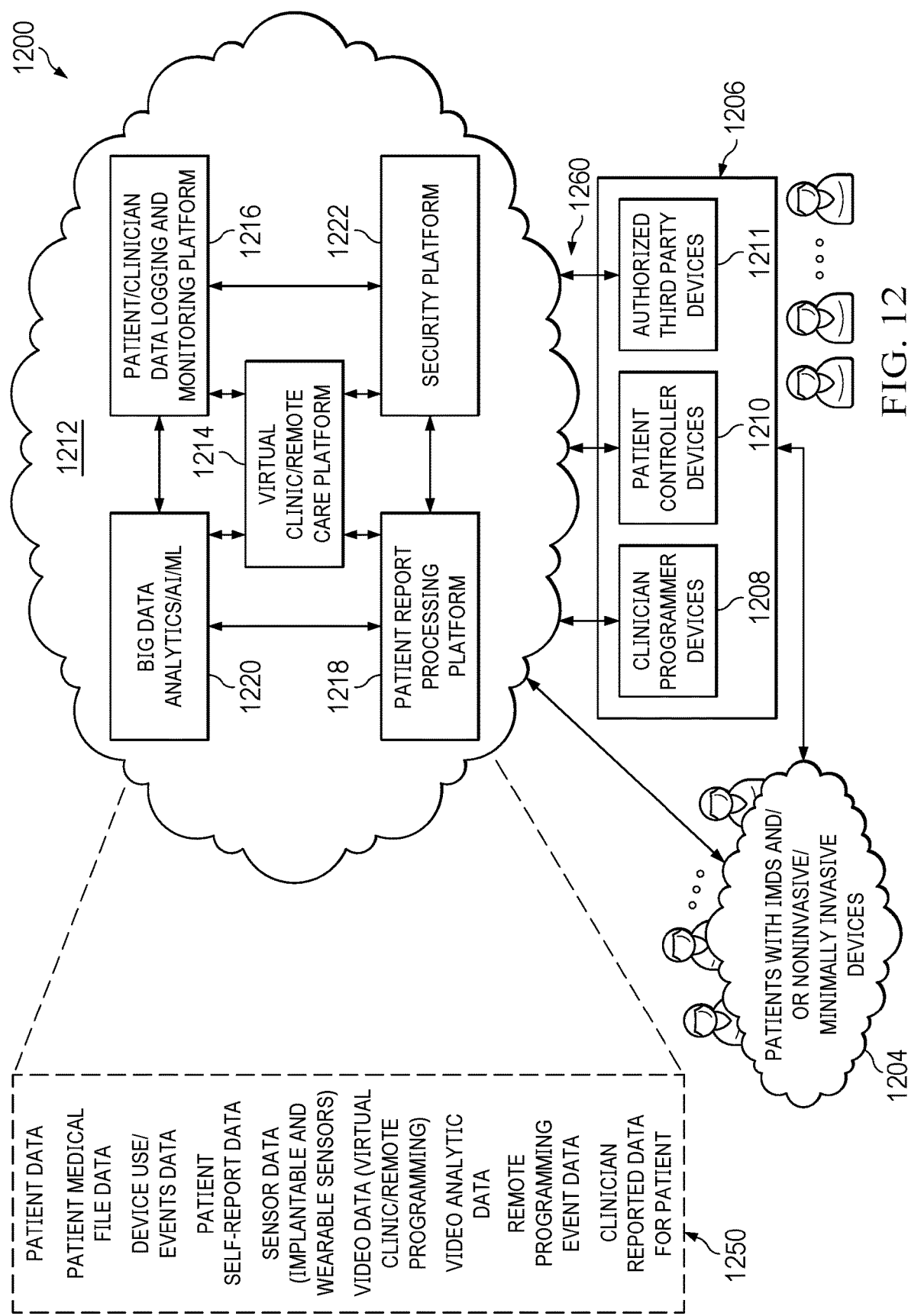
FIG. 12 depicts an example cloud-centric digital healthcare network environment wherein various UE devices may interact with one or more servers forming at least a portion of one or more virtual clinic platforms, patient report processing platforms and remote data logging platforms based on biometric authentication according to some representative embodiments of the present disclosure.

Although not specifically shown in FIG. 12, example PC devices 1210 may be configured to interoperate with smart wearable devices, e.g., wearable device 1322 depicted in FIG. 13, for various purposes relating to therapy, data monitoring, data logging, file storage/transfer, etc., as previously mentioned. Further, such interactions between example PC device 1208 and associated smart wearable devices may be contingent upon appropriate BA-based login operations in some embodiments.

In an example implementation, a representative external wearable device such as, e.g., device 1322 shown in FIG. 13, may comprise a smartwatch, a health monitoring device, etc. According to some embodiments, a wearable device may be implemented using commercially available devices such as FITBIT VERSA SMARTWATCH™, SAMSUNG GALAXY SMARTWATCH™, and APPLE WATCH™ devices with one or more apps or appropriate software to interact with IPG 150 and/or PC device(s) 1210. In some embodiments, wearable device 1322, example PC device 1210/1320, and IPG 170/1304 may conduct communications using BLUETOOTH communications.

In some arrangements, wearable device 1322 may be configured to monitor activities of a patient (e.g., patient 1302) and/or sense physiological signals. Wearable device 1322 may track physical activity and/or patient movement through accelerometers. Wearable device 1322 may also be configured to monitor body temperature, heart rate, electrocardiogram activity, blood oxygen saturation, and/or the like, depending on implementation. Further, wearable device 1322 may monitor sleep quality or any other relevant health related activity of a patient in some scenarios.

In some arrangements, wearable device 1322 may provide one or more user interface screens to permit the patient to control or otherwise interact with IPG 170/1304 responsive to a successful BA-based login operation according to some embodiments herein. For example, the patient may increase or decrease stimulation amplitude, change stimulation programs, turn stimulation on or off, and/or the like using wearable device 1322. Also, the patient may check the battery status of other implant status information using wearable device 1322.

In some arrangements, wearable device 1322 may include one or more interface screens to receive patient input upon biometric authentication. In some embodiments, wearable device 1322 and/or PC device 1210/1320 may be implemented (individually or in combination) to provide an electronic patient diary function. For example, the patient diary function may permit the patient to record on an ongoing basis the health status of the patient and the effectiveness of the therapy for the patient. In some deployment scenarios, wearable device 1322 and/or PC device 1210/1320 may be configured to enable the user to indicate various conditions or variables relating to a therapy, e.g., the current activity of the patient, the beginning of an activity, the completion of an activity, the ease or quality of patient's experience with a specific activity, the patient's experience of pain, the patient's experience of relief from pain by the stimulation, or any other relevant indication of patient health by the patient.

Additional details with respect to the various constituent components of the digital health infrastructure 1212, example external devices 1206 comprising CP devices 1208, PC devices 1210 and/or third-party devices 1211, as well as various interactions involving the network-based entities and the end points (also referred to as edge devices) will be set forth immediately below in order to provide an example architectural framework wherein one or more of the embodiments may be implemented for providing biometry-based authentication and login operations in different contextual settings according to the teachings herein.

Turning to FIG. 1A, depicted therein is an example architecture of a system configured to support remote patient therapy as part of an integrated remote care service session in a virtual clinic environment that may be deployed in a cloud-centric digital health implementation for purposes of an embodiment of the present patent disclosure. As used herein, a "remote care system" may describe a healthcare delivery system configured to support a remote care service over a network in a communication session between a patient and a clinician wherein telehealth or telemedicine applications involving remote medical consultations as well as therapy applications involving remote programming of the patient's IMD may be launched via a unified application interface facilitated by one or more network entities (e.g., as a virtual clinic or VC platform). In some arrangements, a remote care system may also include a remote patient monitoring system and/or a remote healthcare provisioning system without the involvement of a clinician. In still further arrangements, a remote care system may include one or more AI-based expert systems or agents, e.g., involving supervised learning, that may be deployed in a network to provide or otherwise augment the capabilities of a system to effectuate enhanced healthcare solutions relating to diagnosis, remote learning, therapy selection, as well as facilitate network-based solutions for enhancing patients' overall well-being. In some aspects, remote care therapy may involve any care, programming, or therapy instructions that may be provided by a doctor, a medical professional or a healthcare provider, and/or their respective authorized agents, collectively referred to as a "clinician", using a suitable clinician device, with respect to the patient's IMD, wherein such therapy instructions may be mediated, proxied or otherwise relayed by way of a controller device and/or a wearable device associated with the patient. As illustrated, example remote care system 100A may include a plurality of PC devices exemplified by device 150 and a plurality of CP devices exemplified by device 180 (also referred to as a clinician programmer or clinician device) that may interact with a network-based infrastructure via respective communication interfaces. Example patient and clinician devices may each include a corresponding remote care service application module, e.g., a patient controller application 152 and a clinician programmer/controller application 182, executed on a suitable hardware/software platform for supporting a remote care service that may be managed by a network entity 155. In some embodiments, example network entity 155 may comprise a distributed datacenter or cloud-based service infrastructure (e.g., disposed in a public cloud, a private cloud, or a hybrid cloud, involving at least a portion of the Internet) operative to host a remote care session management service 157. In one arrangement, patient controller application 152 and clinician programmer application 182 may each include a respective remote session manager 154, 184 configured to effectuate or otherwise support a corresponding communication interface 160, 190 with network entity 155 using any known or heretofore unknown communication protocols and/or technologies. In one arrangement, interfaces 160, 190 are each operative to support an audio/video or audiovisual (AV) channel or session 163A, 163B and a remote therapy channel or session 165A, 165B, respectively, with an AV communication service 161A and a remote therapy session service 161B of the remote care session management service 157 as part of a common bi-directional remote care session 159, 199 established therewith. In one arrangement, patient controller application 152 and clinician programmer application 182 may each further include or otherwise support suitable graphical user interfaces (GUIs) and associated controls 156, 186, as well as corresponding AV managers 158, 188, each of which may be interfaced with respective remote session managers 154, 184 for purposes of one or more embodiments of the present disclosure as will be set forth in additional detail further below. Remote care session manager 154 of the patient controller application 152 and remote care session manager 184 of the clinician programmer application 182 may each also be interfaced with a corresponding data logging manager 162, 186 for purposes of still further embodiments of the present disclosure. In one arrangement, remote care session manager 154 of patient controller application 152 is further interfaced with a security manager 164, which may be configured to facilitate secure or trusted communication relationships with the network entity 155. Likewise, remote care session manager 184 of clinician programmer application 182 may also be interfaced with a security manager 188 that may be configured to facilitate secure or trusted communication relationships with the network entity 155. Each security manager 164, 188 may be interfaced with a corresponding therapy communication manager 166, 190 with respect to facilitating secure therapy communications between the clinician programmer device 180 and the patient controller device 150. Therapy communication manager 166 of the patient controller application 152 may also interface with a local communication module 168 operative to effectuate secure communications with the patient's IPG/IMD 170 using a suitable short-range communications technology or protocol. In still further arrangements, security managers 164, 188 of patient controller and clinician programmer applications 152, 182 may be configured to interface with the remote care session management service 157 to establish trusted relationships between patient controller device 150, clinician programmer device 180 and IPG/IMD 170 based on the exchange of a variety of parameters, e.g., trusted indicia, cryptographic keys and credentials, etc.

In one arrangement, the integrated remote care session management service 157 may include a session data management module 171, an AV session recording service module 175 and a registration service module 183, as well as suitable database modules 173, 185 for storing session data and user registration data, respectively. In some arrangements, at least part of the session data may include user-characterized data relating to AV data, therapy settings data, network contextual data, and the like, for purposes of still further embodiments of the present patent disclosure.

Skilled artisans will realize that example remote care system architecture 100A set forth above may be advantageously configured to provide both telehealth medical consultations as well as therapy instructions over a communications network while the patient and the clinician/provider are not in close proximity of each other (e.g., not engaged in an in-person office visit or consultation). Accordingly, in some embodiments, a remote care service of the present disclosure may form an integrated healthcare delivery service effectuated via a common application user interface that not only allows healthcare professionals to use electronic communications to evaluate and diagnose patients remotely but also facilitates remote programming of the patient's IPG/IMD for providing appropriate therapy, thereby enhancing efficiency as well as scalability of a delivery model. Additionally, example remote care system architecture 100A may be configured to effectuate various other aspects relating to remote learning, remote patient monitoring, etc., contingent upon BA-based logging operations as noted above. Further, an implementation of example remote care system architecture 100A may involve various types of network environments deployed over varying coverage areas, e.g., homogenous networks, heterogeneous networks, hybrid networks, etc., which may be configured or otherwise leveraged to provide patients with relatively quick and convenient access to diversified medical expertise that may be geographically distributed over large areas or regions, preferably via secure communications channels in some example embodiments as will be set forth in detail further below.

Figure 1B:
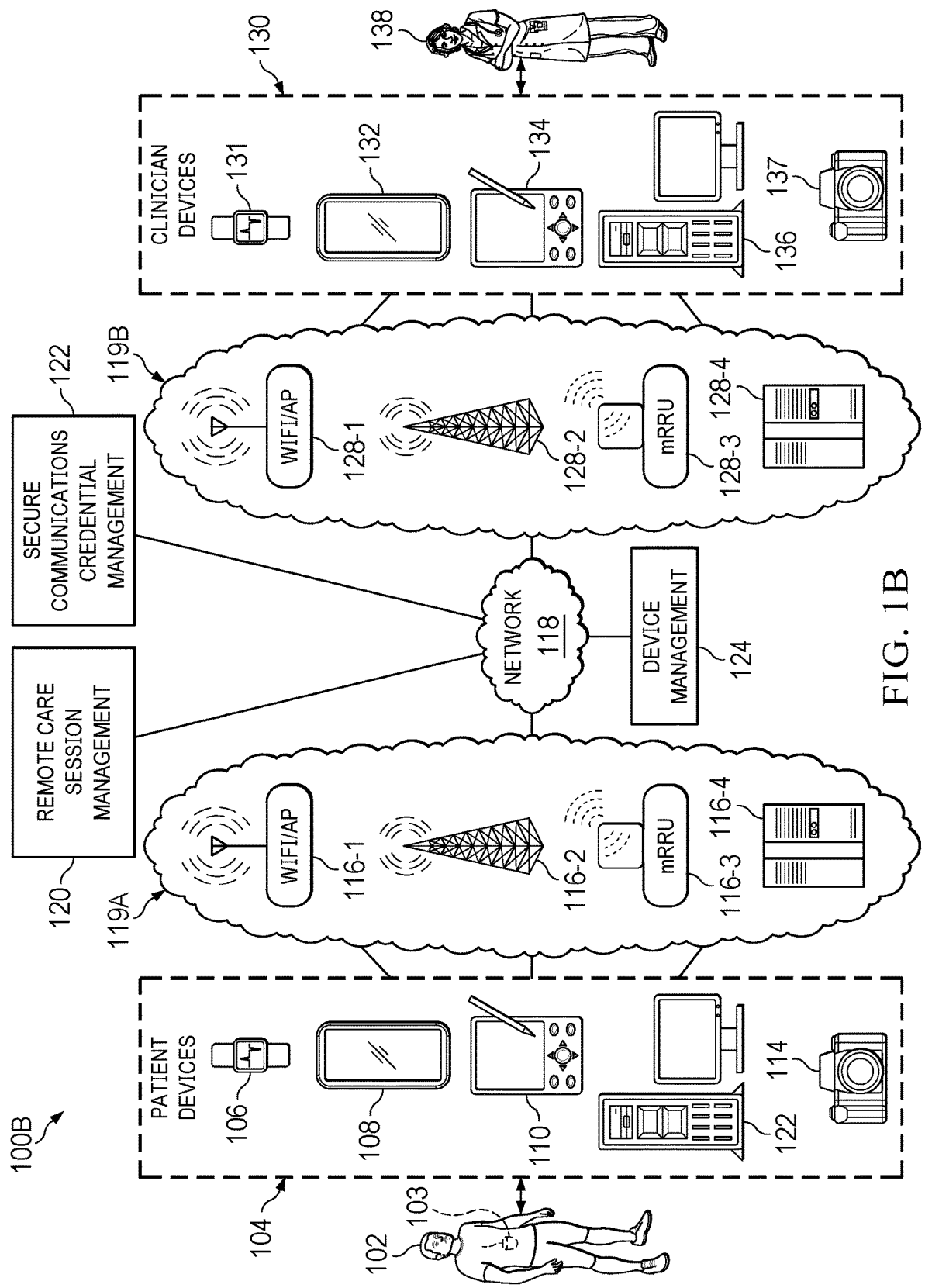
FIG. 1B depicts an example network environment wherein the VC architecture of FIG. 1A may be implemented according to a representative embodiment.

FIG. 1B depicts an example network environment 100B wherein the remote care service architecture of FIG. 1A may be implemented according to some embodiments. Illustratively, example network environment 100B may comprise any combination or sub-combination of a public packet-switched network infrastructure (e.g., the Internet or worldwide web, also sometimes referred to as the "cloud", as noted above), private packet-switched network infrastructures such as Intranets and enterprise networks, health service provider network infrastructures, and the like, any of which may span or involve a variety of access networks, backhaul and core networks in an end-to-end network architecture arrangement between one or more patients, e.g., patient(s) 102, and one or more authorized clinicians, healthcare professionals, or agents thereof, e.g., generally represented as caregiver(s) or clinician(s) 138. Example patient(s) 102, each having one or more suitable implantable and/or NIMI devices, e.g., IMD 103, may be provided with a variety of corresponding external devices for controlling, programming, otherwise (re) configuring the functionality of respective implantable device(s) 103, as is known in the art. Such external devices associated with patient(s) 102, referred to herein as patient devices 104, which are representative of PC device 150 shown in FIG. 1A, may comprise a variety of UE devices, tethered or untethered, that may be configured to engage in remote care sessions involving telehealth and/or therapy sessions according to some embodiments described below. By way of example, patient devices 104 may comprise COTS equipment or proprietary portable medical/healthcare devices (non-COTS equipment), as previously noted. In some arrangements, patient devices 104 may be configured to execute a therapy/digital healthcare application program or "app" provided by a variety of developers, wherein various types of communications relating to control, therapy/diagnostics, and/or device file management may be effectuated for purposes of some embodiments. Accordingly, example patient devices 104 may include, in addition to proprietary medical devices, devices such as smartphones, tablets or phablets, laptops/desktops, handheld/palmtop computers, wearable devices such as smart glasses and smartwatches, personal digital assistant (PDA) devices, smart digital assistant devices, etc., any of which may operate in association with one or more virtual assistants, smart home/office appliances, smart TVs, external/auxiliary AV equipment, virtual reality (VR), mixed reality (MR) or augmented reality (AR) devices, and the like, which are generally exemplified by wearable device(s) 106, smartphone(s) 108, tablet(s)/phablet(s) or smart pads 110, computer(s) 112, and AV equipment 114. As such, example patient devices 104 may include various types of communications circuitry or interfaces to effectuate wired or wireless communications, short-range and long-range radio frequency (RF) communications, magnetic field communications, etc., using any combination of technologies, protocols, and the like, with external networked elements and/or respective implantable devices 103 corresponding to patient(s) 102. With respect to networked communications, patient devices 104 may be configured, independently or in association with one or more digital/virtual assistants, smart home/premises appliances and/or home networks, to effectuate mobile communications using technologies such as Global System for Mobile Communications (GSM) radio access network (GRAN) technology, Enhanced Data Rates for Global System for Mobile Communications (GSM) Evolution (EDGE) network (GERAN) technology, 4G Long Term Evolution (LTE) technology, Fixed Wireless technology, 5th Generation Partnership Project (5GPP or 5G) technology, Integrated Digital Enhanced Network (IDEN) technology, WiMAX technology, various flavors of Code Division Multiple Access (CDMA) technology, heterogeneous access network technology, Universal Mobile Telecommunications System (UMTS) technology, Universal Terrestrial Radio Access Network (UTRAN) technology, All-IP Next Generation Network (NGN) technology, as well as technologies based on various flavors of IEEE 802.11 protocols (e.g., WiFi), and other access point (AP)-based technologies and microcell-based technologies involving small cells, femtocells, picocells, etc. Further, some embodiments of patient devices 104 may also include interface circuitry for effectuating network connectivity via satellite communications. Where tethered UE devices are provided as patient devices 104, networked communications may also involve broadband edge network infrastructures based on various flavors of Digital Subscriber Line (DSL) architectures and/or Data Over Cable Service Interface Specification (DOCSIS)-compliant Cable Modem Termination System (CMTS) network architectures (e.g., involving hybrid fiber-coaxial (HFC) physical connectivity). Accordingly, by way of illustration, an edge/access network portion 119A is exemplified with elements such as WiFi/AP node(s) 116-1, macro-cell node(s) 116-2 such as eNB nodes, gNB nodes, etc., microcell nodes 116-3 (e.g., including micro remote radio units or RRUs, etc.) and DSL/CMTS node(s) 116-4. For purposes of some embodiments herein, a network access ID or access point ID may comprise an ID that identifies any of the foregoing access network infrastructure components, which may be monitored and used as an input factor in combination with biometric indicia of patient 102 depending on implementation.

In similar fashion, clinicians and/or clinician agents 138 may be provided with a variety of external devices for controlling, programming, otherwise (re) configuring or providing therapy operations with respect to one or more patients 102 mediated via respective implantable/NIMI device(s) 103, in a local therapy session and/or telehealth/remote therapy session, depending on implementation and use case scenarios. External devices associated with clinicians/agents 138, referred to herein as clinician devices 130, which are representative of CP device 180 shown in FIG. 1A, may comprise a variety of UE devices, tethered or untethered, similar to patient devices 104, that may be configured to engage in telehealth and/or remote care therapy sessions as will be set forth in detail further below. Clinician devices 130 may therefore also include non-COTS devices as well as COTS devices generally exemplified by wearable device(s) 131, smartphone(s) 132, tablet(s)/phablet(s) or smart pads 134, computer(s) 136 and external/auxiliary AV equipment 137, any of which may operate in association with one or more virtual assistants, smart home/office appliances, VR/AR/MR devices, and the like. Further, example clinician devices 130 may also include various types of network communications circuitry or interfaces similar to that of personal devices 104, which may be configured to operate with a broad range of technologies as set forth above. Accordingly, an edge/access network portion 119B is exemplified as having elements such as WiFi/AP node(s) 128-1, macro/microcell node(s) 128-2 and 128-3 (e.g., including micro remote radio units or RRUs, base stations, eNB/gNB nodes, etc.) and DSL/CMTS node(s) 128-4. It should therefore be appreciated that edge/access network portions 119A, 119B may include all or any subset of wireless/wireline communication infrastructures, technologies and protocols for effectuating data communications with respect to an example embodiment of the present disclosure, wherein appropriate access point IDs may be monitored and provided as an input factor for login authentication operations.

In one arrangement, a plurality of network elements or nodes may be provided for facilitating an integrated remote care therapy service involving one or more clinicians 138 and one or more patients 102, wherein such elements are hosted or otherwise operated by various stakeholders in a service deployment scenario depending on implementation, e.g., including one or more public clouds, private clouds, or any combination thereof as previously noted. According to some example embodiments, a remote care session management (RCSM) node or platform 120 may be provided, generally representative of the network entity 157 shown in FIG. 1A, preferably disposed as a cloud-based element coupled to network 118, that is operative in association with a secure communications credentials management node 122 and a device management node 124, to facilitate a virtual clinic platform whereby a clinician may advantageously engage in a telehealth session and/or a remote care therapy session with a particular patient via a common application interface and associated AV and therapy controls, as will be described further below.

Figure 2:
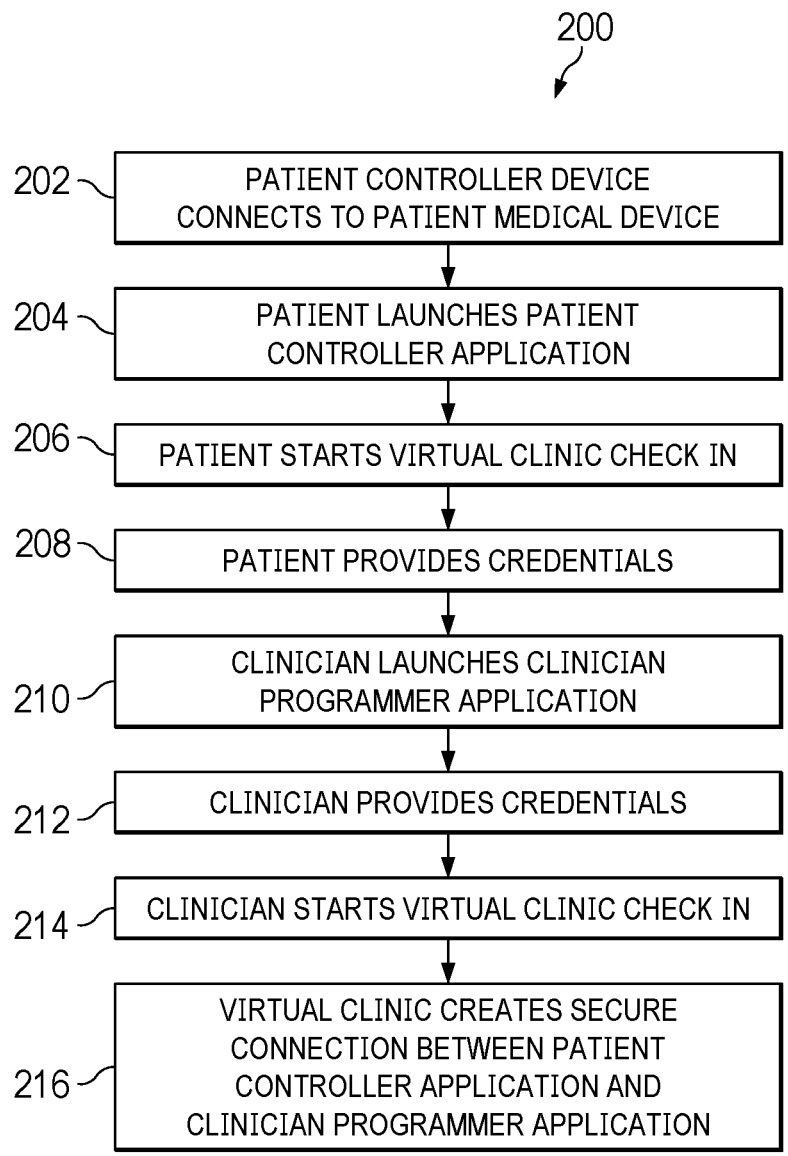
FIG. 2 depicts a flowchart illustrative of blocks, steps and/or acts that may be (re) combined in one or more arrangements with or without additional flowcharts of the present disclosure for facilitating remote care therapy in a secure network environment for purposes of some embodiments.

FIG. 2 depicts a flowchart for establishing a remote programming or virtual clinic session according to known processes. Additional details regarding establishment of remote programming or virtual clinic sessions may be found in U.S. Pat. No. 10,124,177 which is incorporated herein by reference. Although some details are described herein regarding establishment of a virtual clinic/remote programming session, any suitable methods may be employed according to other embodiments. At block 202, the patent controller device connects to the patient's medical device. For example, the patent controller device may establish a BLUETOOTH communication session with the patient's implantable pulse generator. At block 204, the patient launches the patient controller app on the patient controller device. At block 206, the patient starts a virtual clinic check in process by selecting a suitable GUI component of the patient controller app. In block 208, the patient may provide patient credentials. At block 210, the clinician launches the clinician programmer app on the clinician programmer device. In block 212, the clinician provides credentials. At block 214, the clinician checks into the virtual clinic to communicate with the patient. At block 216, the virtual clinic infrastructure establishes a secure connection between the patient controller app and clinician programmer app to conduct communications. Known cybersecurity features may be applied to establish the secure connection including using PKI processes, encryption processes, authentication processes, etc. Upon establishment, the communications may include audio and video communications between the patient and the clinician. Also, the clinician may conduct remote programming of the patient's medical device during the session while communicating with the patient.

Figure 3:
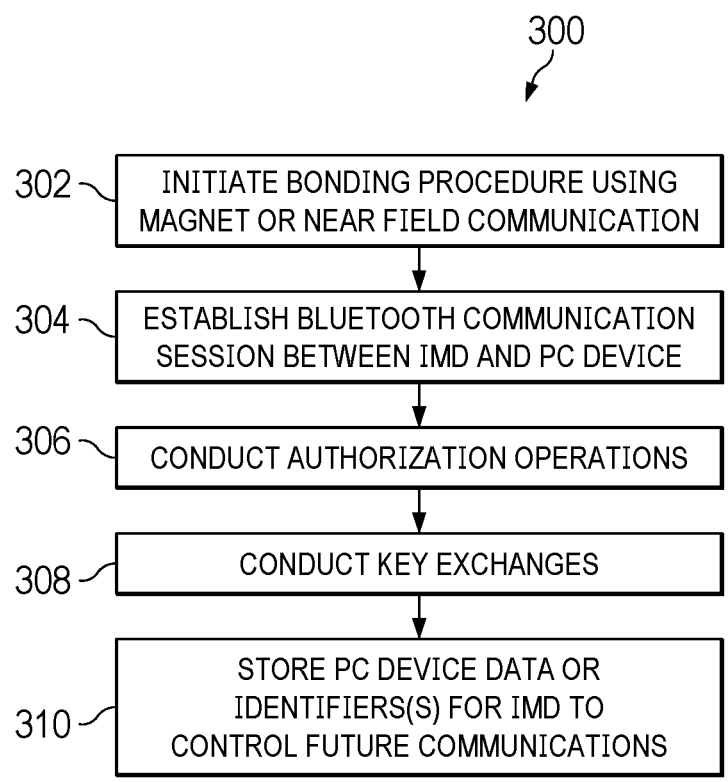
FIG. 3 depicts a flowchart illustrative of blocks, steps and/or acts that may be implemented for establishing a communication session with an implantable medical device.

FIG. 3 depicts a flowchart illustrative of known blocks, steps and/or acts that may be implemented for establishing a communication session with an implantable medical device. Additional details regarding establishing a communication session with an implantable medical device may be found in U.S. Pat. No. 11,007,370 which is incorporated herein by reference. Although example operations are described in FIG. 3, any suitable methods of securing communication between a PC device and a patient medical device may be employed as appropriate for a given patient therapy. At block 302, a bonding procedure is initiated to establish a trusted relationship between the implantable medical device or other medical device of the patient and a patient controller device. The bonding procedure may be initiated by using a magnet to activate a Hall sensor in the medical device. Alternatively, near field communication (e.g., inductive coupling) may be employed to initiate the bonding procedure. The use of a magnetic or inductive coupling provides a degree of physical access control to limit the possibility of unauthorized devices from communicating with the patient's medical device. That is, a device that attempts to obtain authorization to communicate must be brought into physical proximity with the patient at a time that is controlled by the patient thereby reducing the possibility of unauthorized devices from improperly gaining the ability to communicate with the patient's device. At block 304, a communication session is established between the patient's medical device and the patient's controller (PC) device. For example, a BLUETOOTH communication session may be established. At block 306, authentication operations are conducted. For example, known credentials, PKI, encryption, and other cybersecurity operations may be applied between the patient's medical device and the PC device to determine whether the PC device should be allowed to conduct communications with the patient's medical device. At block 308, encryption key data may be exchanged between devices for future communications. At block 310, other PC identifiers or data may be stored in IMD to control future communications. Upon establishment of a trusted relationship between the patient's medical device and a PC device, the PC device may be used to conduct remote programming session. The remote programming sessions may also be subjected to cybersecurity methods such as the use of credentials, PKI, encryption, etc.

It will be recognized that in some baseline remote programming scenarios set forth above, when a remote care/ programming session is initiated the patient may be required to provide patient credentials to facilitate the communications connections necessary to support the session. In some arrangements, the patient credentials may include the patient's user identifier and password. After authentication of the user credentials, the remote care/programming session may be established using a "session key" or token, e.g., as described in greater detail in the '177 patent referenced above. However, many neurostimulation patients (e.g., chronic pain patients, movement disorder patients, etc.) and other patients exhibit difficulties entering data on smartphones and similar devices. Such difficulties reduce the advantages of remote care over in-person care. Skilled artisans will therefore recognize that embodiments discussed herein provide the ability to provide user authentication while reducing the data input burden on patients (e.g., low friction or no friction authentication). Accordingly, in some example embodiments, biometric data and other data may also be employed to enhance the login operations as well as improve the overall security of a remote care communication session by validating user identities and authorization as set forth herein.

Figure 4A:
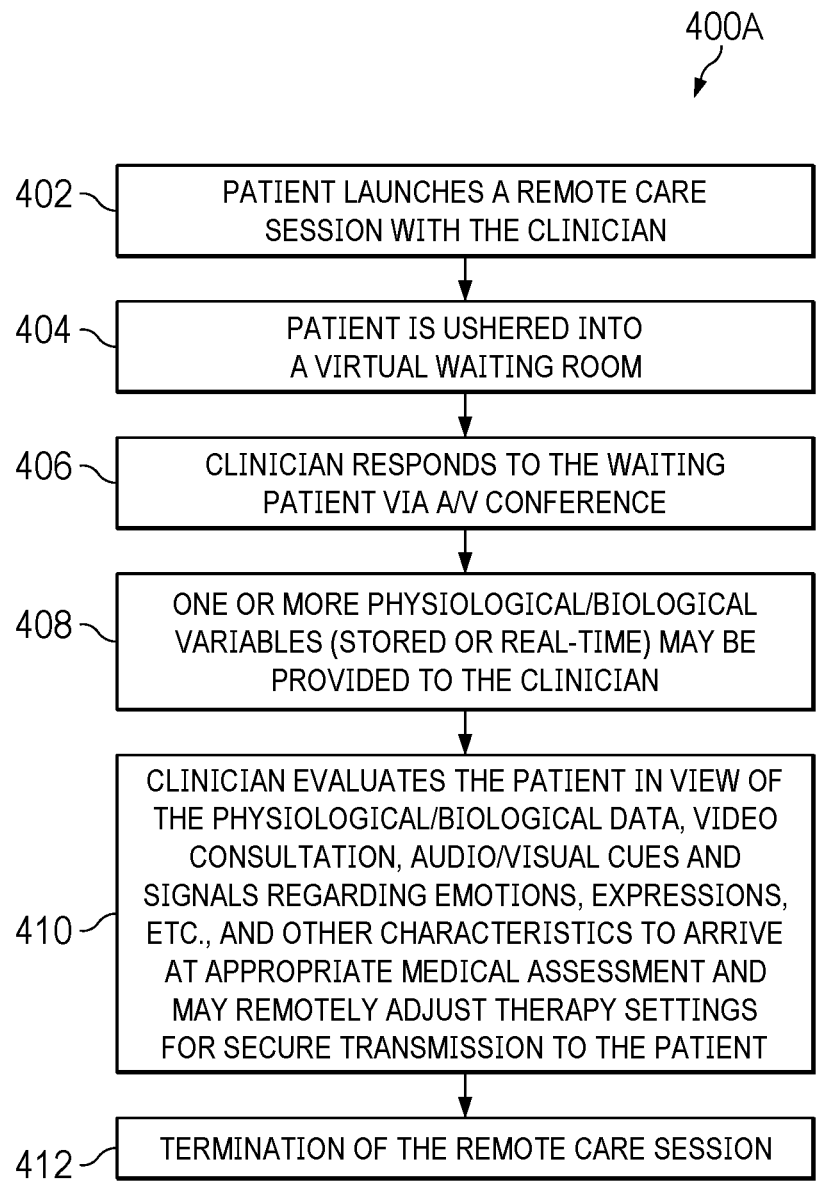
FIGS. 4A and 4B depicts flowcharts illustrative of a remote care scenario that may be established between a patient and a clinician operating respective user equipment (UE) devices after completing appropriate biometric authentication processes according to some embodiments of the present disclosure.
Figure 4B:
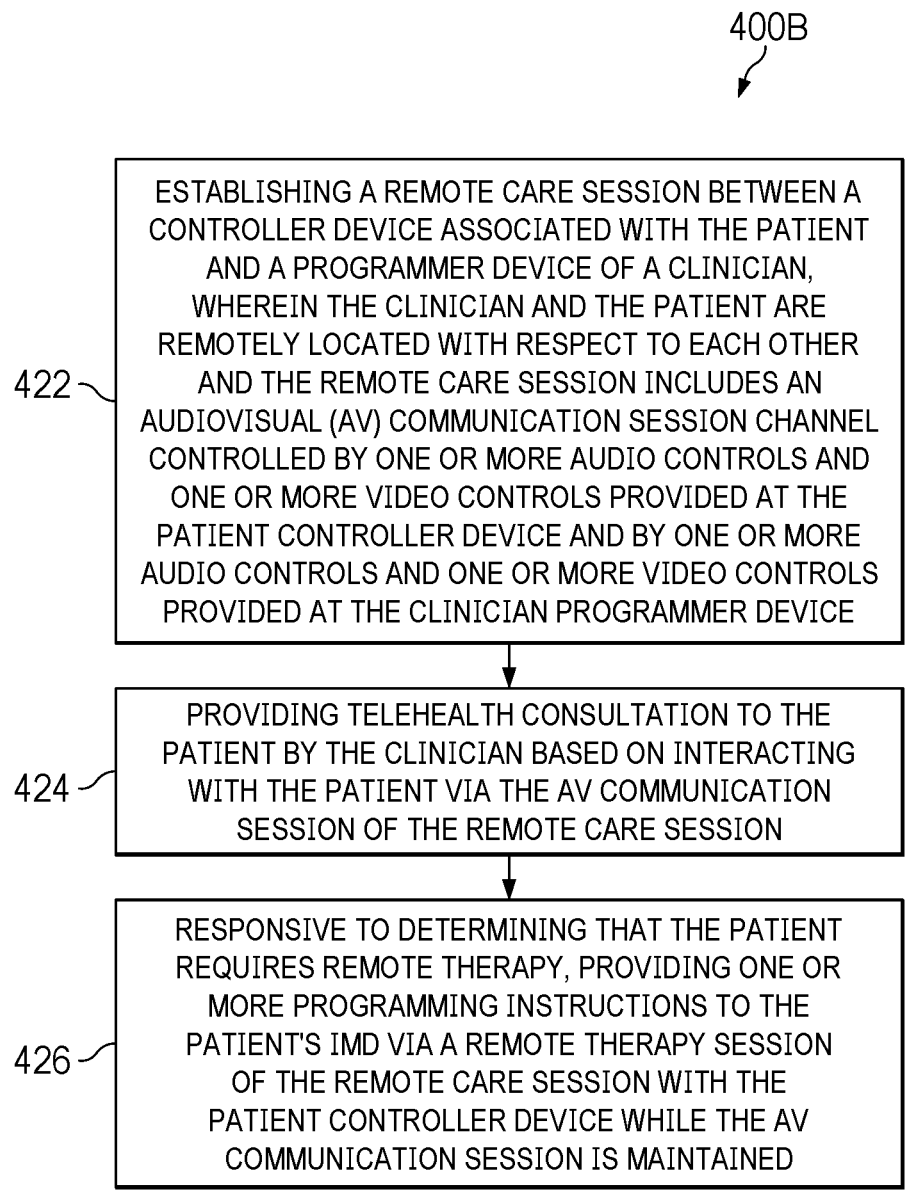

FIGS. 4A and 4B depicts flowcharts illustrative of a remote care scenario involving an example digital health network architecture wherein an integrated remote care session may be established between a patient and a clinician operating respective controller devices that support suitable graphical user interfaces (GUIs) for facilitating a therapy session, an audio/visual (AV) communication session, or a combination of both, for purposes of some example embodiments of the present disclosure. As will be set forth further below, patient controller and/or clinician programmer devices may be provided with appropriate application software to effectuate suitable GUIs on respective devices for facilitating a remote care session including a secure AV session/channel and a therapy session/channel as part of a common application interface that can support telehealth/telemedicine applications, remote monitoring, remote therapy, remote learning, data logging, etc. Process flow 400A of FIG. 4A may commence with a patient launching an integrated digital health application executing on the patient controller/device, responsive to a successful BA-based login operation, to initiate a secure communications channel with a remote clinician (block 402), e.g., by selecting a "Remote Care" option from a pull-down menu, clicking on an icon on the UI display screen, or via a voice command, etc. In one embodiment, the patient may be ushered into a virtual waiting room, which may be realized in a UI screen window of the patient/clinician device (block 404). At block 406, the clinician responds to the waiting patient, e.g., via a secure AV communication channel of the remote care session, responsive to a successful BA-based login operation. At block 408, one or more physiological/biological data of the patient (stored or real-time) may be provided to the clinician via secure communications. In some embodiments, one or more digital keys of the clinician and/or the patient may be employed to secure communications. At block 410, the clinician evaluates the patient in view of the physiological/biological data, telemedicine/video consultation, audio/visual cues and signals regarding patient's facial expressions, hand movement/tremors, walking, gait, ambulatory status/stability, and other characteristics to arrive at appropriate medical assessment. Depending on such telehealth consultation/evaluation, the clinician may remotely adjust stimulation therapy settings for secure transmission to the patient device, which may be securely transmitted via encrypted communications. In a further scenario, a remote clinician proxy or agent may be executed at or in association with the patient controller/device upon launching a remote session, wherein the proxy/agent is operative to effectuate or otherwise mediate the transmission of any therapy settings to the patient's IMD, either in real-time or at some point in the future depending upon programmatic control. After completing the requisite therapy and consultative communications, the remote care session may be terminated, e.g., either by the clinician and/or the patient, as set forth at block 412.

Process flow 400B of FIG. 4B is illustrative of an embodiment of a high level scheme for delivering healthcare to a patient via an integrated remote care session. At block 422, a remote care session between a controller device associated with the patient and a programmer device associated with a clinician may be established upon completing respective biometric authentication procedures, wherein the clinician and the patient are remotely located with respect to each other and the remote care session includes an AV communication session controlled by one or more A/V controls provided at the patient controller device and the clinician programmer device. At block 424, various telehealth consultation services may be provided to the patient by the clinician based on interacting with the patient via the AV communication channel of the remote care session as previously noted. Responsive to determining that the patient requires remote therapy, one or more remote programming instructions may be provided to the patient's IMD via a remote therapy session or channel of the remote care session with the patient controller device while the AV communication session is maintained (block 426).

Skilled artisans will recognize that some of the blocks, steps and/or acts set forth above may take place at different entities and/or different times (i.e., asynchronously), and possibly with intervening gaps of time and/or at different locations. Further, some of the foregoing blocks, steps and/or acts may be executed as a process involving just a single entity (e.g., a patient controller device, a clinician programmer device, or a remote session manager operating as a virtual clinic, etc.), or multiple entities, e.g., as a cooperative interaction among any combination of the end point devices and the network entities. Still further, it should be appreciated that example process flows may be interleaved with one or more sub-processes comprising other IMD<=>patient or IMD<=>clinician interactions (e.g., local therapy sessions) as well as virtual clinic<=>patient or virtual clinic<=>clinician interactions (e.g., remote patient monitoring, patient/clinician data logging, remote learning, rigidity assessment, context-aware kinematic and auditory analysis, etc., as will be set forth further below). Accordingly, skilled artisans will recognize that example process flows may be altered, modified, augmented or otherwise reconfigured for purposes of some embodiments herein.

In one implementation, an example remote care session may be established between the patient controller device and the clinician programmer device after the patient has activated a suitable GUI control provided as part of a GUI associated with the patient controller device and the clinician has activated a corresponding GUI control provided as part of a virtual waiting room displayed on a GUI associated with the clinician programmer device, wherein each GUI is operative to effectuate a respective biometric login window. In another arrangement, remote programming instructions may be provided to the patient's IMD via the remote therapy session only after verifying that remote care therapy programming with the patient's IMD is compliant with regulatory requirements of one or more applicable local, regional, national, supranational governmental bodies, nongovernmental agencies, and international health organizations. In a still further variation, various levels of remote control of a patient's controller and its hardware by a clinician programmer device may be provided. For example, suitable GUI controls may be provided at the clinician programmer device for remotely controlling a camera component or an auxiliary AV device associated with the patient controller device by interacting with a display of the patient's image on the screen of the clinician programmer device, e.g., by pinching, swiping, etc., to pan to and/or zoom on different parts of the patient in order to obtain high resolution images. Additional embodiments and/or further details regarding some of the foregoing variations with respect to providing remote care therapy via a virtual clinic may be found in the following U.S. patent applications, publications and/or patents: (i) U.S. Patent Application Publication No. 2020/0398062, entitled "SYSTEM, METHOD AND ARCHITECTURE FOR FACILITATING REMOTE PATIENT CARE"; (ii) U.S. Patent Application Publication No. 2020/0402656, entitled "UI DESIGN FOR PATIENT AND CLINICIAN CONTROLLER DEVICES OPERATIVE IN A REMOTE CARE ARCHITECTURE"; (iii) U.S. Patent Application Publication No. 2020/0402674, entitled "SYSTEM AND METHOD FOR MODULATING THERAPY IN A REMOTE CARE ARCHITECTURE"; and (iv) U.S. Patent Application Publication No. 2020/0398063, entitled "DATA LABELING SYSTEM AND METHOD OPERATIVE WITH PATIENT AND CLINICIAN CONTROLLER DEVICES DISPOSED IN A REMOTE CARE ARCHITECTURE", each of which is hereby incorporated by reference herein.

Figure 5B:
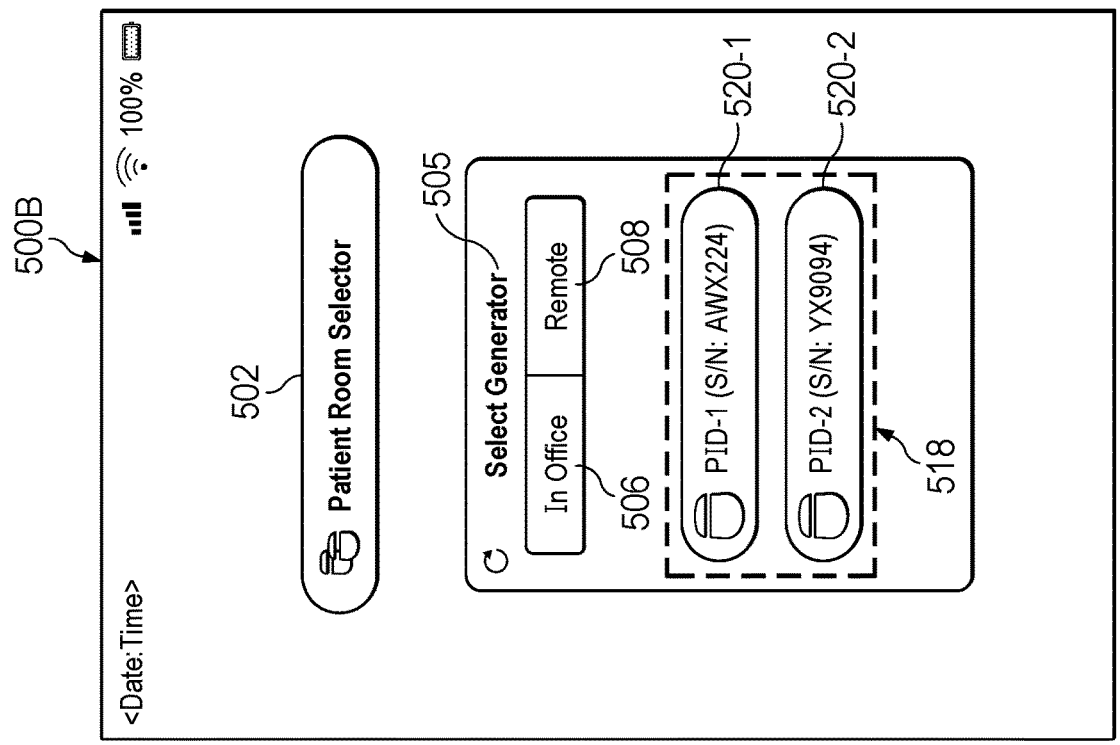
FIGS. 5A and 5B depict representations of an example user interface and associated dialog boxes provided with a clinician programmer device for selecting different therapy applications and/or biometric login modes for purposes of some embodiments of the present disclosure.
Figure 5A:
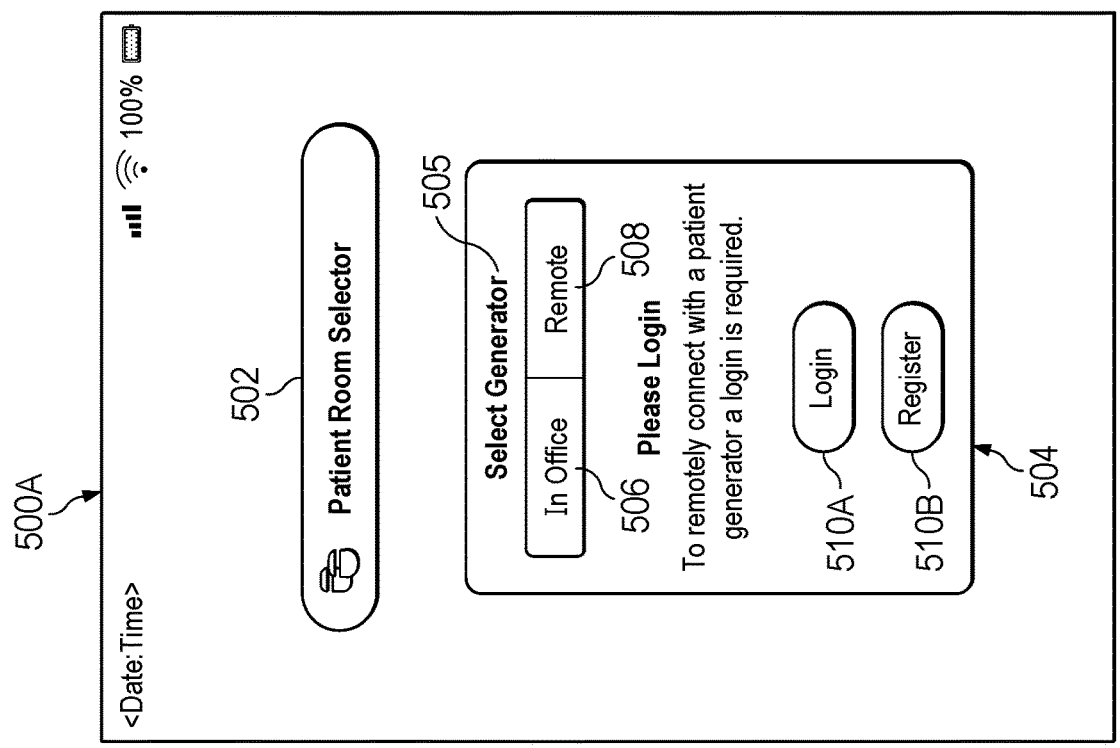

FIGS. 5A and 5B depict representations of an example user interface and associated dialog boxes or windows provided with a clinician programmer device, e.g., as a touch screen display of device 180 shown in FIG. 1A or device 1308 shown in FIG. 13, for selecting different therapy applications, service modes and/or login mode selection, etc. in an integrated remote care service application for purposes of some example embodiments of the present disclosure. GUI screen 500A depicted in FIG. 5A is representative of an screen that may be presented at the clinician device upon launching the clinician programmer application for facilitating a clinician to select a service mode, e.g., a remote care service mode or an in-office care service mode. A "Patient Room" selector menu option 502 may be operative to present a "generator" window 505 that includes an "In-Office" patient option 506 or a "Remote" patient option 508, wherein the activation or selection of the Remote patient option 508 effectuates one or more windows or dialog boxes for facilitating user login, e.g., including selection of biometric login, registration, and other security credentialing services, as exemplified by windows 510A, 510B. Upon successful BA login and validation, the clinician may be presented with a virtual waiting room 518 identifying one or more remote patients as exemplified in GUI screen 500B of FIG. 5B. Each remote patient may be identified by one or more identifiers and/or indicia, including, without limitation, personal identifiers, respective IMD identifiers, therapy identifiers, etc., subject to applicable privacy and healthcare laws, statutes, regulations, and the like. Accordingly, in some embodiments such identification indicia may comprise, inter alia, patient names, images, thumbnail photos, IMD serial numbers, etc., collectively referred to as Patient ID (PID) information, as illustrated by PID-1 520-1 and PID-2 520-2. In some embodiments, a time indicator may be associated with each remote patient, indicating how long a remote patient has been "waiting" (e.g., the time elapsed since launching a remote care session from his/her controller device). In some embodiments, only patients who have been biometrically authenticated may be shown in the virtual waiting room 518. In some embodiments, a priority indicator may also be associated with remote patients, wherein different priorities may be assigned by an intervening human and/or AI/ML-based digital agent. Furthermore, patients may have different types of IMDs to effectuate different therapies and a patient may have more than one IMD in some cases. An example embodiment of virtual waiting room 518 may therefore include a display of any combination of remote patients and their respective IMDs by way of suitably distinguishable PIDs having various pieces of information, wherein the PIDs may be individually selectable by the clinician for establishing a remote care session that may include remote therapy programming or just telehealth consultations.

Figure 6:
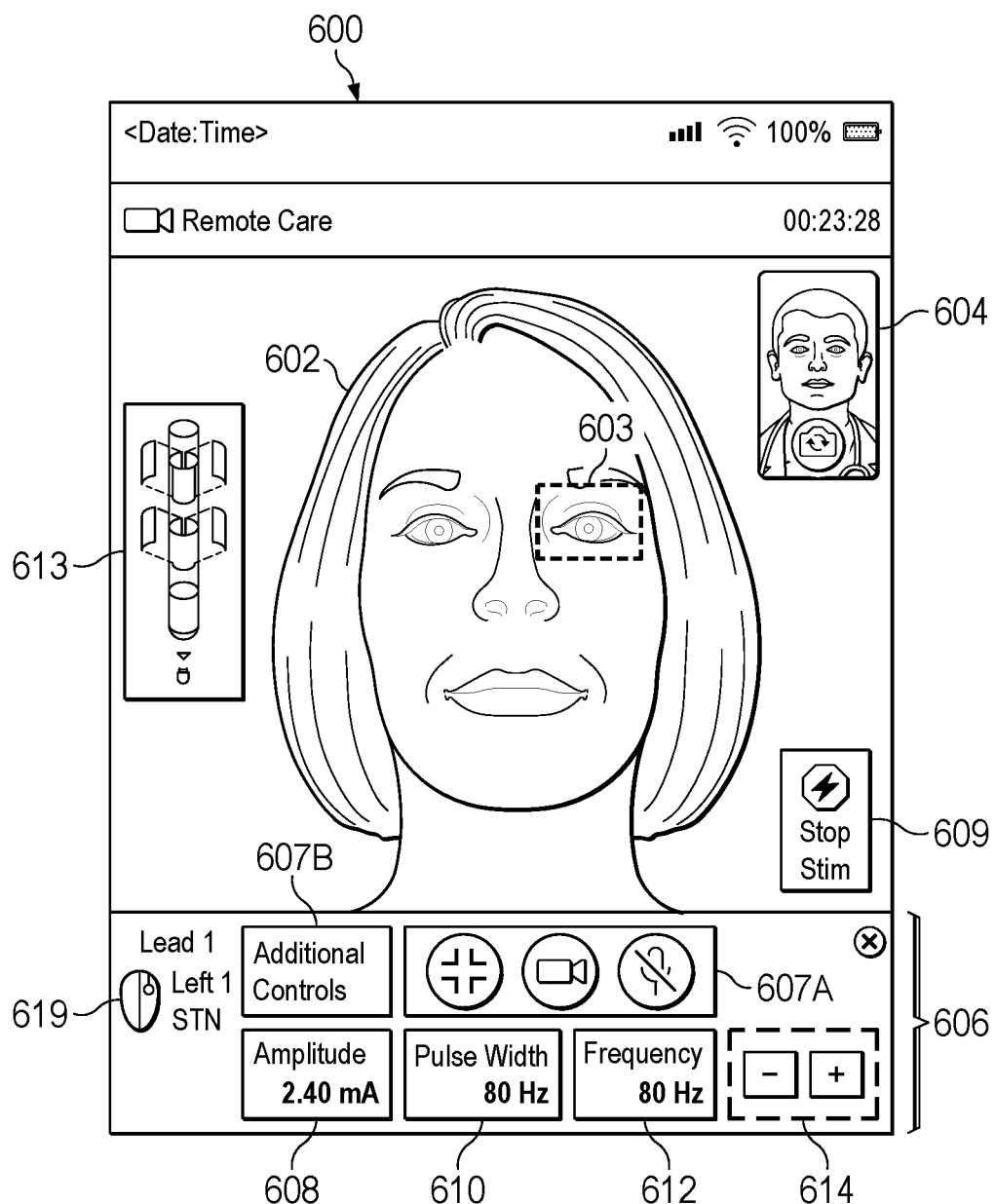
FIG. 6 depicts a representation of an example user interface provided with a clinician programmer device for facilitating an AV communication session and a remote therapy session in an integrated remote care service application upon biometric authentication according to some embodiments of the present disclosure.

FIG. 6 depicts a representation of an example user interface of a clinician programmer device with additional details for facilitating graphic controls with respect to an AV communication session and a remote therapy session in an integrated remote care service application that may be effectuated upon successful biometric authentication for purposes of some embodiments of the present disclosure. As illustrated, GUI screen 600 is representative of a display screen that may be presented at the clinician device after establishing that remote therapy programming is to be effectuated for a selected remote patient. In accordance with some of the embodiments set forth herein, GUI screen 600 may be arranged so that the patient's video image is presented in an optimized or resized/oversized display window 602 while the clinician's video image is presented in a smaller display window 604 along with a compact control icon panel 606 to maximize the level of detail/resolution obtained in the patient's image. Furthermore, the smaller clinician image window 604 may be moved around the UI screen by "dragging" the image around the viewing area of the patient's image window 602 to allow more control of the positioning of the display windows so that the patient's image view is unimpeded and/or optimized at a highest possible resolution. It will be appreciated that such high level video quality is particularly advantageous in obtaining more reliable cues with respect to the patient's facial expressions, moods, gestures, eye/iris movements, lip movements, hand movements tremors, jerks, twitches, spasms, contractions, or gait, etc., that may be useful in diagnosing various types of motor/neurological disorders, e.g., Parkinson's disease. In some arrangements, a remote data logging platform may be configured to store the AV data of the sessions for facilitating model building and training by appropriate AI/ML-based expert systems or digital assistants for purposes of further embodiments of the present patent disclosure.

Control panel window 606 may include a sub-panel of icons for AV and/or remote care session controls, e.g., as exemplified by sub-panel 607A in addition to a plurality of icons representing remote therapy setting controls, e.g., pulse amplitude control 608, pulse width control 610, pulse frequency control 612, increment/decrement control 614 that may be used in conjunction with one or more therapy setting controls, along with a lead selection indication icon 619. Additional controls 607B may also be provided for augmenting or further enhancing stimulation patterns, e.g., by using waveform shaping, cycling, etc. Skilled artisans will recognize that the exact manner in which a control panel window may be arranged as part of a consolidated GUI display depends on the therapy application, IMD deployment (e.g., the number of leads, electrodes per lead, electrode configuration, etc.), and the like, as well as the particular therapy settings. Additional control icons relating to stimulation session control, e.g., Stop Stimulation icon 609, as well as any other icons relating to the remote care session such as lead/electrode selection 613, may be presented as minimized sub-panels adjacent to the control panel window 606 so as not to compromise the display area associated with the patient' image display 602. Skilled artisans will recognize that any combination or subcombination of therapeutic controls may be implemented or actuated in a particular embodiment to achieve different parametric sweep windows that may be optimized for individual patients. In still further embodiments, separate remote therapy session intervention controls (e.g., pause and resume controls) may be provided in addition to stimulation start and termination controls, which may be operative independent of or in conjunction with AV communication session controls, in a manner similar to example patient controller GUI embodiments set forth hereinbelow. Still further, data labeling buttons or controls may also be provided in a separate overlay or window of GUI screen 600 (not shown in FIG. 6) to allow or otherwise enable the clinician to provide different types of data labels for the AV data and therapy settings data for purposes of some embodiments of the present patent disclosure.

Figure 7:
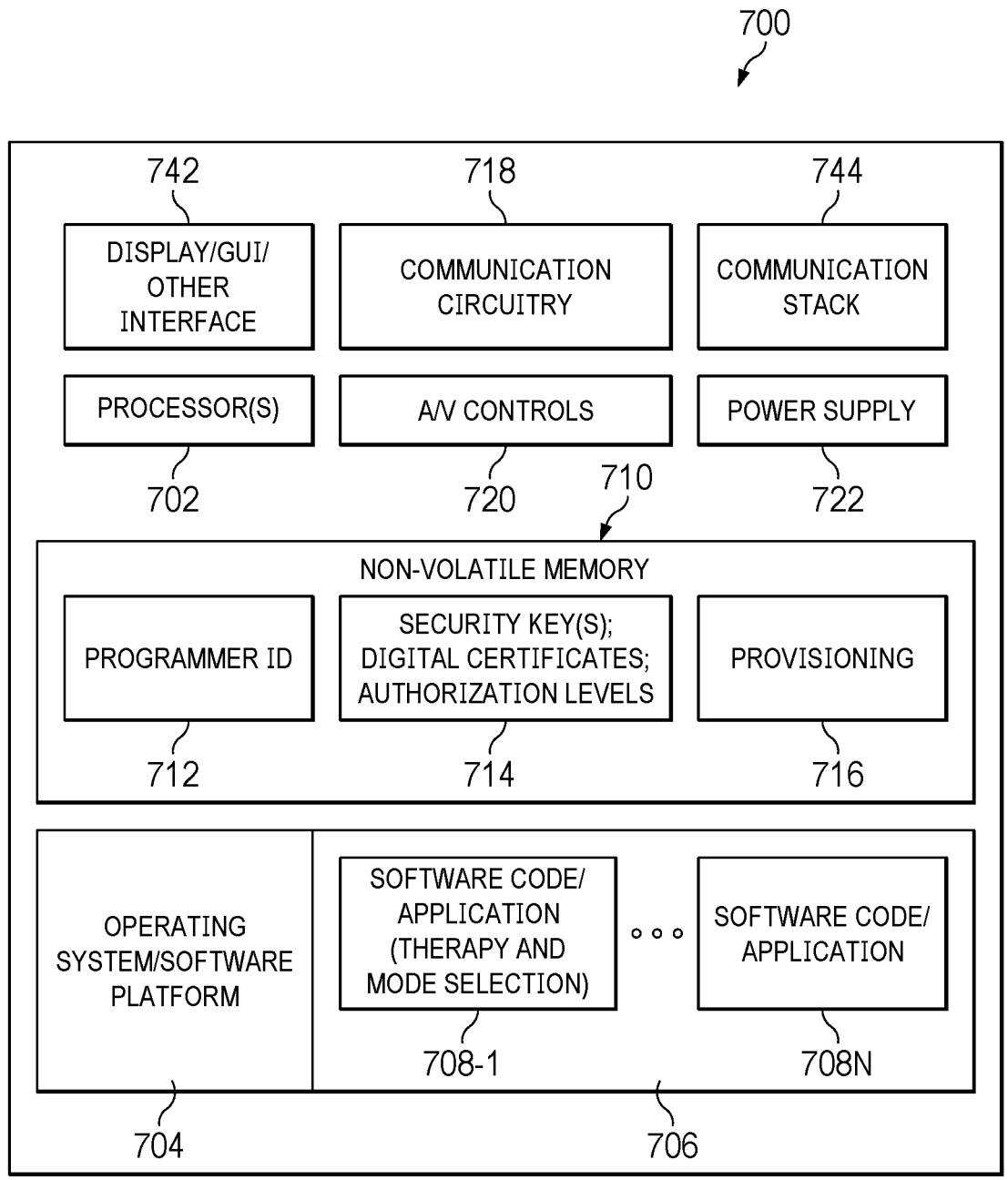
FIG. 7 depicts a block diagram of an external device that may be configured as a clinician programmer device, a patient controller device or an authorized third-party device operative to execute a medical application requiring a biometric login/authentication procedure according to some embodiments of the present disclosure.

FIG. 7 depicts a block diagram of a generalized external edge device operative for purposes of some embodiments of the present disclosure. For example, depending on configuration and/or modality, external device 700 may be representative of a clinician programmer device, a patient controller device, or a delegated device operated by an agent of a patient or a clinician having subordinate levels of privilege authorization with respect to remote therapy and monitoring operations. Further, external device 700 may be a COTS device or non-COTS device as previously noted. Still further, external device 700 may be a device that is controlled and managed in a centralized enterprise device management system (EDMS), also referred to as a mobile/medical device management system (MDMS), which may be associated with the manufacturer of the IMDs and associated therapy application components in some embodiments (e.g., as an intranet implementation, an extranet implementation, or internet-based cloud implementation, etc.), in order to ensure that only appropriately managed/provisioned devices and users are allowed to engage in communications with IMDs with respect to monitoring the devices and/or providing therapy to patients using approved therapy applications. Still further, external device 700 may be a device that is not controlled and managed in such a device management system. Accordingly, it will be realized that external device 700 may comprise a device that may be configured in a variety of ways depending on how its functional modality is implemented in a particular deployment.

Example external device 700 may include one or more processors 702, communication circuitry 718 and one or more memory modules 710, operative in association with one or more OS platforms 704 and one or more software applications 708-1 to 708-K depending on configuration, cumulatively referred to as software environment 706, and any other hardware/software/firmware modules, all being powered by a power supply 722, e.g., battery. Example software environment 706 and/or memory 710 may include one or more persistent memory modules comprising program code or instructions for controlling overall operations of the device, inter alia. Example OS platforms may include embedded real-time OS systems, and may be selected from, without limitation, iOS, Android, Chrome OS, Blackberry OS, Fire OS, Ubuntu, Sailfish OS, Windows, Kai OS, eCos, LynxOS, QNX, RTLinux, Symbian OS, VxWorks, Windows CE, MontaVista Linux, and the like. In some embodiments, at least a portion of the software applications may include code or program instructions operative as one or more medical/digital health applications for effectuating or facilitating one or more therapy applications, remote monitoring/testing operations, data capture and logging operations, trial therapy applications, etc. Such applications may be provided as a single integrated app having various modules that may be selected and executed via suitable drop-down menus in some embodiments. However, various aspects of the edge device digital healthcare functionalities may also be provided as individual apps that may be downloaded from one or more sources such as device manufactures, third-party developers, etc. By way of illustration, application 708-1 is exemplified as digital healthcare app configured to interoperate with program code stored in memory 710 to execute various operations relative to device registration and enrollment, login mode selection, test/trial programming that may include remote and/or local therapy sessions, therapy selection and parametric sweeping, security applications, and provisioning, etc., as part of a device controller application. In an arrangement where device 700 is configured as a patient controller device, application 708-1 may be configured to facilitate various GUIs including pull-down menus and dialog boxes for providing/inputting PRO data as well as side effects data as described elsewhere in the present disclosure.

In some embodiments of external device 700, memory modules 710 may include a non-volatile storage area or module configured to store relevant patient data, therapy settings, and the like. Memory modules 710 may further include a secure storage area 712 to store a device identifier (e.g., a serial number) of device 700 used during therapy sessions (e.g., local therapy programming or remote therapy programming). Also, memory modules 710 may include one or more secure storage areas 714 for storing security credential information, e.g., one or more cryptographic keys or key pairs, signed digital certificates, push-based tokens, one-time passwords (OTPs), etc. In some arrangements, such security credential information may be specifically operative in association with approved/provisioned software applications, e.g., therapy/test application 708-1, which may be obtained during provisioning. Also, a non-volatile storage area 716 may be provided for storing provisioning data, validation data, settings data, metadata etc. Communication circuitry 718 may include appropriate hardware, software and interfaces to facilitate wireless and/or wireline communications, e.g., inductive communications, wireless telemetry or M2M communications, etc. to effectuate IMD communications, as well as networked communications with cellular telephony networks, local area networks (LANs), wide area networks (WANs), packet-switched data networks, etc., based on a variety of access technologies and communication protocols, which may be controlled by the digital healthcare application 708-1 depending on implementation.

For example, application 708-1 may include code or program instructions configured to effectuate wireless telemetry and authentication with an IMD/NIMI device using a suitable M2M communication protocol stack which may be mediated via virtual/digital assistant technologies in some arrangements. By way of illustration, one or more bi-directional communication links with a device may be effectuated via a wireless personal area network (WPAN)

using a standard wireless protocol such as Bluetooth Low Energy (BLE), Bluetooth, Wireless USB, Zigbee, Near-Field Communications (NFC), WiFi (e.g., IEEE 802.11 suite of protocols), Infrared Wireless, and the like. In some arrangements, bi-directional communication links may also be established using magnetic induction techniques rather than radio waves, e.g., via an induction wireless mechanism. Alternatively and/or additionally, communication links may be effectuated in accordance with certain healthcare-specific communications services including, Medical Implant Communication Service (MICS), Wireless Medical Telemetry Service (MTS), Medical Device Radiocommunications Service (MDRS), Medical Data Service (MDS), etc. Accordingly, regardless of which type(s) of communication technology being used, external device 700 may be provided with one or more communication protocol stacks 744 operative with hardware, software and firmware (e.g., forming suitable communication circuitry including transceiver circuitry and antenna circuitry where necessary, which may be collectively exemplified as communication circuitry 718 as previously noted) for effectuating appropriate short-range and long-range communication links for purposes of some example embodiments herein. In still further embodiments, application 708-1 may include code or program instructions configured to effectuate a login selection mode as part of an initial login screen where a plurality of login options including a biometric login option may be displayed for selection by a user.

External device 700 may also include appropriate audio/video controls 720 as well as suitable display(s) (e.g., touch screen), camera(s), microphone, and other user interfaces (e.g., GUIs) 742, which may be utilized for purposes of some example embodiments of the present disclosure, e.g., facilitating user input, initiating IMD/network communications, mode selection, therapy selection, capture of biometric indicia, etc., which may depend on the aspect(s) of a particular digital healthcare application being implemented.

Figure 8:
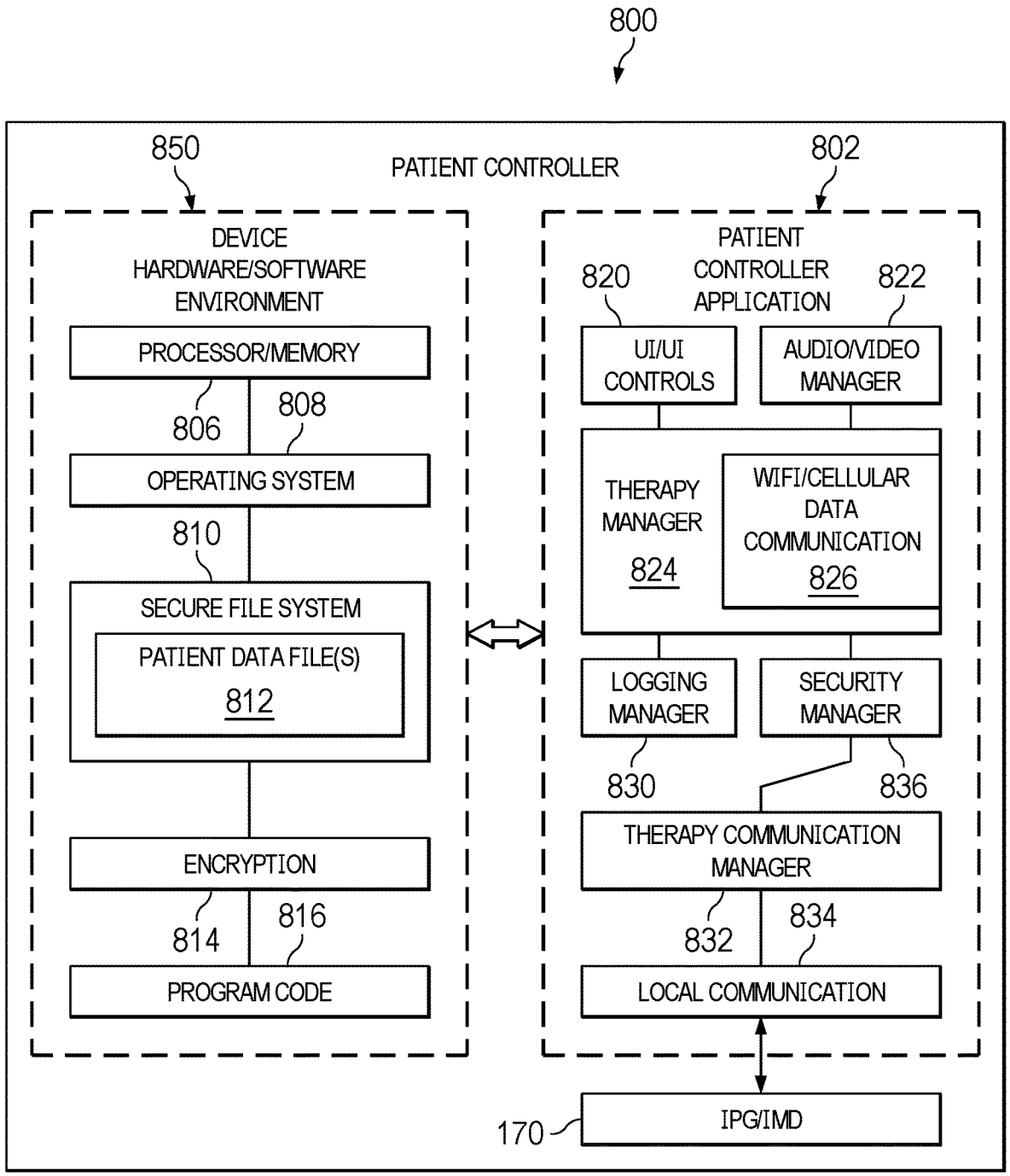
FIG. 8 depicts a block diagram illustrating additional details of a patient controller device operative for purposes of some embodiments of the present disclosure.

FIG. 8 depicts a block diagram illustrating additional details pertaining to a patient controller device for purposes of some embodiments of the present disclosure. Example patient controller device 800 may be particularly configured for securely packaging and transmitting patient data to an external entity, e.g., a clinician programmer device and/or a network entity disposed in the digital health network in order to facilitate remote monitoring, AI/ML model training, and the like. Consistent with the description provided above with respect to a generalized edge device, patient controller device 800 may be provided with a patient controller application 802 configured to run in association with a suitable device hardware/software environment 850 effectuated by one or more processor and memory modules 806, one or more OS platforms 808, and one or more persistent memory modules 816 comprising program code or instructions for controlling overall operations of the device, inter alia. Example OS platforms may include a variety of embedded real-time OS systems as noted previously. In one implementation, a secure file system 810 that can only be accessed by the patient controller application 802 may be provided, wherein one or more patient data files 812 may be stored in a packaged encrypted form for secure transmission for purposes of some embodiments herein. Also, patient controller application 802 may include a therapy manager 824 operative to facilitate remote and/or non-remote therapy applications and related communications using one or more communication interfaces, e.g., interface 834 with an IPG/IMD 804 and network communications interface 836 with a network entity, as previously noted. A logging manager 830 associated with therapy manager 824 may be provided for logging data. A security manager 828 associated with therapy manager 824 may be provided for facilitating secure or trusted communications with a network entity in some embodiments. A therapy communication manager 832 may be provided for facilitating secure therapy communications between patient controller 800 and a clinician programmer (not shown in this FIG.). Therapy communication manager 832 may also be interfaced with local communication interface 834 to effectuate secure communications with the patient's IPG/IMD 804 using a suitable short-range communications technology or protocol as noted previously.

In still further arrangements, suitable software/firmware modules 820 may be provided as part of patient controller application 802 to effectuate appropriate user interfaces and controls, e.g., A/V GUIs, in association with an audio/video manager 822 for facilitating therapy/diagnostics control, file management, and/or other input/output (I/O) functions. Additionally, patient controller 800 may include an encryption module 814 operative independently and/or in association or otherwise integrated with patient controller application 802 for dynamically encrypting a patient data file, e.g., on a line-by-line basis during runtime, using any known or heretofore unknown symmetric and/or asymmetric cryptography schemes, such as the Advanced Encryption Standard (AES) scheme, the Rivest-Shamir-Adleman (RSA) scheme, Elliptic Curve Cryptography (ECC), etc.

In general, one or more example patient controller operations set forth above may be configured as privileged operations requiring enhanced user authentication protocols that may be implemented according to biometric authentication schemes described herein. Accordingly, execution of such privileged operations may be contingent upon successful BA-based login operations in some example arrangements.

Figure 9:
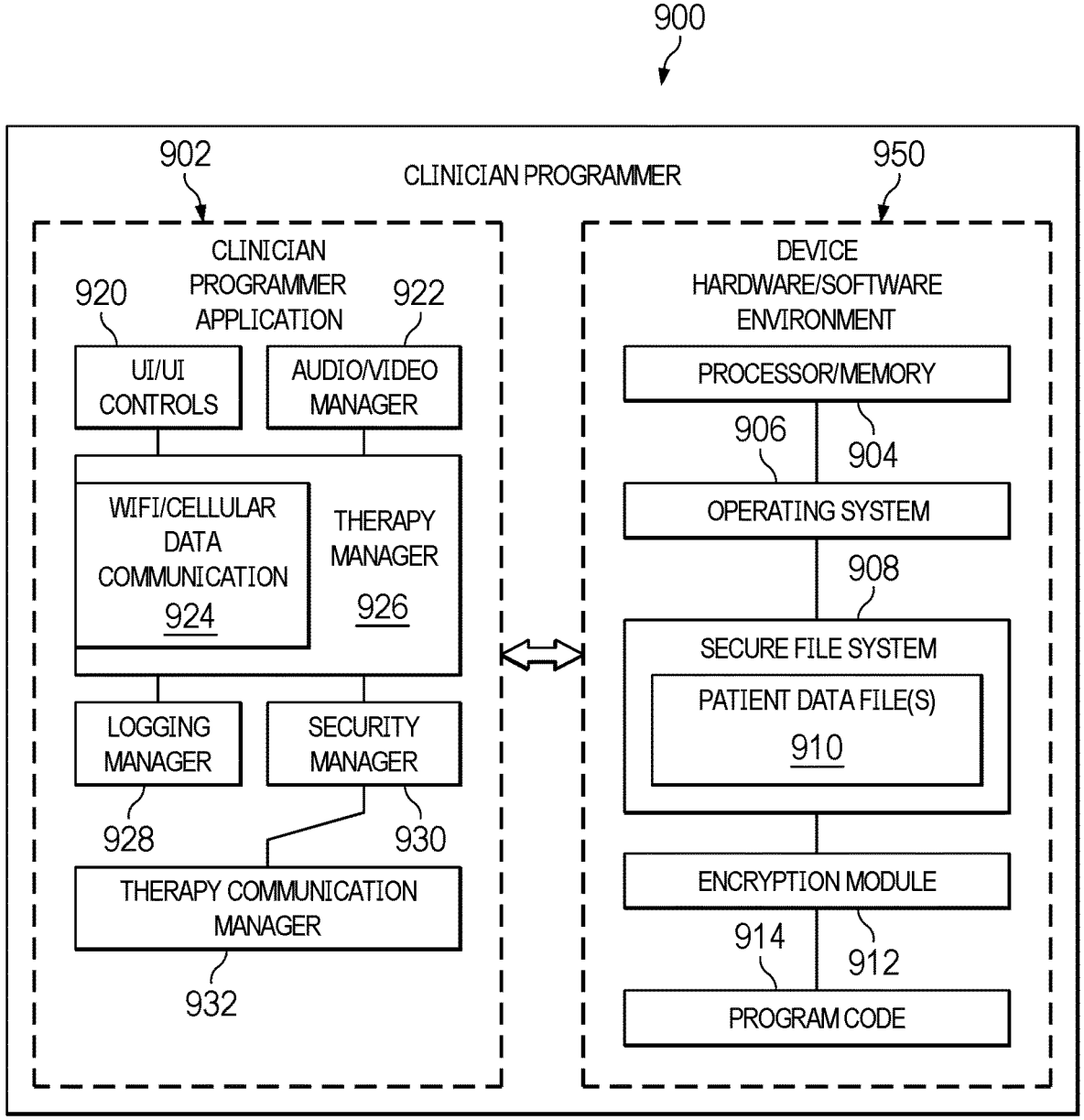
FIG. 9 depicts a block diagram illustrating additional details of a clinician programmer device operative for purposes of some embodiments of the present disclosure.

FIG. 9 depicts a block diagram illustrating additional details pertaining to a clinician programmer device for purposes of some embodiments of the present disclosure. Similar to the example patient controller device 800 described above, example clinician programmer 900 may be particularly configured for facilitating secure transmission of patient data to an external entity, e.g., another clinician programmer device and/or a network entity disposed in the digital healthcare network in order to facilitate remote therapy/programming, monitoring, AI/ML model training, and the like. A clinician programmer application 902 may be configured to run in association with a suitable device hardware/software environment 950 effectuated by one or more processor and memory modules 304, one or more OS platforms 906, and one or more persistent memory modules 914 comprising program code or instructions for controlling overall operations of the device, inter alia. As before, example OS platforms may include a variety of embedded real-time OS systems according to some embodiments. Further, a secure file system 908 may be provided in clinician programmer 900 that can only be accessed by the clinician programmer application 902, wherein one or more patient data files 310 (e.g., corresponding to one or more patients) may be stored in a packaged encrypted form, respectively, for purposes of some embodiments herein. In one implementation, clinician programmer application 902 may include a therapy manager 926 operative to facilitate remote and/or non-remote therapy applications and related communications using one or more communication interfaces, e.g., interface 924. For example, interface 924 may be configured to communicate with an IMD (not shown in this FIG.) using various short-range communication links with respect to in-person or in-clinic therapy according to some embodiments as previously noted. Likewise, example interface 924 may be configured to provide connectivity with wide-area networks for facilitating remote programming of an IMD and/or a telehealth session in some scenarios. A logging manager 928 associated with therapy manager 924 may be provided for logging data for respective patients. A security manager 930 associated with therapy manager 926 may be provided for facilitating secure or trusted communications with a network entity in some embodiments. A therapy communication manager 932 may be provided for facilitating secure therapy communications between clinician programmer 900 and a patient controller (not shown in this FIG.). Suitable software/firmware modules 920 may be provided as part of clinician programmer application 902 to effectuate appropriate user interfaces and controls, e.g., A/V GUIs, in association with an audio/video manager 922 for facilitating therapy/diagnostics control, parametric sweep control, file management, and/or other I/O functions as noted previously. Further, clinician programmer 900 may include an encryption module 912 similar to that of patient controller 800, wherein the encryption module 912 is operative in association and/or otherwise integrated with clinician programmer application 902 for encrypting a patient data file, e.g., dynamically on a line-by-line basis, during runtime using suitable techniques.

Similar to the PC operations described previously, example clinician device operations may also be configured or provisioned as privileged operations requiring enhanced clinician authentication protocols that may be implemented according to the biometric authentication schemes described herein. Accordingly, execution of such privileged clinician device operations may be contingent upon successful BA-based login operations in some example arrangements.

Figure 10:
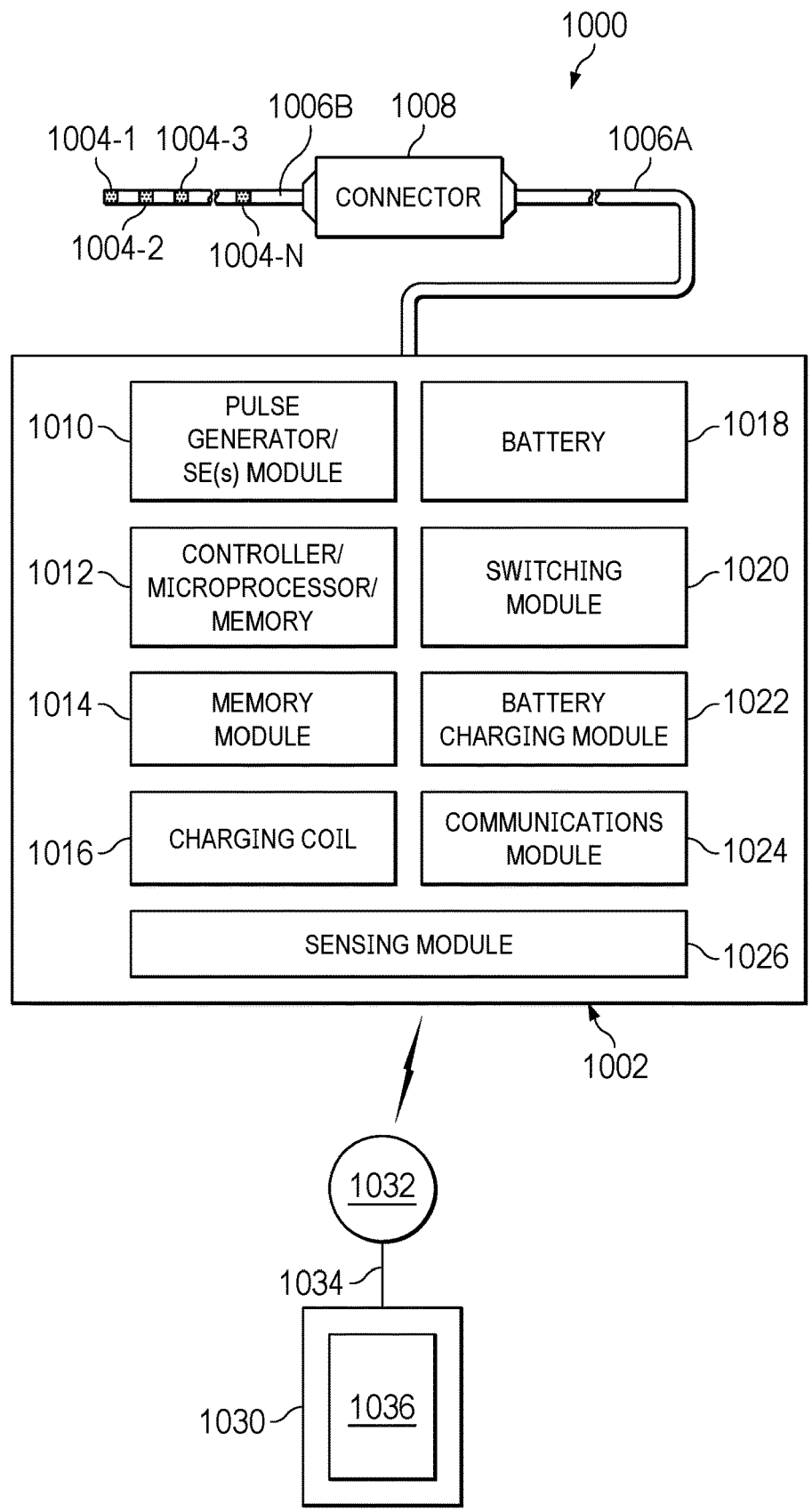
FIG. 10 depicts a block diagram of an IMD and associated system that may be configured for facilitating a remote care therapy application and/or a local therapy session upon completion of biometric authentication procedures according to some example embodiments of the present disclosure.

FIG. 10 depicts a block diagram of an IMD and associated system that may be configured for facilitating a remote care therapy application and/or a local therapy session by a biometrically authenticated user according to an example embodiment of the present disclosure. In general, therapy system 1000 may be adapted to generate electrical pulses to stimulate spinal cord tissue, peripheral nerve tissue, deep brain tissue, DRG tissue, cortical tissue, cardiac tissue, digestive tissue, pelvic floor tissue, or any other suitable biological tissue of interest within a patient's body, using an IMD or a trial IMD as previously noted. In one example embodiment, IMD 1002 may be implemented as having a metallic housing or can that encloses a controller/processing block or module 1012, pulse generating circuitry including or associated with one or more stimulation engines 1010, a charging coil 1016, a power supply or battery 1018, a far-field and/or near field communication block or module 1024, battery charging circuitry 1022, switching circuitry 1020, sensing circuitry 1026, a memory module 1014, and the like. IMD 1002 may include a diagnostic circuit module associated with a sensing module 1026 adapted to effectuate various diagnostics with respect to the state/condition of one or more stimulation electrodes and sensing electrodes of an implantable lead system as well as other bio/physiological sensors integrated or otherwise operative with IMD 1002. Controller/processor module 1012 typically includes a microcontroller or other suitable processor for controlling the various other components of IMD 1002. Software/firmware code, including digital healthcare application and encryption functionality, may be stored in memory 1014 of IMD 1002, and/or may be integrated with controller/processor module 1012. Other application-specific software code as well as associated storage components (not particularly shown in this FIG.) for execution by the microcontroller or processor 1012 and/or other programmable logic blocks may be provided to control the various components of the device for purposes of an embodiment of the present patent disclosure. As such, example IMD 1002 may be adapted to generate stimulation pulses according to known or heretofore known stimulation settings, programs, etc.

In one arrangement, IMD 1002 may be coupled (via a "header" as is known in the art, not shown in this FIG.) to a lead system having a lead connector 1008 for coupling a first component 1006A emanating from IMD 1002 with a second component 1006B that includes a plurality of electrodes 1004-1 to 1004-N, which may be positioned proximate to the patient tissue. Although a single lead system 1006A/1006B is exemplified, it should be appreciated that an example lead system may include more than one lead, each having a respective number of electrodes for providing therapy according to configurable settings. For example, a therapy program may include one or more lead/electrode selection settings, one or more sets of stimulation parameters corresponding to different lead/electrode combinations, respectively, such as pulse amplitude, stimulation level, pulse width, pulse frequency or inter-pulse period, pulse repetition parameter (e.g., number of times for a given pulse to be repeated for respective stimulation sets or "stimsets" during the execution of a program), etc. Additional therapy settings data may comprise electrode configuration data for delivery of electrical pulses (e.g., as cathodic nodes, anodic nodes, or configured as inactive nodes, etc.), stimulation pattern identification (e.g., tonic stimulation, burst stimulation, noise stimulation, biphasic stimulation, monophasic stimulation, and/or the like), etc. Still further, therapy programming data may be accompanied with respective metadata and/or any other relevant data or indicia.

External device 1030 may be deployed for use with IMD 1002 for therapy application, management and monitoring purposes, e.g., either as a patient controller device or a clinician programmer device, as noted previously. In general, electrical pulses are generated by the pulse generating circuitry 1010 under the control of processing block 1012, and are provided to the switching circuitry 1020 that is operative to selectively connect to electrical outputs of IMD 1002, wherein one or more stimulation electrodes 1004-1 to 1004-N per each lead 1006A/B may be energized according to a therapy protocol, e.g., by the patient or patient's agent (via a local session) and/or a clinician (via a local or remote session) using corresponding external device 1030. Also, external device 1030 may be implemented to charge/recharge the battery 1018 of IPG/IMD 1002 (although a separate recharging device could alternatively be employed), to access memory 1012/1014, and/or to program or reprogram IMD 1002 with respect to one or more stimulation set parameters including pulsing specifications while implanted within the patient. In alternative embodiments, however, separate programmer devices may be employed for charging and/or programming the IMD device 1002 device and/or any programmable components thereof. Software stored within a non-transitory memory of the external device 1030 may be executed by a processor to control the various operations of the external device 1030, including facilitating encryption of patient data logged in or by IMD 1002 and extracted therefrom. A connector or "wand" 1034 may be electrically coupled to the external device 430 through suitable electrical connectors (not specifically shown), which may be electrically connected to a telemetry component 1032 (e.g., inductor coil, RF transceiver, etc.) at the distal end of wand 1034 through respective communication links that allow bi-directional communication with IMD 1002. Alternatively, there may be no separate or additional external communication/telemetry components provided with external device 1030 in an example embodiment that uses BLE or the like for facilitating bi-directional communications with IMD 1002.

In a setting involving in-clinic or in-person operations, a user (e.g., a doctor, a medical technician, or the patient) may initiate communication with IMD 1002 upon proper authentication. External device 1030 preferably provides one or more user interfaces 1036 (e.g., touch screen, keyboard, mouse, buttons, scroll wheels or rollers, or the like), allowing the user to operate IMD 1002. External device 1030 may be controlled by the user through user interface 1036, allowing the user to interact with IMD 1002, whereby operations involving therapy application/programming, parametric window sweeping, coordination of patient data security including encryption, trial IMD data report processing, etc., may be effectuated.

Figure 11C:
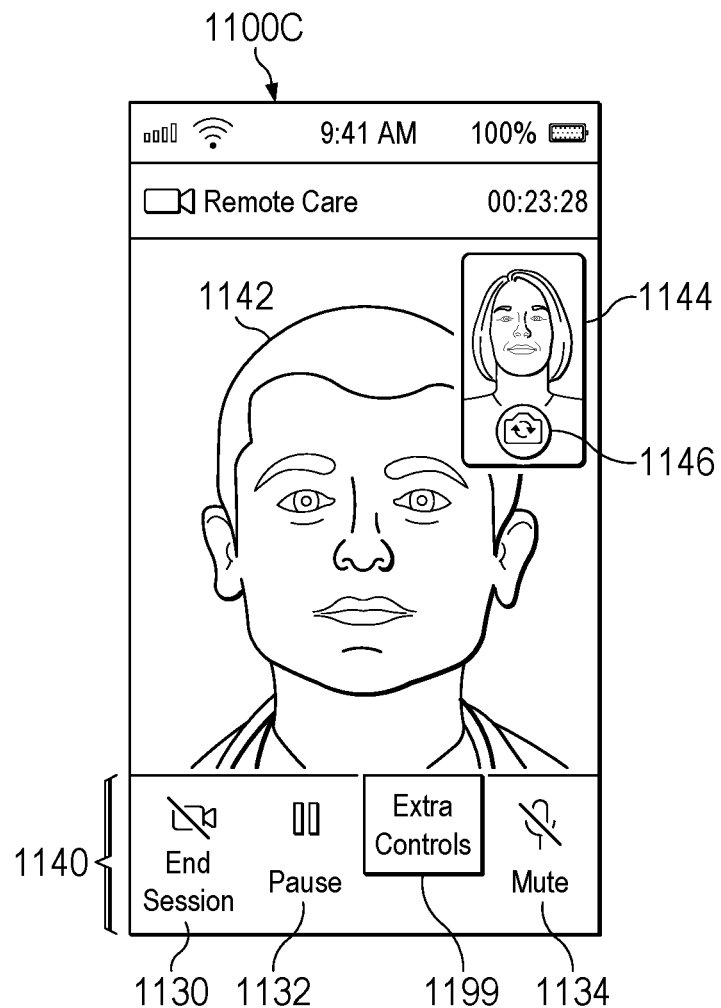

FIGS. 11A-11C depict representations of an example user interface and associated dialog boxes or windows provided with a patient controller device for facilitating biometric authentication login operations as well as for selecting different therapy applications and/or service modes for purposes of an embodiment of the present disclosure. In some example implementations, a patient controller device, e.g. device 150 shown in FIG. 1A or device 1320 shown in FIG. 13, may be provided with one or more non-transitory tangible computer-readable media or modules having program code stored thereon for execution on the patient controller device as part of or in association with a patient controller application, e.g., application 152, for facilitating remote therapy and telehealth applications in an integrated session having a common application interface. A code portion may be provided for displaying an login screen or window, e.g., biometric login window 1155 in FIG. 11A. Responsive to a login selection input by the patient, appropriate biometric indicia associated with the patient may be captured, which may be processed in combination with non-biometric indicia for authenticating the patient by a network entity as described in detail above. In some example configurations, one or several dialog boxes or menus may be effectuated by the patient controller application upon a successful BA login. By way of illustration, FIGS. 11A and 11B depict example GUI screens 1100A and 1100B of a patient controller device that allow user input with respect to various mode settings/selections, including the activation and deactivation of allowing a remote control programming (i.e., therapy) session to be conducted, etc. GUI display screen 1100A includes a mode selector 1102 that may be activated to show various mode settings which in turn may be selected, enabled or otherwise activated by using associated tactile controls. For example, modes such as "Airplane Ready" 1104A, "Surgery Mode" 1106A, "MRI Mode" 1108A, "Remote Control Mode" 1110A, "Trial Mode" 1112A, each having a corresponding swipe button 1104B-1112B are depicted. GUI screen 1100B illustrates a display that may be effectuated upon selecting or allowing Remote Control 1120 wherein a Remote Care Mode 1122A may be selected or enabled for activating remote therapy using a corresponding swipe button 1122B. A patient may therefore selectively permit the activation of remote therapy (i.e., remote programming of the IMD), whereby if activated and connected, a clinician can securely change or modify the therapy settings of the patient's IMD upon authentication by effectuating appropriate therapy setting controls and associated GUIs provided at a clinician device as previously set forth.

FIG. 11C depicts an example GUI display screen 1100C of the patient controller device during a remote care session that may be effectuated by a patient controller application upon biometrically authenticating a patient wherein an image of a selected clinician 1142 and an image of patient 1144 may be presented in a PIP display region. In one display mode, the patient's image 1144 may be presented as a smaller offset or overlay image and the clinician's image 1142 may be presented as a main, larger image. In some embodiments, the patient image window 1144 may be moved around the UI screen by "dragging" the image around the viewing window allocated to the clinician image 1142. An image swap control 1146 may be provided to swap the PIP display regions in another display mode, whereby the patient's image 1144 may be presented as the main, larger image whereas the clinician's image 1142 may be presented in a smaller overlay window.

In some embodiments, a control panel 1140 may also be presented as part of the GUI screen 1100C, wherein various AV communication session controls and remote therapy session controls may be displayed as suitable icons, pictograms, etc., in a consolidated GUI display as noted above. A video session icon 1130 may be activated/enabled or deactivated/disabled to selectively turn on or off the video channel of the session. A microphone icon 1134 may be activated/enabled or deactivated/disabled to selectively turn on or off the audio channel of the session. A pause/resume icon 1132 may be activated/enabled or deactivated/disabled to selectively pause or suspend, or resume the remote therapy session involving remote programming of the patient's IMD or any other remote digital healthcare application executing on the patient controller. In some implementations, activating or deactivating the video session icon 1130 may also be configured to turn on or off the remote therapy session. In some implementations, separate remote therapy session controls (e.g., start control, end control, etc. in addition to pause and resume controls) may be provided that are operative independent of the AV communication session controls. Still further, data labeling buttons may also be provided in a separate overlay or window of the GUI screen 1100C (not shown in this FIG.) to allow or otherwise enable the patent to input a subjective characterization of the AV data and therapy experience data as noted previously. In some arrangements, additional controls 1199 may also be provided for facilitating the selection of biometric indicia for additional/subsequent login operations, including the input of challenge responses, etc., as described previously.

In further variations of user authentication schemes set forth herein, some example embodiments may be configured to provide a biometric login functionality coupled with OTP provisioning according to the teachings of the present disclosure. Broadly, example embodiments may be configured so that a silent OTP may only be provided to legitimate authorized programming devices which are only accessed by authorized physicians as a token (e.g., "something you have") in conjunction with application-level biometric verification (e.g., "something you are") for passwordless multifactor authentication with respect to accessing cloud-based digital health services from a user application. In some arrangements, OTPs may also be used to encrypt the physicians' biometric data as another layer of protection along with the encryption wrapper functionality provided by a network level protocol (e.g., Transport Layer Security (TLS) protocol, which may be vendor- and/or equipment-specific in some implementations). Example embodiments may therefore be advantageously deployed in scenarios that will not only strengthen security protection of physicians' accounts by preventing attackers from exploiting physicians' weak or stolen credentials but also provide password-less login for physicians, which reduces the burden of entering password multiple times thereby mitigating the risk of exposure of the password credentials.

In some arrangements, an example OTP-mediated biometric scheme may involve service enrollment. By way of illustration, a physician's facial biometric data may be enrolled when the physician decides to activate a 'Biometric Login" feature of the clinician programming app on an authorized/provisioned device. In some arrangements, an OTP may be provided by a cloud-based system after authenticating the physician's biometric login request and successfully confirming that the user is in possession of the legitimate device and app. Depending on implementation, the OTP may be generated by a variety of services including but not limited to, e.g., push notification services such as Firebase Cloud Messaging (FCM), Apple Push Notification Service (APNS), Short Message Service (SMS), Email, etc. In some arrangements, therefore, the physician's facial biometric data is representative of "something you are" and the OTP data is representative of "something you have", which as a combination may be operative as a multifactor authentication (MFA) mechanism for the physician's account. In some arrangements, OTPs may be generated by the cloud system each time a physician sends a biometric login request after successful verification that the mobile/medical device being used is legitimate. Thereafter, the OTP may be used as a secret to generate a temporary one-time encryption key which may be used to protect the physician's privacy and biometric data. Accordingly, threat scenarios such as Man-in-The Middle (MiTM) attacks may be thwarted by encrypting the physician biometric data at enrollment phases as well as transactions involving login requests as will be seen below. The overall process of OTP generation and encryption may be executed in the background without the physician being aware of such operations. Such processes may therefore be considered a Silent OTP mechanism, which may be augmented in a biometric login scheme according to the teachings herein. In some arrangements, the medical programming app running on the UE device (e.g., a CP device) may be configured to send the user's biometric data to the cloud system to perform biometric verification in response to a biometric login, e.g., by comparison with the users' biometric data enrolled and stored in the cloud database. The biometric data may be encrypted using the OTP, which may then be wrapped by another encryption layer provided by TLS as previously noted.

Figure 16:
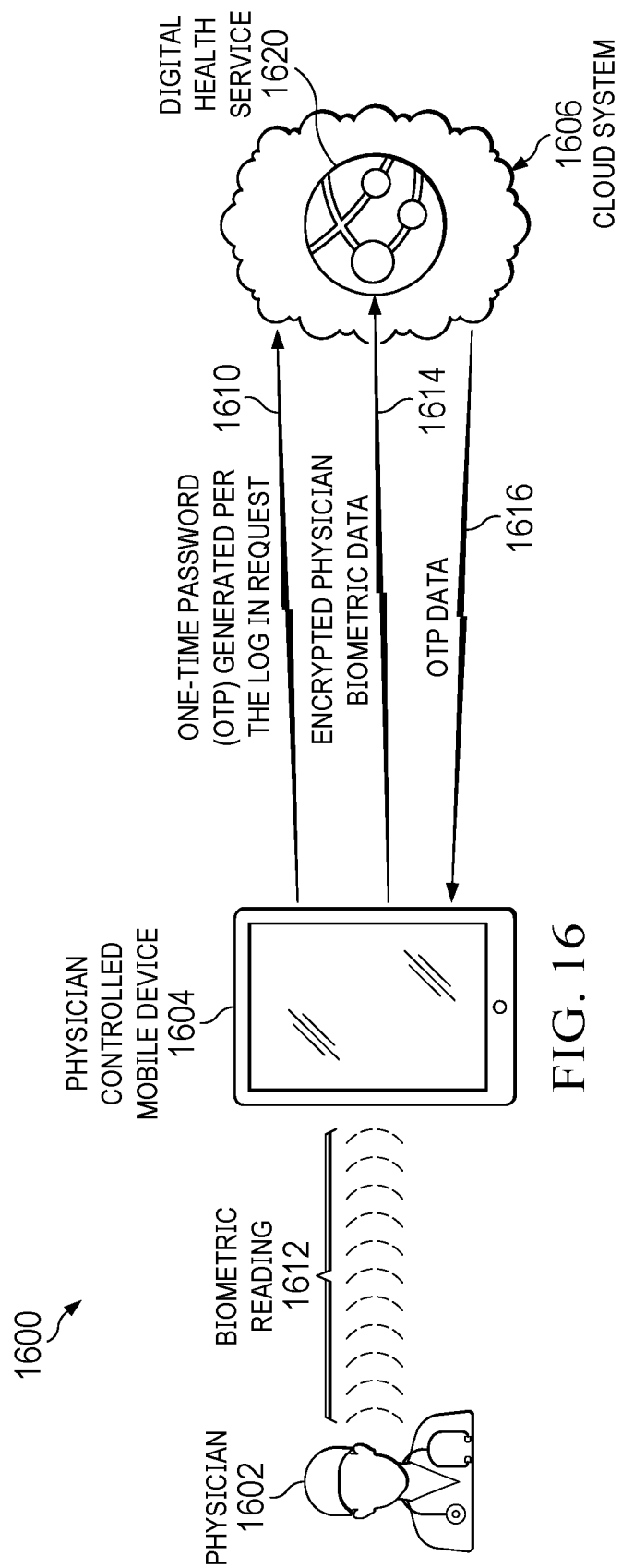
FIG. 16 depicts a high-level architecture of a biometric authentication system based on one-time passcode (OTP) generation according to some examples of the present disclosure.

Turning to FIG. 16, depicted therein is a high-level architecture 1600 of a biometric authentication system operating in conjunction with OTP according to some examples of the present disclosure. A user 1602 (e.g., a clinician) operating a UE device 1604 may initiate a biometric login request 1610, responsive to which OTP data 1616 may be provided by a cloud-based enrollment/authentication entity 1620 associated with a digital health service 1606. UE device 1604 may be configured to capture various pieces of the user's biometric data 1612, which may be encrypted by the OTP data 1616 for transmission as OTP-encrypted biometric data 1614 to the entity 1620 for verification and validation.

Aspects of the foregoing scheme are set forth in additional details immediately below in reference to one or more message flow diagrams and flowcharts.

FIG. 18A depicts a message flow diagram for effectuating an enrollment process with respect to providing OTP-based biometric authentication that may be implemented in a remote therapy scheme according to some embodiments. Example message flow 1800A is representative of message flows involving a user 1802, UE device 1804 and network-based enrollment and validation entities 1806 and 1808, which in some arrangements may be operative as or associated with EDMS/MDMS entities disposed in a digital healthcare architecture. In some arrangements, device information such as, e.g., camera specification (hardware/model/setting/resolution, etc.) and serial number of UE device 1804 may be enrolled and stored in the cloud system as part of a user's UE registration with an enrollment service for biometric authentication. In some arrangements, the device identity information (e.g., the serial number) may be used to enable future validation of the device to support the user's account enrollment or used to verify the legitimacy of the device which the user is requesting biometric login. In some arrangements, the device information (e.g., the camera specifications relating to the hardware, model, setting and resolution, etc.) may be used to adjust facial data or delta of captured images when the cloud system performs authentication of a biometric login request.

As part of the user's on-boarding or biometric login registration process, the user's baseline biometric data may be obtained and stored in the cloud system to enable future authentication transactions. Such data may be obtained by the biometric sensors associated with the UE device, e.g., 2D camera, 3D camera, or Touch ID and the like. In some arrangements, as an initial step of the biometric enrollment, the user may be required to successfully login by using a conventional login operation, e.g., by providing the user's registered username and password, as exemplified by operations 1810, 1812, 1814. Thereafter, the user may initiate a request to capture his/her biometric data pursuant to a register message 1816. In some arrangements, the cloud-based enrollment system may be configured to validate the identity of the UE device and generate an OTP code after the validation is successful. The generated OTP may be provided to UE device via any in-band or out-of-band communications. These operations are exemplified by operations 1818, 1820, 1822, 1824. UE device 1804 may obtain the user's biometric data, whereupon the medical app executing thereat may use the OTP data to encrypt the user's biometric data before sending it to the cloud system. In some arrangements, the cloud system may convert the biometric data into Hex strings data and store the Hex strings data instead of the raw biometric data. In various permutations and/or combinations, example biometric data include any set or subset of the following: (i) 2D facial data including multiple capture images with different angles (e.g., by head-turning or moving the camera) or using different emotional states (e.g., smiling, no smiling, blinking, sad, etc.) to mitigate the risk posed by hacking; (ii) 3D facial contouring wherein the topography/coordinates of the user's face may be captured via a front-facing camera and depth sensors; (iii) fingerprint data is captured via Touch ID; and (iv) ocular image data (e.g., retinal or iris image etc.), and the like. In some arrangements, the cloud system 1808 may generate a decryption key based on the OTP, which may be used for decrypting the received encrypted biometric data. In some arrangements, the decrypted biometric data may be stored at the device enrollment/management node 1806 as a baseline biometric data of the user 1802. These operations are exemplified by operations 1826, 1828, 1830, 1882, 1834, 1836, 1838 in FIG. 18A. Thereafter, a registration/enrollment complete message 1840 may be provided to UE device 1840.

FIG. 18B depicts a message flow 1800B for effectuating a biometric login transaction involving a registered/enrolled device and user (e.g., UE device 1804 and user 1802) according to some embodiments. In one arrangement, user 1802 may attempt, via the medical app executing on UE device 1804, to use "Biometric Login" instead of "Username and Password" option to access the application and/or appropriate services and resources associated therewith. In one arrangement, the medical app may be configured to read, determine or otherwise obtain the serial number of UE device 1804, whereupon the biometric login request and the serial number information may be transmitted to the cloud system 1808. Upon receipt of the biometric login request and serial number information, an authentication service node disposed in the cloud system 1808 may validate the received serial number by comparing it to the stored data of the authorized devices in the cloud. If the validation is successful, the authentication service node may generate an OTP and transmit it to the device application. These operations are exemplified by operations 1850, 1852, 1854, 1856, 1858. Thereafter, the device application captures the user's biometric data, encrypts it with a temporary encryption key derived from the received OTP, and sends the encrypted biometric data to the cloud system, as exemplified by operations 1860, 1862, 1864, 1866. Upon receipt of the user's encrypted biometric data, the authentication service in the cloud system 1808 derives a temporary decryption key from the OTP, decrypts the encrypted data, and compares the decrypted data to the (pre) enrolled baseline data for verification, e.g., by using advanced analytics such as facial recognition, facial topography or fingerprint recognition, etc. In some arrangements, AI/ML-based image recognition methods may be applied to determine a confidence threshold level as part of comparing the biometric data received in the login transaction against the (pre) enrolled baseline data for validation. These operations are exemplified by operations 1868, 1870, 1872. Depending on validation or non-validation, suitable messages may be provided to UE device 1804 as part of an authentication login result. For example, if validated, authorized data and/or service features may be provided to user 1802 via a display. On the other hand, if the authentication has failed, a login failure message may be displayed to user 1802. These operations are exemplified as operations 1874, 1876, 1878, 1880 in FIG. 18B. In some arrangements involving digital healthcare, a medical application executing on UE device 1804 may therefore be configured to control, upon successful authentication, the specific aspects of the application available to the clinician based on the clinician's privileges, e.g., including providing remote care therapy to a patient (who for instance may have similarly been authenticated based on the patient's biometric indicia) as well as engaging in data retrieval/transfer from the patient's device(s).

As new UE devices and associated medical applications may be developed, additional and/or improved biometric indicia may be available that may be less susceptible to attacks by malicious parties and therefore more advantageous to use in a BA-based login scheme according to the teachings herein. In some further variations, an example embodiment may therefore be configured to provide a dynamic re-baselining of a user's biometric data while still utilizing an OTP-based additional layer of security. For example, dynamic re-baselining of the biometric data may be effectuated by replacing the old biometric data of a user in some arrangements. In additional and/or alternative arrangements, new baselines may be dynamically added to the existing/prior baselines, which may be selectively applied based on network conditions and/or (updated) user profile settings. In some arrangements, replacing or updating the old biometric data with new data may be performed if there are some changes in physician's biometric data (e.g., within certain "delta") over time. If any updates are needed, such operations may be performed to improve the accuracy and confidence thresholds of a BA-based login scheme during its deployment. Adding a new set of biometric indicia (e.g., a different type of biometric data) may also be needed when there are old mobile/clinician devices and new models of the provisioned devices are used in the same VC environment in order to maintain backward compatibility. In an example implementation, the cloud-based authentication/enrollment system may be updated to recognize what type of UE devices that a user is using to login by the information provided in OTP verification and generation process. Responsive thereto, the biometric authentication process may be directed to the corresponding biometric baseline database for facilitating proper validation operations. As such, biometric login processes and OTP methodology may therefore be configured to continue to be capable of adapting the new biometric sensing features, preferably with higher confident levels, without needing any significant change in the processes or signal flows.

FIG. 18C depicts a message flow 1800C for effectuating a dynamic re-baselining of biometric data with respect to a registered/enrolled device and user (e.g., UE device 1804 and user 1802) according to some embodiments. In general, example message flow 1800C is substantially similar to the message flow 1800A described hereinabove with respect to initial registration and enrollment, except that a new biometric registration request 1882 and associated device information transmission 1884 and OTP generation/transmission processes 1886, 1888 and new biometric data collection 1890 may be effectuated herein. Accordingly, the description relating to the message flow diagram 1800A may be equally applied here, mutatis mutandis, for purposes of some example embodiments. The new/updated biometric data may be encrypted using a new OTP and the encrypted updated biometric data may be transmitted to the cloud system 1808 for decryption and storage as needed (e.g., including updated confidence levels in some arrangements), as exemplified by operations 1892, 1894, 1896. Thereafter, a registration complete message 1840 may be provided by the enrollment system 1806 as before.

Figure 17A:
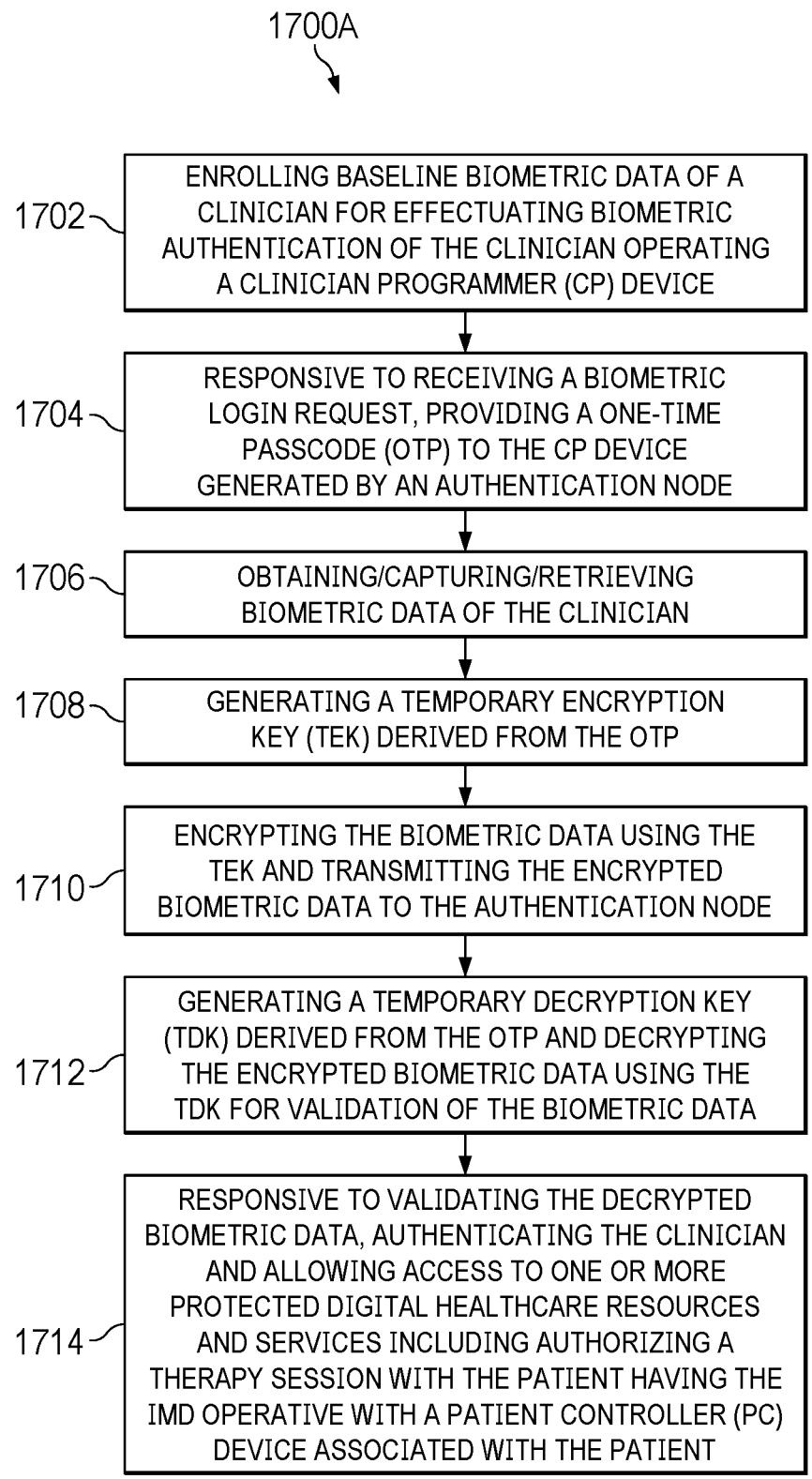
FIGS. 17A and 17B are flowcharts depicting blocks, acts, functions or acts that may be (re) combined with or without other flowcharts of the present disclosure for effectuating biometric authentication based on OTP according to some embodiments.
Figure 17B:
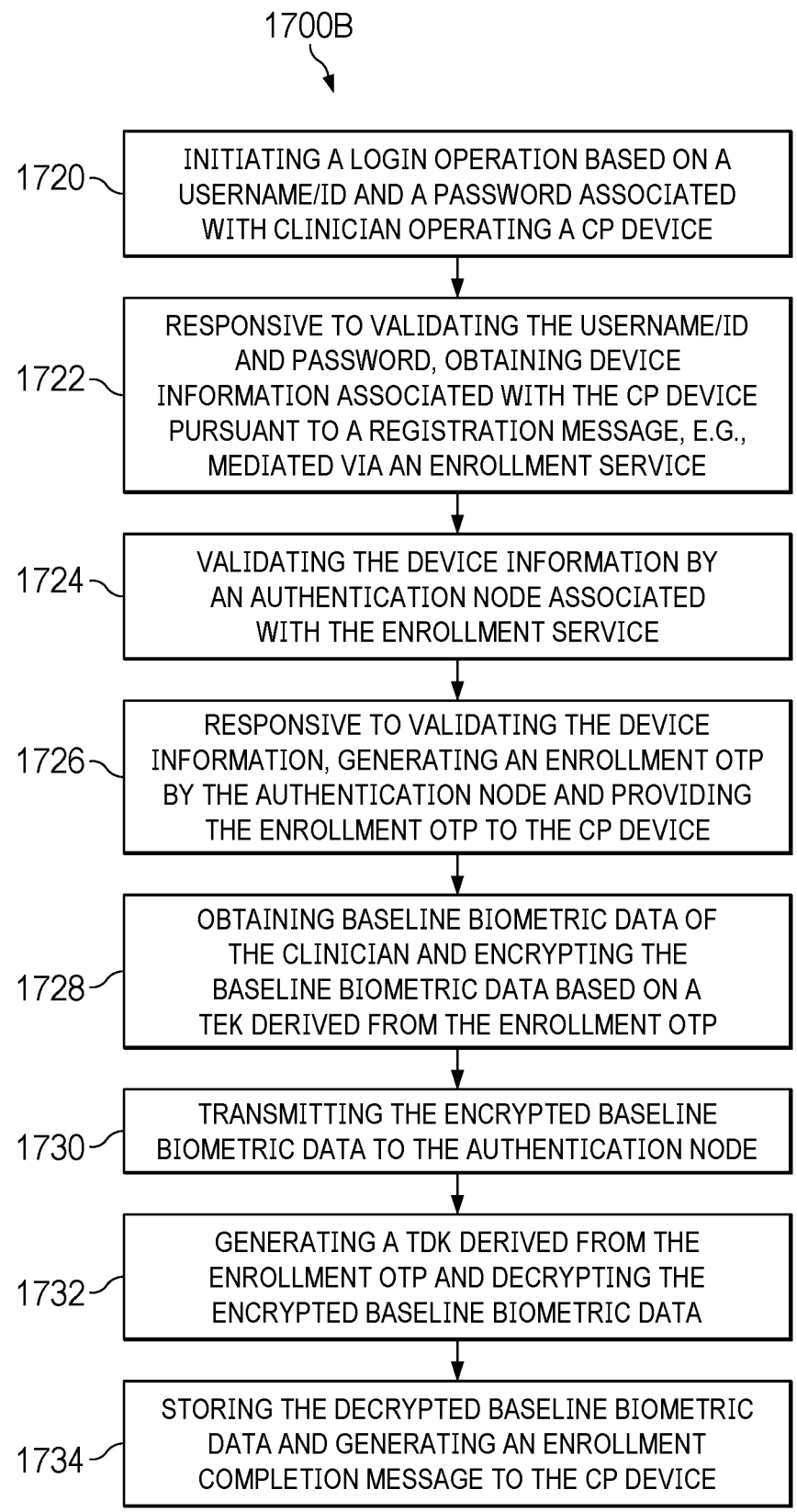

FIGS. 17A and 17B are flowcharts depicting blocks, acts, functions or acts that may be (re) combined with or without other flowcharts of the present disclosure for effectuating biometric authentication based on OTP according to some embodiments. Similar to the description set forth above with respect to the embodiments shown in FIGS. 15A-15E, example methodologies herein may be practiced as part of a scheme for remotely programming an IMD based on suitable biometric authentication comporting with one or more of the message flows described above. In particular, process flow 1700A shown in FIG. 17A is representative of a method of facilitating authentication of a clinician operating a CP device configured to execute a medical application operative for providing therapy to a patient by interacting with an IMD/NIMI device of the patient. At block 1702, baseline biometric data of the clinician may be enrolled for effectuating biometric authentication of the clinician. At block 1704, responsive to receiving a biometric login request, an OTP generated by an authentication node may be provided to the CP device. At block 1706, appropriate biometric data of the clinician may be gathered, sensed, retrieved or otherwise obtained depending on the CP device capabilities. At block 1708, a temporary encryption key (TEK) derived from the OTP may be generated the CP device. At block 1710, the biometric data may be encrypted using the TEK according to known or heretofore unknown cryptography techniques. Thereafter, the encrypted biometric data may be transmitted to the authentication node for validation. Responsive thereto, a temporary decryption key (TDK) based on the OTP may be generated by the authentication node, which may be used for decrypting the encrypted biometric data for validation thereof (block 1712). Responsive to validating the decrypted biometric data, the clinician may be authenticated and allowed access to one or more protected digital healthcare resources and services, e.g., including establishing a therapy session with the patient having the IMD operative with a PC device associated with the patient (block 1714). As previously noted, various remote programming operations, data retrieval/transfer, A/V session operations, etc., may be effectuated using a VC platform which the patient may also be authenticated to access.

Process flow 1700B shown in FIG. 17B is representative of a BA login enrollment process according to some embodiments. At block 1720, a login operation based on a user name and a password associated with the clinician may be initiated. Responsive to validating the user name and the password by an authentication node, various pieces of device information associated with the CP device may be obtained pursuant to a registration message as set forth at block 1722. At block 1724, the device information may be validated by the authentication node. Responsive to validating the device information, an enrollment OTP may be generated by the authentication node, which may be provided to the CP device using known or heretofore unknown notification systems including silent push notification mechanisms (block 1726). Thereafter, the baseline biometric data of a user (e.g., the clinician) may be obtained and encrypted based on a TEK derived from the enrollment OTP (block 1728). As set forth at blocks 1730 and 1732, the encrypted biometric data may be transmitted to the authentication node which may be configured to generate a TDK based on the enrollment OTP for decrypting the received encrypted baseline biometric data. The decrypted baseline biometric data may be stored for future transaction validations as noted previously. Further, an enrollment completion message may be provided to the CP device (block 1734).

Figure 19B:
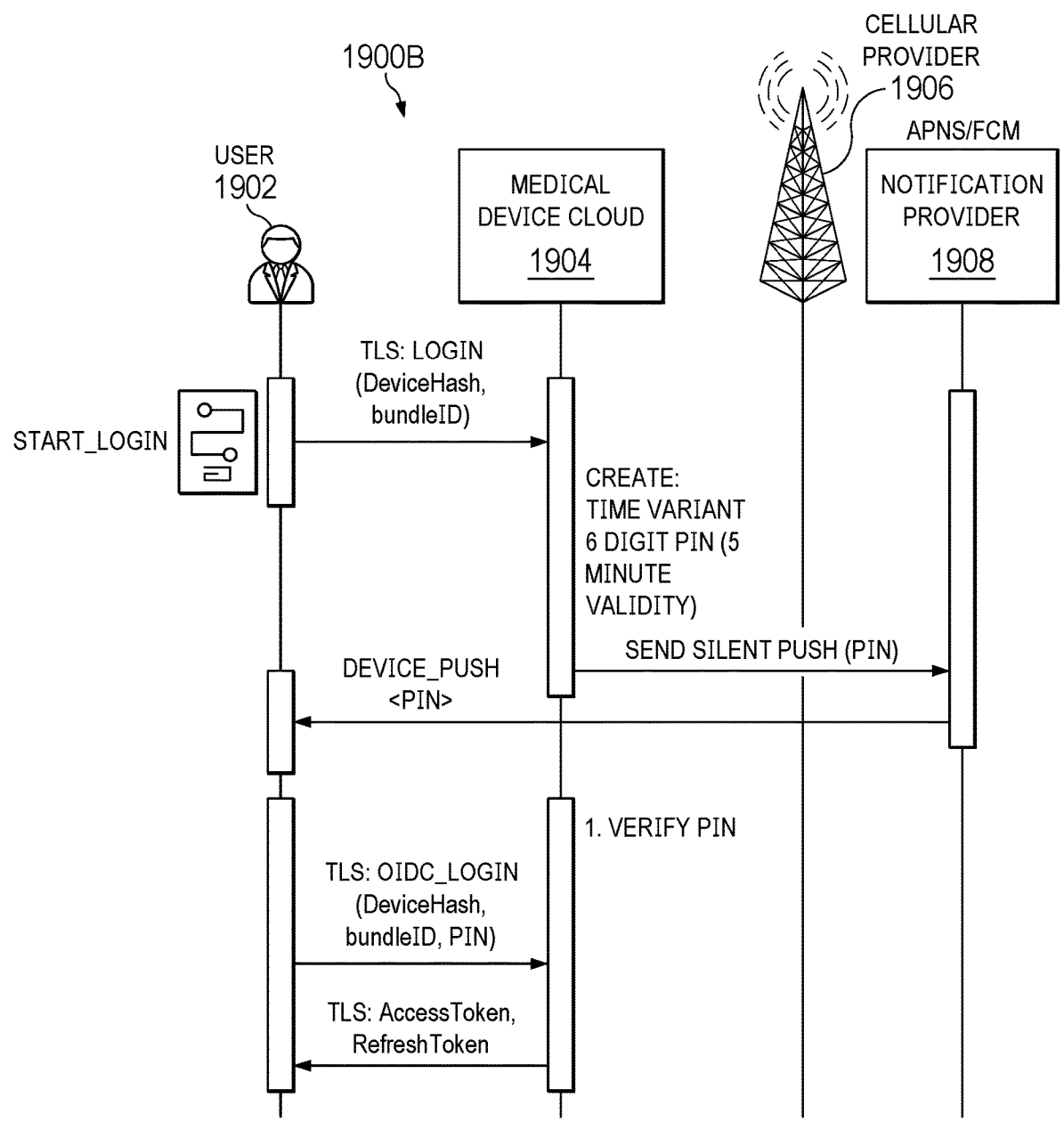

FIGS. 19A and 19B depict message flow diagrams for facilitating medical device/application registration according to some additional or alternative embodiments that may be implemented in conjunction with a biometric authentication system in an example arrangement. In particular, message flow 1900A shown in FIG. 19A is representative of a scheme for facilitating initial registration of a medical device app with respect to a user 1902 within a suitable infrastructure comprising a medical device cloud 1904 (which in some embodiments may be associated with an EDMS/MDMS system disposed in a digital healthcare network environment described above in reference to FIGS. 1A/1B and FIG. 12), a cellular telephony system 1906 as well as a notification provider 1908. In message flow 1900A of FIG. 19A, user 1902 registers the user's app for medical device related operations (e.g., remote care, remote diagnostics, remote programming, and/or the like) for use on a user device (e.g., a smartphone, smartwatch, tablet, etc.). The user may be a patient with a medical device and/or an appropriate clinician. When the user initially accesses the app on the device, the user enters the user's phone number, as an example, for the patient device into a suitable user interface component of the app. The app constructs one or more registration messages for communication to the medical device cloud/infrastructure (see, e.g., FIGS. 1A/1B and FIG. 12), wherein a message may include the entered phone number and a device hash (e.g., from device and/or app specific data). The cloud/infrastructure may create a one-time PIN and store the PIN with the device hash and phone number for later processing. As part of this initial registration stage, the medical device cloud/infrastructure 1904 may generate one or more reply messages. In one arrangement, the reply message(s) may include a one-time PIN for communication back the patient device via SMS messaging.

Upon receipt of the one or more reply messages by the user device, user 1902 enters the one-time PIN and grants push notification permission. Thereafter, additional messaging between the user medical device app and the cloud/infrastructure 1904 may be effectuated to enable enrollment of the app and/or user device for push notifications according to embodiments disclosed herein, wherein at least part of the messaging may be performed using TLS for security.

Message flow 1900B shown in FIG. 19B is representative of a scheme for facilitating authentication of a user (e.g., user 1902) after initial registration within a network environment as set forth above. In one arrangement, user 1902 may access the app (after the initial registration/enrollment of FIG. 19A), e.g., by touching the app icon on the user's device. The app constructs a device hash using the same methodology as used in message flow 1900A. The device hash is utilized to uniquely identify the respective app. The hash may be constructed from app specific identifiers and/or hardware/device specific identifiers. The hash may also be constructed using time-dependent information and/or processing to prevent so-called "replay" exploits. Other relevant information may be communicated such as "bundleID" data which may identify specific software distribution information including one or more developer identifiers. In some arrangements, the medical device cloud/infrastructure 1904 creates a PIN that is only valid for a limited time frame (e.g., 5 minutes, 10 minutes, etc.). The PIN is then communicated back to the user device using a silent push mechanism facilitated by notification provider 1908. In some embodiments, the silent push mechanism may be configured to limit the return message to only apps or applications having the proper developer credential(s), identifier(s), and/or digital signature(s).

Upon receipt of the push messaging at the user device, the user device processes the push messaging (e.g., according to the developer identity) and, if appropriate, provides the messaging to the user's medical device app. The medical device app communicates the PIN to the medical device cloud/infrastructure 1904 through the app communication connection with the medical device cloud/infrastructure 1904. A session token identifier (e.g., an access token) may then be communicated to the medical device app to support a remote care, remote diagnostic, remote programming session (e.g., according to the described operations of the '177 patent referenced hereinabove).

Figure 20:
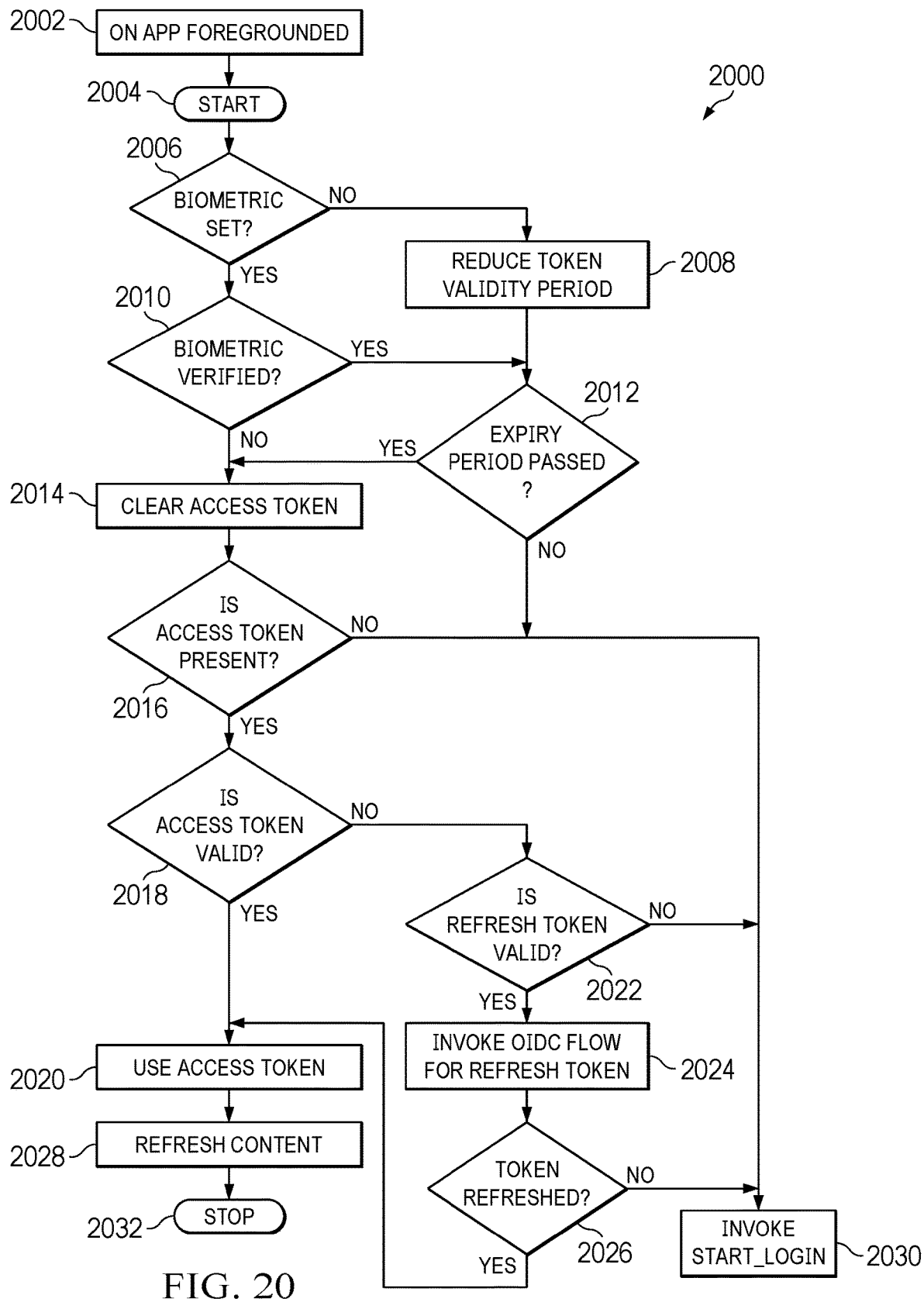
FIG. 20 is a flowchart depicting an example process for token modulation that may be implemented in conjunction with a biometric authentication system according to some embodiments.

FIG. 20 is a flowchart depicting an example process 2000 for facilitating token modulation that may be implemented in conjunction with a biometric authentication system according to some embodiments. The process flow 2000 may be performed at any suitable time to "refresh" the access token received in an authentication process, e.g., as exemplified in FIG. 19B. For example, one or more refresh operations may occur based on timer expiration and/or other suitable conditions. Initially, the medical device app transitions to a foreground state (e.g., the user touches the app icon to interact with or otherwise access the app), which facilitates example process flow 2000, as set forth at blocks 2002 and 2004. Biometric operations may occur to enhance app and/or user security. For example, certain smartphones include facial and/or fingerprint recognition features as described above, and such built-in features may be employed for authentication operations. If biometric authentication fails or is unavailable, the token validity period may be reduced. The current access token is examined to determine whether it is has expired or is otherwise invalid. Based on the examination, the app may clear the current access token and obtain an updated access token (e.g., using process flow of FIG. 19B). The foregoing operations are exemplified at blocks 2006, 2008, 2019, 2012, 2014. Updating an access token may be based on determining the validity of a refresh token, which may facilitate invoking of an OpenID Connect (OIDC) flow. After such refresh operations and/or using a previously obtained valid token, the app initiates a remote care, remote diagnostic, remote programming, or similar session or other privileged operations using the valid token, which may continue until termination. The foregoing operations are exemplified at blocks 2016-2032.

Figure 21:
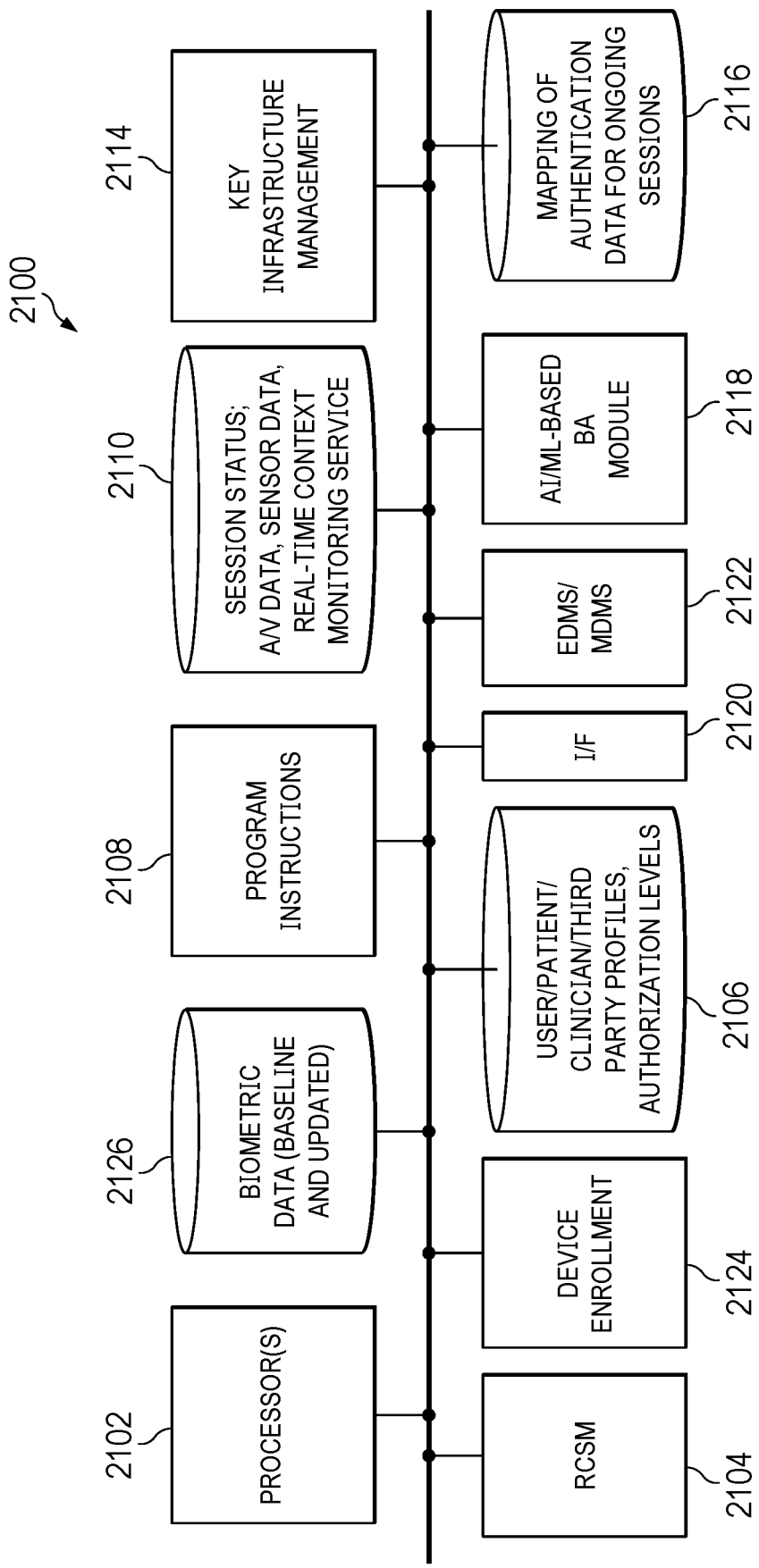
FIG. 21 depicts a block diagram of a system, apparatus or a computer-implemented platform that may be configured as a cloud-based infrastructure for facilitating biometric authentication in a VC environment for purposes of some example embodiments of the present disclosure.

FIG. 21 depicts a block diagram of a system, apparatus or a computer-implemented platform that may be configured as part of a digital healthcare datacenter deployed in a cloud network infrastructure for purposes of some example embodiments of the present disclosure as set forth in detail above. It will be appreciated that various portions of apparatus 2100 may be arranged or rearranged to effectuate different aspects relative to digital healthcare, e.g., VC functionality, device provisioning and enrollment, biometric authentication, remote care session management, and the like. Depending on implementation and deployment, accordingly, apparatus/platform 2100 may be configured in a loosely-coupled architecture, a tightly-coupled architecture, a distributed architecture, etc. with respect to the various components, modules and subsystems associated therewith, which may be deployed as VC platform 1352 and/or BA platform 1354 described hereinabove. One or more processors 2102 may be operatively coupled to various modules that may be implemented in one or more persistent memory units for executing suitable program instructions or code portions (e.g., code portion 2108) with respect to effectuating device enrollment and biometric authentication, etc., in combination with one or more modules. In additional and/or alternative arrangements, code portion 2108 may also include modules for effectuating remote device management, establishment of trusted associations, interfacing with encryption key management systems, and the like, as described previously. In some arrangements, code portion 2108 may therefore be executed in association with one or more other modules and/or databases of the platform 2100 for facilitating various functionalities such as remote care session management (RCSM), key infrastructure management, etc. As skilled artisans will recognize, the program instructions or code portions provided as part of the platform 2100 may therefore be configured in a number of ways in association with various modules and subsystems operative to execute one or more process flows described in the present disclosure. Accordingly, an RCSM module 2104, a device enrollment/validation module 2124, a real-time context monitoring service (RTCM) and session status module 2110, a key infrastructure management module 2114, AI/ML-based BA module 2118 and a device management module 2122 (e.g., a centralized EDMS or MDMS) operative with device enrollment module 2124 may be provided for implementing one or more example embodiments of the present disclosure. Various databases and subsystems may be included for storage of baseline/updated biometric data, session data, A/V data, physician-to-patient mapping data, etc., e.g., databases 2110, 2126, 2116, that may be utilizing in executing one or more BA-based access control processes as described above. Further, user/patient/clinician profiles and associated authorization level data may be provided as a database 2106 in some implementations of apparatus 2100. Although not specifically shown herein, an IMD trust indicia verification module may be provided to create, maintain and store bonding associations between IMDs and clinician devices, which may be used for verification/bonding of patient/clinician controllers/devices in some embodiments. One or more patient history database(s) and user database(s) may also be provided in some embodiments wherein the database(s) are operative to maintain and store patients' historical data relating to different therapies, biophysiological conditions monitoring, etc., as well as patient profile data, clinician profile data, and the like, that may be provided as part of a database, e.g., database 2106. In some arrangements, therapy settings, stimulation application programs, stimulation level thresholds and limits, etc., may be stored in a related database, e.g., on a patient-by-patient basis and/or IMD-by-IMD basis, which may also include user-labeled therapy settings and session quality data, PRO data, etc., wherein the stored data may be made available to BA-validated remote clinicians engaged in a particular therapy session. In some example arrangements, user-labeled data may be generated either at patient controllers, clinician programmers, or both, and appropriate user-labeled data records may be generated at either devices and/or at the platform 2100 under control of suitable program instructions configured as a record generator module. In some embodiments, security management operations provided as part of platform 2100 may be deployed in association with key infrastructure management module 2114 for interfacing with and/or proxying clinician devices and patient devices, which may be contingent on appropriate BA validation for purposes of some example embodiments herein. In some arrangements, platform 2100 may also include an authentication mapping functionality wherein users' authentication data may be mapped to ongoing sessions in which the users are currently involved, e.g., in database 2116. Further, valid physician-to-patient mappings may be maintained as part of the database 2116 for BA-validated patients and physicians after respective BA login validations and establishment of therapy sessions therebetween. In a further embodiment, example platform 2100 may include one or more Big Data analytics module(s), not specifically shown herein, operative with AI/ML engines 2118 for performing BA validation as described previously. A plurality of network interfaces (I/F) 2120 may be provided for interfacing with various external nodes, end user equipment or edge devices, or infrastructural elements, e.g., involving access and/core communications networks, external databases, cryptographic key infrastructure nodes, push notification provider networks, business support system nodes, third-party healthcare provider networks, and the like. In still further arrangements, various components, subsystems and modules of platform 2100 may be implemented as virtual elements configured to provide healthcare resources and services as part of an architecture involving Software as a Service (Saas) services, Platform as a Service (PaaS) services, Infrastructure as a Service (IaaS) services, Storage as a Service (STaaS) services, etc.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Moreover, the scope of the present application is not intended to be limited to the particular embodiments of the process, machine, manufacture, composition of matter, means, methods and steps described in the specification.

In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and may not be interpreted in an idealized or overly formal sense expressly so defined herein.

At least some example embodiments are described herein with reference to one or more circuit diagrams/schematics, block diagrams and/or flowchart illustrations. It is understood that such diagrams and/or flowchart illustrations, and combinations of blocks in the block diagrams and/or flowchart illustrations, can be implemented by any appropriate circuitry configured to achieve the desired functionalities. Accordingly, example embodiments of the present disclosure may be embodied in hardware and/or in software (including firmware, resident software, micro-code, etc.) operating in conjunction with suitable processing units or microcontrollers, which may collectively be referred to as "circuitry," "a module" or variants thereof. An example processing unit or a module may include, by way of illustration, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGA) circuits, any other type of integrated circuit (IC), and/or a state machine, as well as programmable system devices (PSDs) employing system-on-chip (SoC) architectures that combine memory functions with programmable logic on a chip that is designed to work with a standard microcontroller. Example memory modules or storage circuitry may include volatile and/or non-volatile memories such as, e.g., random access memory (RAM), electrically erasable/programmable read-only memories (EEPROMs) or UV-EPROMS, one-time programmable (OTP) memories, Flash memories, static RAM (SRAM), etc.

Further, in at least some additional or alternative implementations, the functions/acts described in the blocks may occur out of the order shown in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Furthermore, although some of the diagrams include arrows on communication paths to show a primary direction of communication, it is to be understood that communication may occur in the opposite direction relative to the depicted arrows. Finally, other blocks may be added/inserted between the blocks that are illustrated.

It should therefore be clearly understood that the order or sequence of the acts, steps, functions, components or blocks illustrated in any of the flowcharts depicted in the drawing Figures of the present disclosure may be modified, altered, replaced, customized or otherwise rearranged within a particular flowchart, including deletion or omission of a particular act, step, function, component or block. Moreover, the acts, steps, functions, components or blocks illustrated in a particular flowchart may be inter-mixed or otherwise inter-arranged or rearranged with the acts, steps, functions, components or blocks illustrated in another flowchart in order to effectuate additional variations, modifications and configurations with respect to one or more processes for purposes of practicing the teachings of the present patent disclosure.

Although various embodiments have been shown and described in detail, the claims are not limited to any particular embodiment or example. None of the above Detailed Description should be read as implying that any particular component, element, step, act, or function is essential such that it must be included in the scope of the claims. Where the phrases such as "at least one of A and B" or phrases of similar import (e.g., "A and/or B") are recited or described, such a phrase should be understood to mean "only A, only B, or both A and B." Reference to an element in the singular is not intended to mean "one and only one" unless explicitly so stated, but rather "one or more." Moreover, the terms "first," "second," and "third," etc. employed in reference to elements or features are used merely as labels, and are not intended to impose numerical requirements, sequential ordering or relative degree of significance or importance on their objects. All structural and functional equivalents to the elements of the above-described embodiments that are known to those of ordinary skill in the art are expressly incorporated herein by reference and are intended to be encompassed by the present claims. Accordingly, those skilled in the art will recognize that the exemplary embodiments described herein can be practiced with various modifications and alterations within the spirit and scope of the claims appended below.

The invention claimed is:

1. A method of remotely programming an implantable medical device (IMD) that provides therapy to a patient, comprising:
    establishing a first communication between a patient controller (PC) device and the implantable medical device, wherein the implantable medical device provides therapy to the patient according to one or more programmable parameters, the PC device communicates signals to the implantable medical device to set or modify the one or more programmable parameters, and the PC device comprises a video camera;

establishing a video connection between the PC device and a clinician programmer (CP) device of a clinician for a remote programming session in a second communication that includes an audio/video (A/V) session; and modifying a value for one or more programmable parameters of the implantable medical device according to signals from the CP device during the remote programming session, wherein the method further comprises:
  responsive to a login operation initiated by the clinician operating the CP device prior to establishing the second communication, obtaining a facial image and a voice input from the clinician;
  determining at least one of a geofence associated with the CP device and an access point (AP) identity (ID) associated with an AP node to which the CP device is connected;
  adjusting a complexity level of a challenge query responsive to a combination of corresponding scores associated with the facial image and voice input of the clinician, the geofence and the AP identity, respectively;
  providing the challenge query having the adjusted complexity level to the clinician; and
  responsive to a response input from the clinician, allowing the clinician to access a medical application on the CP device for launching the remote programming session with the patient;
  determining that an additional challenge query having a different complexity level is required;
  providing the additional challenge query having the different complexity level to the clinician;
  responsive to an additional response input from the clinician, providing access to the clinician with respect to the medical application;
  obtaining a historical record of AP IDs associated with network connections previously established by the UE device with respect to the medical application; and
  adjusting the complexity level of the challenge query further based on the historical record of the AP IDs.

2. The method as recited in claim 1, wherein the complexity level of the challenge query is determined by a machine language (ML)-based authentication engine executing at a network node.

3. The method as recited in claim 1, further comprising, responsive to a login operation initiated by the patient operating the PC device prior to establishing the first communication, determining that the patient is allowed to engage in the remote programming session based on a biometric authentication of the patient.

4. The method as recited in claim 3, wherein the biometric authentication of the patient involves a challenge query determined responsive to the patient's biometric indicia.

5. The method as recited in claim 3, further comprising, responsive to determining that the patient is allowed access, pairing the PC device with a smart wearable medical device associated with the patient.

6. The method as recited in claim 3, further comprising responsive to determining that the patient is allowed access, establishing a local communication link between the IMD and the PC device of the patient.

7. The method as recited in claim 1, further comprising responsive to determining that the clinician is allowed access, establishing the remote programming session with the patient using a virtual clinic (VC) platform disposed in a network.

8. A method of remotely programming an implantable medical device (IMD) that provides therapy to a patient, comprising:
  establishing a first communication between a patient controller (PC) device and the implantable medical device, wherein the implantable medical device provides therapy to the patient according to one or more programmable parameters, the PC device communicates signals to the implantable medical device to set or modify the one or more programmable parameters, and the PC device comprises a video camera;
  establishing a video connection between the PC device and a clinician programmer (CP) device of a clinician for a remote programming session in a second communication that includes an audio/video (A/V) session; and
  modifying a value for one or more programmable parameters of the implantable medical device according to signals from the CP device during the remote programming session,
  wherein the method further comprises:
    responsive to a login operation initiated by the patient at the PC device prior to establishing the first communication, determining a proximity of the PC device with respect to the IMD of the patient; and
    responsive to the proximity of the PC device with respect to the IMD and one or more biometric indicia of the patient, authenticating the patient and allowing access to the remote programming session with the clinician;
    determining that an additional challenge query having a different complexity level is required;
    providing the additional challenge query having the different complexity level to the clinician;
    responsive to an additional response input from the clinician, providing access to the clinician with respect to the medical application;
    obtaining a historical record of AP IDs associated with network connections previously established by the UE device with respect to the medical application; and
    adjusting the complexity level of the challenge query further based on the historical record of the AP IDs.

9. The method as recited in claim 8, wherein the one or more biometric indicia comprises a voice signature from the patient.

10. The method as recited in claim 8, further comprising:
  authenticating the clinician using a plurality of indicia comprising a facial image of the clinician, a voice input from the clinician, a geofence associated with a clinician programmer (CP) device operated by the clinician, and an access point (AP) identity (ID) associated with an AP node to which the CP device is connected; and
  responsive to determining that the clinician is authenticated, establishing the remote programming session with the patient via a virtual clinic (VC) platform; and
  facilitating remote programming of the IMD by the clinician for providing therapy to the patient.

11. The method as recited in claim 10, further comprising:
responsive to determining that the patient and the clinician are authenticated, pairing the PC device with a smart wearable medical device associated with the patient; and
facilitating transfer of the patient's health data from the smart wearable medical device to the CP device.

12. A method of remotely programming an implantable medical device (IMD) that provides therapy to a patient, comprising:
establishing a first communication between a patient controller (PC) device and the implantable medical device, wherein the implantable medical device provides therapy to the patient according to one or more programmable parameters, the PC device communicates signals to the medical device to set or modify the one or more programmable parameters, and the PC device comprises a video camera;
establishing a video connection between the PC device and a clinician programmer (CP) device of a clinician for a remote programming session in a second communication that includes an audio/video (A/V) session, the remote programming session; and
modifying a value for one or more programmable parameters of the implantable medical device according to signals from the CP device during the remote programming session,
wherein the method further comprises:
prior to establishing the first communication between the PC device and the implantable medical device, authenticating the patient using a plurality of indicia including a proximity of the PC device with respect to the medical device of the patient, a facial image of the patient and a voice input from the patient;
prior to establishing the video connection between the PC device and the CP device, authenticating the clinician using a plurality of indicia comprising a facial image of the clinician, a voice input from the clinician, a geofence associated with the CP device operated by the clinician, and an access point (AP) identity (ID) associated with an AP node to which the CP device is connected;
after authenticating the patient and the clinician, determining a valid mapping between the patient and the clinician before commencing the remote programming session,
determining that an additional challenge query having a different complexity level is required;
providing the additional challenge query having the different complexity level to the clinician;
responsive to an additional response input from the clinician, providing access to the clinician with respect to the medical application;
obtaining a historical record of AP IDs associated with network connections previously established by the UE device with respect to the medical application; and
adjusting the complexity level of the challenge query further based on the historical record of the AP IDs.

13. The method as recited in claim 12, wherein the remote programming session is configured to effectuate at least one of a spinal cord stimulation (SCS) therapy, a neuromuscular stimulation therapy, a dorsal root ganglion (DRG) stimulation therapy, a deep brain stimulation (DBS) therapy, a cochlear stimulation therapy, a drug delivery therapy, a cardiac pacemaker therapy, a cardioverter-defibrillator therapy, a cardiac rhythm management (CRM) therapy, an electrophysiology (EP) mapping and radio frequency (RF) ablation therapy, a sacral nerve stimulation (SNS) therapy, an electroconvulsive therapy (ECT), a repetitive transcranial magnetic stimulation (rTMS) therapy, a vagal nerve stimulation (VNS) therapy, and one or more physiological condition monitoring applications.

* * * * *